US008988596B2

(12) United States Patent
Watanabe

(10) Patent No.: US 8,988,596 B2
(45) Date of Patent: Mar. 24, 2015

(54) IMAGING DEVICE AND CONTROL METHOD FOR IMAGING DEVICE

(75) Inventor: Yoji Watanabe, Fuchu (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/475,735

(22) Filed: May 18, 2012

(65) Prior Publication Data

US 2012/0300099 A1 Nov. 29, 2012

Related U.S. Application Data

(62) Division of application No. 12/268,972, filed on Nov. 11, 2008.

(30) Foreign Application Priority Data

| Nov. 20, 2007 | (JP) | 2007-301017 |
| Nov. 20, 2007 | (JP) | 2007-301018 |
| Nov. 28, 2007 | (JP) | 2007-306904 |
| Nov. 28, 2007 | (JP) | 2007-306905 |
| Dec. 5, 2007  | (JP) | 2007-314903 |

(51) Int. Cl.
*G03B 7/00* (2014.01)
*H04N 5/235* (2006.01)
*H04N 5/232* (2006.01)
(Continued)

(52) U.S. Cl.
CPC ......... *H04N 5/2353* (2013.01); *H04N 5/23232* (2013.01); *H04N 5/235* (2013.01); *H04N 5/35572* (2013.01); *H04N 5/357* (2013.01)
USPC ............ 348/362; 396/239; 396/281; 396/321

(58) Field of Classification Search
USPC ........................... 348/362; 396/239, 281, 321
See application file for complete search history.

(56) References Cited

U.S. PATENT DOCUMENTS

| 5,172,151 A | 12/1992 | Yomogizawa et al. |
| 2003/0063063 A1 | 4/2003 | Cooke |

(Continued)

FOREIGN PATENT DOCUMENTS

| JP | 2002-335427 | 11/2002 |
| JP | 2003-069897 | 3/2003 |

(Continued)

OTHER PUBLICATIONS

Translation of JP Publication No. 2005-117395; Title: Imaging Apparatus; Inventors: Kido et al.; Publication Date: Apr. 28, 2005.*

(Continued)

*Primary Examiner* — Clayton E Laballe
*Assistant Examiner* — Fang-Chi Chang
(74) *Attorney, Agent, or Firm* — John C. Pokotylo; Straub & Pokotylo

(57) ABSTRACT

An imaging device comprising an imaging section for repeatedly forming subject images at a set period, while performing a bulb exposure operation, and outputting image data; an adding processing section for performing adding processing of the image data and previously output image data; an added image storage section for sequentially storing a plurality of added images that have been determined by the adding processing section; and a selection section for selecting any of the plurality of added images that have been stored in the added image storage section, after completion of the bulb exposure operation.

16 Claims, 39 Drawing Sheets

(51) Int. Cl.
*H04N 5/355* (2011.01)
*H04N 5/357* (2011.01)

(56) References Cited

U.S. PATENT DOCUMENTS

| | | |
|---|---|---|
| 2004/0150738 A1 | 8/2004 | Sakimoto et al. |
| 2004/0169739 A1 | 9/2004 | Aoyama |
| 2005/0083351 A1 | 4/2005 | Kawamoto et al. |
| 2005/0270252 A1 | 12/2005 | Drader et al. |
| 2006/0059426 A1 | 3/2006 | Ogikubo |
| 2006/0221223 A1 | 10/2006 | Terada |
| 2007/0035651 A1 | 2/2007 | Harada et al. |
| 2007/0081812 A1* | 4/2007 | Ikehata et al. ............... 396/287 |
| 2007/0291114 A1* | 12/2007 | Oshima ........................ 348/126 |
| 2008/0007631 A1* | 1/2008 | Abe ............................ 348/231.3 |
| 2008/0099675 A1 | 5/2008 | Hiroi et al. |
| 2008/0129839 A1* | 6/2008 | Asukai et al. ............ 348/231.99 |
| 2009/0009614 A1* | 1/2009 | Kawai ...................... 348/208.12 |

FOREIGN PATENT DOCUMENTS

| | | | |
|---|---|---|---|
| JP | 2004-140484 | 5/2004 | |
| JP | 2005117395 A * | 4/2005 | |
| WO | WO 2005064921 A1 * | 7/2005 | ............. H04N 5/232 |

OTHER PUBLICATIONS

Chinese Office Action to Chinese Application serial No. 200810179428.1, mailed Apr. 13, 2010.
Chinese Office Action to Chinese Application serial No. 200810176354.6, mailed May 12, 2010.
Japanese Office Action to Japanese Application serial No. 2012-090864, mailed May 15, 2010.

* cited by examiner

341

341

IMAGING DEVICE AND CONTROL METHOD FOR IMAGING DEVICE

CROSS-REFERENCE TO RELATED APPLICATIONS

This application is a divisional of U.S. patent application Ser. No. 12/268,972 (referred to as "the '972 application" and incorporated herein by reference), filed on Nov. 11, 2008, titled "IMAGING DEVICE AND CONTROL METHOD FOR IMAGING DEVICE," and listing Keiji KUNISHIGE, Satoshi MIYAZAKI AND Yoji WATANABE, as the inventors, the '972 application being based upon and claiming benefit under 35 U.S.C. §119, to the filing dates of prior Japanese Patent Applications No. 2007-301017 filed on Nov. 20, 2007, No. 2007-301018 filed on Nov. 20, 2007, No. 2007-306904 filed on Nov. 28, 2007, No. 2007-306905 filed on Nov. 28, 2007, No. 2007-314903 filed on Dec. 5, 2007. The entire contents of the '972 application and the foregoing Japanese patent applications are incorporated herein by reference.

BACKGROUND OF THE INVENTION

1. Field of the Invention

The present invention relates to an imaging device and a control method for an imaging device, and in more detail relates to an imaging device capable of imaging a subject while carrying out bulb exposure or long time exposure etc., and to a control method for an imaging device.

2. Description of the Related Art

Generally, in the case of imaging a subject such as a starry sky, fireworks or a night scene, the bulb exposure setting is often used. However, with bulb exposure appropriate exposure time (time from opening the shutter to closing the shutter) varies depending on the photographed image and ambient conditions, and it was necessary for the photographer to determine exposure time on their own without looking at a completed image. Therefore, if that determination was wrong, there was a problem of over or under exposure.

At the time of bulb exposure therefore, if a photographed image can be observed according to exposure, it will be possible to observe exposure levels in real time, and determining exposure time will be simplified. For example, Unexamined Japanese patent application No. 2005-117395 (laid-open Apr. 28, 2005) discloses am imaging device for acquiring image signals from an image sensor at specified time intervals (for example, 1/10th of a second) during an exposure operation, and displaying a sequentially summed image on a liquid crystal monitor.

SUMMARY OF THE INVENTION

The present invention has as its object to provide an imaging device with which a photographer can recognize that an exposure operation is progressing, in a long time exposure such as bulb exposure, and a control method for an imaging device.

According to the present invention, there is provided an imaging device, comprising: an imaging section, including an image sensor for imaging a subject, for generating image data based on output signals of the image sensor; a control section for causing repeated operation of the imaging section in accordance with a single release operation; an adding processing section for sequentially adding image data repeatedly output from the imaging section and generating added mage data; an image display section for displaying the added image data, and a setting section for setting a repeat period for the imaging section and instructing to the control section.

There is also provided an imaging device of the present invention, comprising: an imaging section for repeatedly forming an image of a subject at a set period, while performing a bulb exposure operation, and outputting image data; an adding processing section for performing adding processing of the image data and previously output image data; an added image storage section for respectively independently storing a plurality of added images that have been added by the adding processing section; and a display section for displaying, in a list, the plurality of added images that have been stored in the added image storage section after completion of the bulb exposure operation.

Further, a control method for an imaging device of the present invention comprises: repeatedly forming an image of a subject, generating image data based on the formed subject image, sequentially adding image data, and repeatedly displaying added image data.

Further, a control method for an imaging device of the present invention comprises: repeatedly forming an image of a subject, generating image data based on the formed subject image, sequentially adding image data, successively storing added image data, and performing list display of the stored image data, after exposure.

DETAILED DESCRIPTION OF THE PREFERRED EMBODIMENTS

Figure 1:
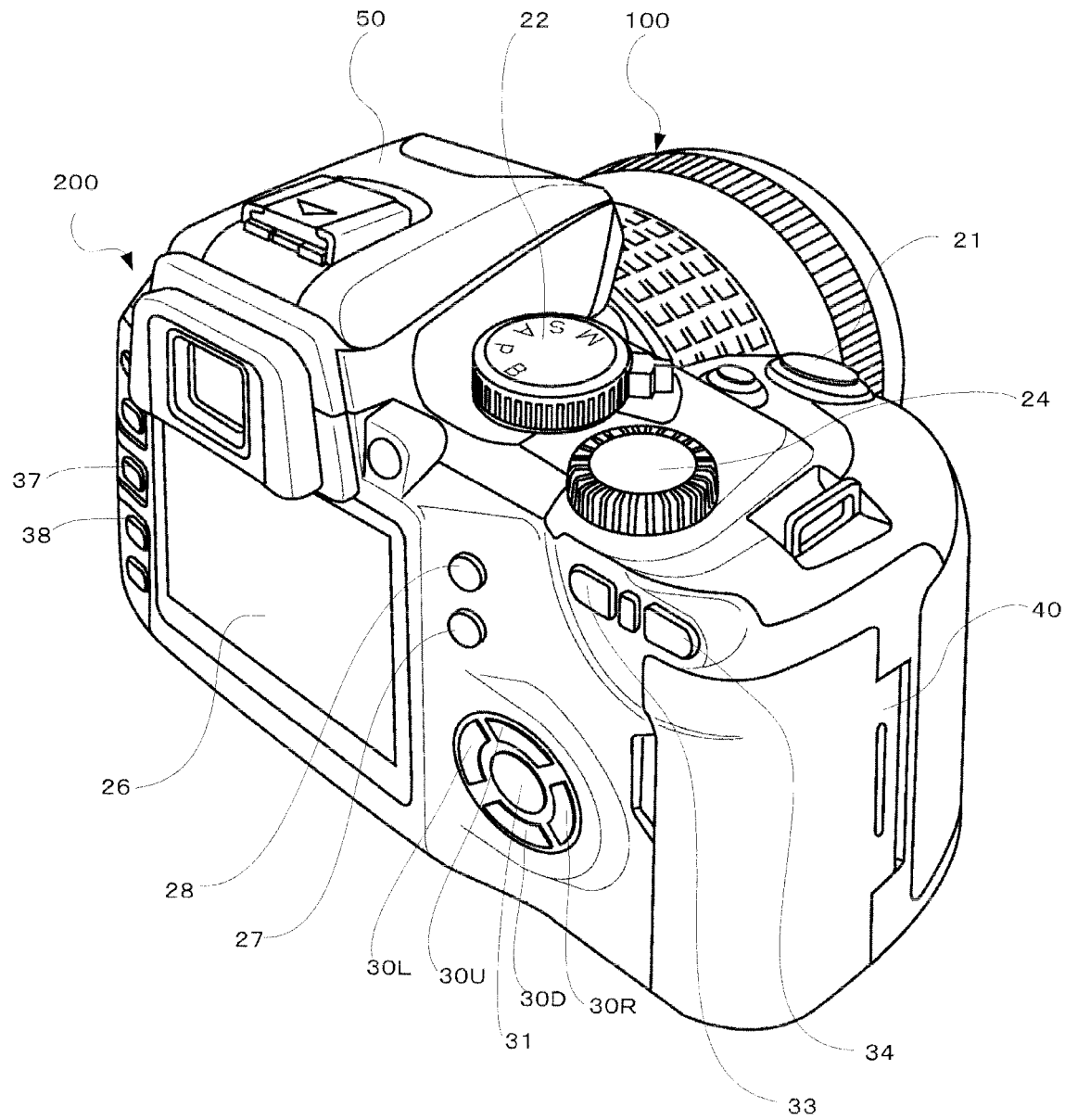
FIG. 1 is an external perspective drawing looking at a digital single lens reflex camera of a first embodiment of the present invention from a rear surface.

In the following, preferred embodiments using a digital single lens reflex adopting the present invention will be described using the drawings. FIG. 1 is an external perspective drawing of a digital single lens reflex camera relating to a first embodiment of the present invention seen from a rear surface.

This digital single lens reflex camera comprises a camera body 200 and an interchangeable lens 100. A release button 21, exposure mode dial 22, information setting dial 24, and strobe 50 etc. are arranged on the upper surface of the camera body 200. The release button 21 has a first release switch that turns on if the photographer presses the button down halfway, and a second release switch that is turned on when the button is pressed down fully.

Figure 2:
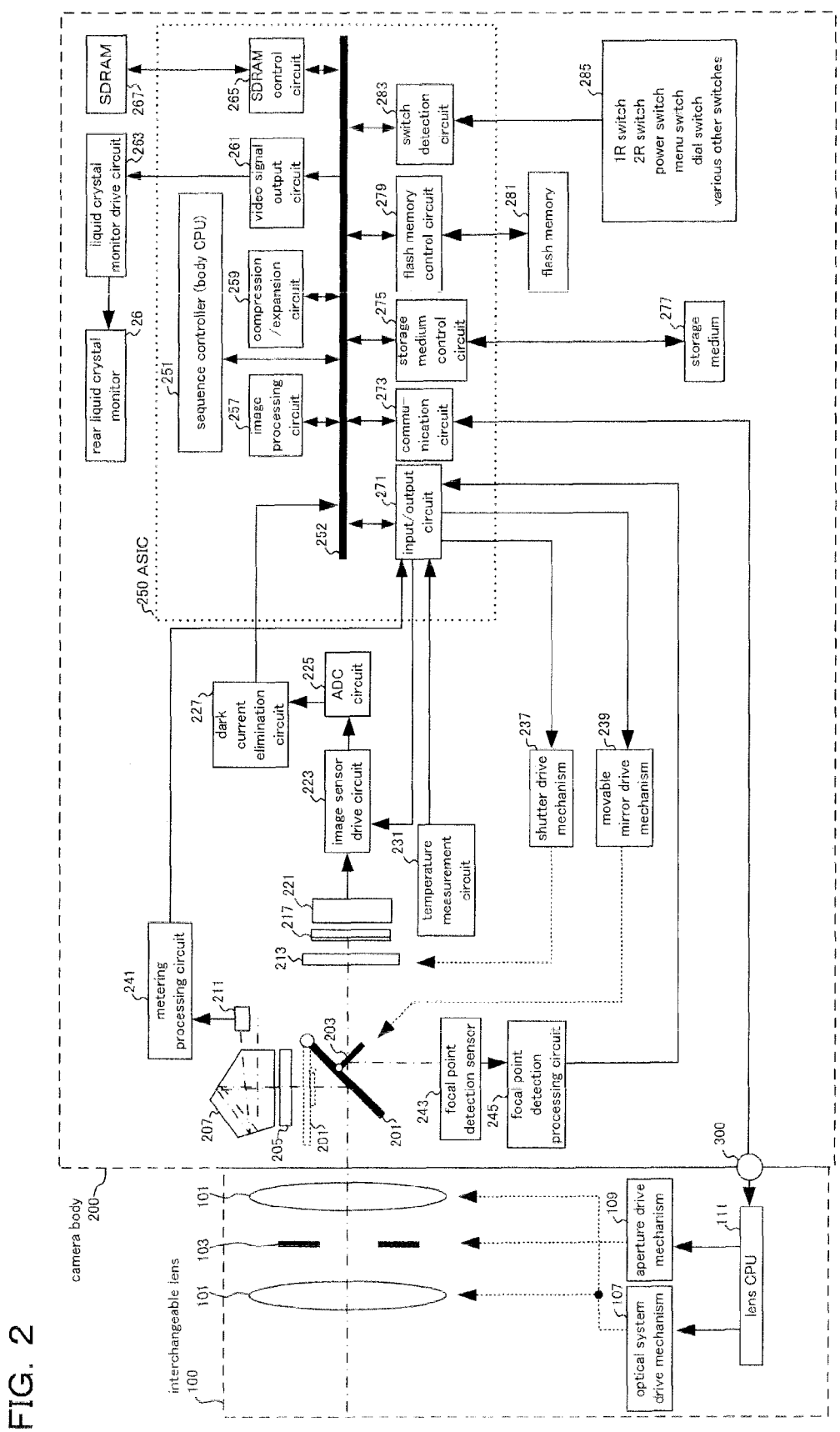
FIG. 2 is a block diagram showing the overall structure of electrical systems of a digital single lens reflex camera relating to a first embodiment of the present invention.

By turning this first release switch (hereafter called 1R) on, the camera carries out exposure preparation operations such as focal point detection, focusing of the photographing lens, and metering for the subject brightness, and as a result of turning the second switch (hereafter called 2R) on, the camera executes a shooting operation to acquire image data for a subject image based on output of the image sensor 221 (refer to FIG. 2).

The exposure mode dial 22 is an operation member constructed capable of rotation, and by aligning a pictorial display or symbol representing an exposure mode provided on the exposure mode dial 22 with an index, it is possible to select respective exposure modes, such as program exposure mode (P), aperture priority exposure mode (A), shutter speed priority exposure mode (S), manual exposure mode (M), and bulb mode (B).

An information setting dial 24 is an operation member constructed capable of rotation, and it is possible to select desired setting values and modes etc. in an information display screen or the like by rotational operation of the information setting dial 24. If shutter speed priority exposure mode or manual exposure mode are selected using the exposure mode dial 22, it is possible to set a shutter speed using the information setting dial 24, and it is also possible to set to a long time of 30 seconds or more. It is also possible to carry out setting of a cycle time for image display during exposure at the time of bulb exposure or long exposure time.

The strobe 50 is a pop-up type supplemental lighting unit, and by operating an operating button, not shown, the strobe 50 pops up and is capable of irradiating light to a subject.

A rear surface liquid crystal monitor 26, continuous/single shot button 22, AE lock button 28, a cross-shaped button for up 30U, a cross-shaped button for down 30D, a cross-shaped button for right 30R, a cross-shaped button for left 30L, (if these buttons 30U, 30D, 30R and 30L are referred to collectively, it will be called a cross-shaped button 30), an OK button 31, a live view display button 33, an enlarge button 34, a menu button 37 and a playback button 38 are arranged on the rear surface of the camera body 200.

The rear surface liquid crystal monitor 26 is a display unit for carrying out live view display, playback display of a subject images that have already been taken, and display of exposure information and menus. Also, at the time of bulb exposure or long time exposure etc. image display is carried out during the exposure operation based on image signals acquired by the image sensor 221. The monitor is not limited to a liquid crystal display as long as it is possible to perform these display operation.

The continuous/single shot button 27 is an operation member switching between continuous shooting mode where pictures are taken continuously while the release button 21 is fully pressed down, and, single shot mode where a single picture is taken if the release button 21 is pressed down fully. The AE lock button 28 is an operation member for fixing a metered value. After brightness of an exposed image has been metered, if this AE lock button 28 is operated the metered value is maintained even if the composition is changed, and it is possible to take a picture without altering the exposure level.

The cross-shaped button 30 is an operation member for instructing movement of a cursor in two dimensional directions, the X direction and Y direction, on the rear surface liquid crystal display monitor 26, and is also used in selection commands for a subject image, when performing playback display of subject images that have been stored in the storage medium 277 etc. Besides providing four buttons for up, down, left and right, it is also possible to replace with an operating member capable of operation in two dimensional directions, such as a touch switch The OK button 31 is an operation member for confirming various items selected by the cross-shaped button 30 and the control dial 24 etc.

The live view display button 33 is an operating button for switching to live view display from a display screen for information display etch, or switching from live view display to a display screen for information display etc. Live view display is a mode that displays a subject image for viewing on the rear surface liquid crystal monitor 26 based on output of the image sensor 221 for subject image storage, and information display is a mode for displaying exposure information of the digital single lens reflex camera on the rear surface liquid crystal monitor 26 for display setting.

The enlargement button 34 is an operation member for enlarging display of part of a subject image on the rear surface liquid crystal monitor 26, and it is possible to change the enlargement position by operation of the above-described cross-shaped button 30.

The menu button 37 is an operation member for switching to menu mode in order to set various modes of this digital single lens reflex camera, and if menu mode is selected by operation of this button 37 a menu screen is displayed on the rear surface liquid crystal monitor 26. The menu screen is comprised of a multiple hierarchical structure, and various items are selected using the cross-shaped button 30 and selection is determined by operating the OK button 31.

The playback button 38 is an operation button for instructing display of subject images, that have been stored after being taken, on the rear surface liquid crystal monitor 26. Image data of subjects stored in a compressed mode such as JPEG, for example, in SDRAM (Synchronous Dynamic Random Access Memory) 267 and a storage medium 277, that will be described later, is expanded and displayed.

A storage medium housing cover 40 is attached to the side surface of the camera body 200. If this storage medium cover 40 is opened, a slot for fitting the storage medium 277 is provided inside, and the storage medium 277 can be loaded into or removed from the camera body 200.

Next, the overall structure principally involved in the electrical systems of the digital single lens reflex camera will be described using FIG. 2. With this embodiment, the interchangeable lens 100 and the camera body 200 are constructed as separate bodies, electrically connected by means of a communication contact 300, but it is also possible to integrally construct the interchangeable lens 100 and the camera body 200. A circuit block for the built-in strobe 50 is omitted from FIG. 2.

A photographing optical system 101 for focusing and focal length adjustment, and an aperture 103 for adjusting aperture, are arranged inside the interchangeable lens 100. The photographing optical system lens 101 is driven by a lens drive mechanism 107, while the aperture 103 is driven by the aperture drive mechanism 109.

The lens drive mechanism 107, and the aperture drive mechanism 109 are respectively connected to a lens CPU 111, and this lens CPU 111 is connected to a communication circuit 273 of the camera body 200 by means of the communication contact 300. The lens CPU 111 performs control inside of the interchangeable lens 100, controls the lens drive mechanism 107 to perform focusing and zoom operations, and controls an aperture value by controlling the aperture drive mechanism 109.

Also, the lens CPU 111 transmits lens specific information such as maximum aperture value and focal length information of the interchangeable lens 100, and focal length and focus position information detected by the optical system positional detection mechanism (not shown in the drawing) to the camera body 200.

Inside the camera body 200, a rotatable moving mirror 201 is provided moving between a position inclined by 45 degrees with respect to the lens optical axis for reflecting a subject image to a viewfinder optical system (lowered position, subject image viewing position), and a raised up position for guiding the subject image to the image sensor 221 (raised position, retracted position).

A focusing screen 205 for image forming the subject image is arranged above the movable mirror 201, and a pentaprism 207 for lateral inversion of the subject image is arranged above this focusing screen 205.

An ocular lens (not shown) for viewing the subject image is arranged at an outgoing side of this pentaprism 207 (the right side in FIG. 2), and a photosensor 211 is arranged next to the ocular lens at a position that does not obstruct viewing of the subject image. This photosensor 211 is connected to a photometry processing circuit 241, and output of the photosensor 211 is subjected to processing such as amplification processing and analog-digital conversion by this photometry processing circuit 241.

A half mirror is constructed close to the middle of the movable mirror 201, and a sub-mirror 203 for reflecting the subject image that has passed through the half mirror to a lower section of the camera body 200 is provided on a rear surface of the movable mirror 201.

This sub mirror 203 is capable of rotation with respect to the movable mirror 201, and when the movable mirror 201 is raised up (position shown by dotted lines in FIG. 2) the sub mirror 203 rotates to a position covering the half mirror part, while when the movable mirror 201 is in a subject image viewing position (lowered position) the sub-mirror 203 is at a position opened with respect to the movable mirror 201, as shown in the drawing.

This movable mirror 201 is driven by a movable mirror drive mechanism 239. Also, a focal point detection sensor 243 is arranged below the sub-mirror 203, and output of this focal point detection sensor 243 is connected to a focal point detection processing circuit 245. The focal point detection sensor 243 measure defocus amount for a subject image formed using the photographing optical system 101, and is constructed of a well-known phase difference AF optical system for separating peripheral light of the photographing optical system 101 into two luminous fluxes, and a pair of sensors.

A focal plane type shutter 213 for exposure time control is arranged behind the movable mirror 201, and drive control for this shutter 213 is performed by a shutter drive mechanism 237. An image sensor 221 is arranged behind the shutter 213, and a subject image formed by the photographing optical system 101 is photoelectrically converted into electrical signals. It goes without saying that it is possible to use CCD (Charge Coupled Devices), or a two-dimensional fixed imaging element such as CMOS (Complementary Metal Oxide Semiconductor) as the image sensor 211.

An infrared cut filter/low pass filter 217, which is an optical filter for removing an infrared component and a high frequency component from subject light flux, is arranged between the shutter 213 and the image sensor 221. A temperature measurement circuit 231 is also arranged close to the image sensor 221. This temperature measurement circuit 231 measures ambient temperature close to the image sensor 221 using temperature dependence of forward current of a diode, and outputs a temperature signal according to the ambient temperature.

The image sensor 221 is connected to an image sensor drive circuit 223, and readout of image signals from the image sensor 221 etc. is performed by this image sensor drive circuit 223. The image sensor drive circuit 223 is connected to an ADC (analogue to Digital Converter) 225 for carrying out analogue to digital conversion of an image signal.

Output of the ADC 225 is connected to a dark current elimination circuit 227. The dark current elimination circuit 227 is a circuit for removing dark current generated by the image sensor 221, and corrects image data that represents a subject using dark current generated in a shielded region of a peripheral section of the image sensor 221.

The dark current elimination circuit 227 is connected to data bus 252 inside an ASIC (Application Specific Integrated Circuit) 250. A sequence controller (hereafter referred to as a body CPU) 251, image processing circuit 257, compression and expansion circuit 259, video signal output circuit 261, SDRAM control circuit 265, input/output circuit 271, communication circuit 273, storage medium control circuit 275, flash memory control circuit 279 and switch sensing circuit 283 are connected to this data bus 252.

The body CPU 251 that is connected to the data bus 252 controls operation of this digital single lens reflex camera. The image processing circuit 257 is connected to the data bus 252 and carries out various image processing such as digital amplification of digital image data (digital gain adjustment processing), color correction, gamma (γ) correction, contrast correction and image generation for live view display etc.

Also, the compression and expansion circuit 259 is a circuit for compressing image data stored in the SDRAM 267 using a compression system such as JPEG, TIFF etc. and expanding compressed image data. The image compression is not limited to JPEG and TIFF, and it is also possible to apply other compression systems.

The video signal output circuit 261 is connected to the rear surface liquid crystal monitor 26 via a liquid crystal monitor drive circuit 263. The video signal output section 261 converts image data stored in the SDRAM 267 or the storage medium 277 into video signals for display on the rear surface liquid crystal monitor 26. The rear surface liquid crystal monitor 26 is arranged on the rear surface of the camera body 200 as shown in FIG. 1, but as long as it is in a position that can be seen by the photographer it is not limited to the rear surface, and also is not limited to liquid crystal and can be another display device.

The SDRAM 267 is connected via the SDRAM control circuit 265 to the data bus 252, and this SDRAM 267 acts as a buffer memory for temporarily storing image data that has been subjected to image processing by the image processing circuit 257 or image data that has been compressed by the compression and expansion circuit 259.

The input/output circuit 271 connected to the above described image sensor drive circuit 223, temperature measurement circuit 231, shutter drive mechanism 237, movable mirror drive mechanism 239, photometry processing circuit 241, and focal point detection processing circuit 245 controls input and output of data to various circuits, such as the body CPU 251 via the data bus 252.

The communication circuit 273 that is connected to the lens CPU 111 via the communication contact 300 is also connected to the data bus 252, and carries out data exchange with the body CPU 251 etc. and communication for control commands. The storage medium control circuit 275 connected to the data bus 252 is connected to the storage medium 277, and performs control of storing image data etc. to this storage medium 277 and reading out of image data etc.

The storage medium 277 is constructed so that any rewritable storage medium, such as xD picture card, (registered trademark), Compact Flash (registered trademark), SD memory Card (registered trademark) or memory stick (registered trademark) can be fitted, and is removably inserted into the camera body 200. Besides, it is also possible to have a configuration where it is possible to connect to a hard disc via a communication connection point.

The flash memory control circuit 279 is connected to a flash memory 281, and this flash memory 281 stores programs for controlling operation of the digital single lens reflex camera, and the body CPU 251 performs control of the digital single lens reflex camera in accordance with the programs stored in the flash memory 281. Incidentally, the flash memory 281 is an electrically rewritable non-volatile memory.

Various switches 285, including a 1R switch for detecting a first stroke (half press) of the release button 21 and a 2R switch for detecting a second stroke (full press) of the release button 21, a power switch, a menu switch linked to the menu button 37, a dial switch linked to the exposure mode dial 22, a dial switch linked to the information setting dial 24, and various switches liked to other operating members, is connected to the data bus 252 via a switch detection circuit 283.

Next, the structure relating to image display during exposure, in bulb exposure etc., will be described using FIG. 3. The control section 297 is constructed of a body CPU 251 for controlling the overall digital single lens reflex camera. When using bulb exposure mode, the setting section 298 automatically sets a cycle time for display in order to confirm progress of the exposure (exposure level) based on manual operation using the information setting dial 24 or exposure information etc.

The imaging section 291 includes the image sensor 221, image sensor drive circuit 223, ADC circuit 225 and dark current elimination circuit 227, and outputs image data based on image signals. Output of the imaging section 291 is connected to the adding processing section 294.

The adding processing section 294 performs adding processing of images acquired every predetermined time during bulb exposure or long time exposure, and generates added mage data. A temporary storage section 293 is constructed using a temporary storage device such as SDRAM 267, and temporarily stores image data that has been added in the adding processing section 294, supplies already stored added image data in accordance with control commands from the control section 297 to the adding processing section 294, and once more stores newly added image data.

The adding processing section 294 is constructed using a body CPU 251 and an image processing circuit 257 etc., and in accordance with control commands from the control section 297 carries out processing to add added image data that is already stored in the temporary storage section 293 with newest image data.

An added image storage section 295 is constructed using a storage medium such as the previously described storage medium 277, and reads out the most recent added image data that has been added in the adding processing section 294 in accordance with control commands from the control section 297, and stores this data.

The image display section 296 is made up of a rear surface liquid crystal monitor 26 and a liquid crystal monitor drive circuit 263 etc., and, every time added image data that has been added by the adding processing section 294 is updated and stored in the temporary storage section 293, reads out the data from the temporary storage section 293 in accordance with control commands from the control section 297 to display the added image data.

With this type of structure, first an operator sets a cycle time by operating the setting section 298. The control section 297 performs control so that image data that has been acquired by the imaging section 291 is sequentially added by the adding processing section 294 every set cycle time, and this added image is displayed on the image display section 296.

Figure 12:
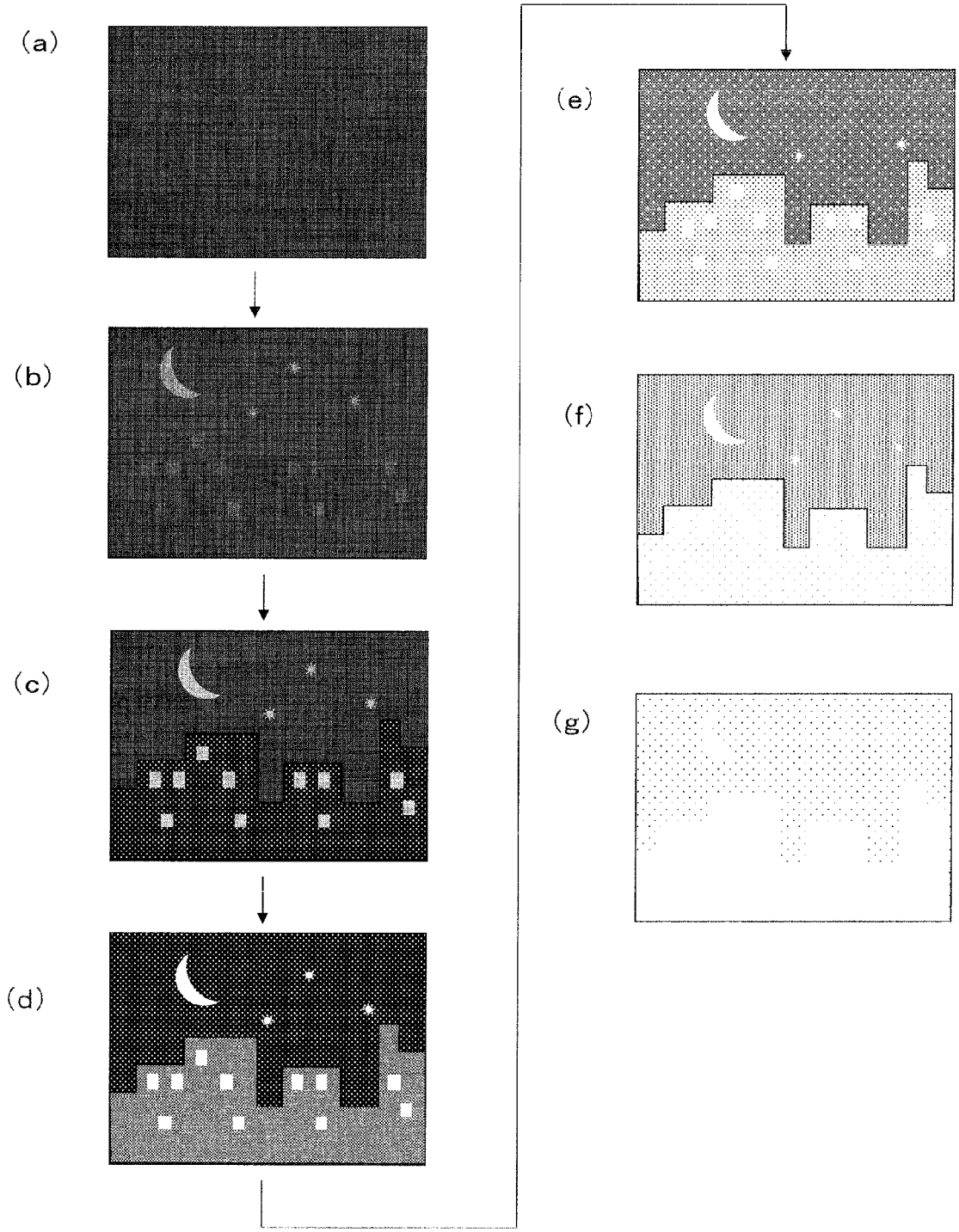
FIG. 12 shows display of bulb mode exposure time for the first embodiment of the invention, with FIG. 12(a) to FIG. 12(g) showing change with lapse of cycle time.

As shown in FIG. 12, this added image is a gradual cumulative addition of image data, and initially is a dark image, as shown in FIG. 12(a), but if the image gradually changes to a brighter image, images are repeatedly cumulatively added a number of times and it will become an image that seems over exposed, as shown in FIG. 12(g).

Next, detailed operation of the digital single lens reflex camera of a first embodiment of the present invention will be described using the flowcharts shown in FIG. 4 to FIG. 7.

Figure 4:
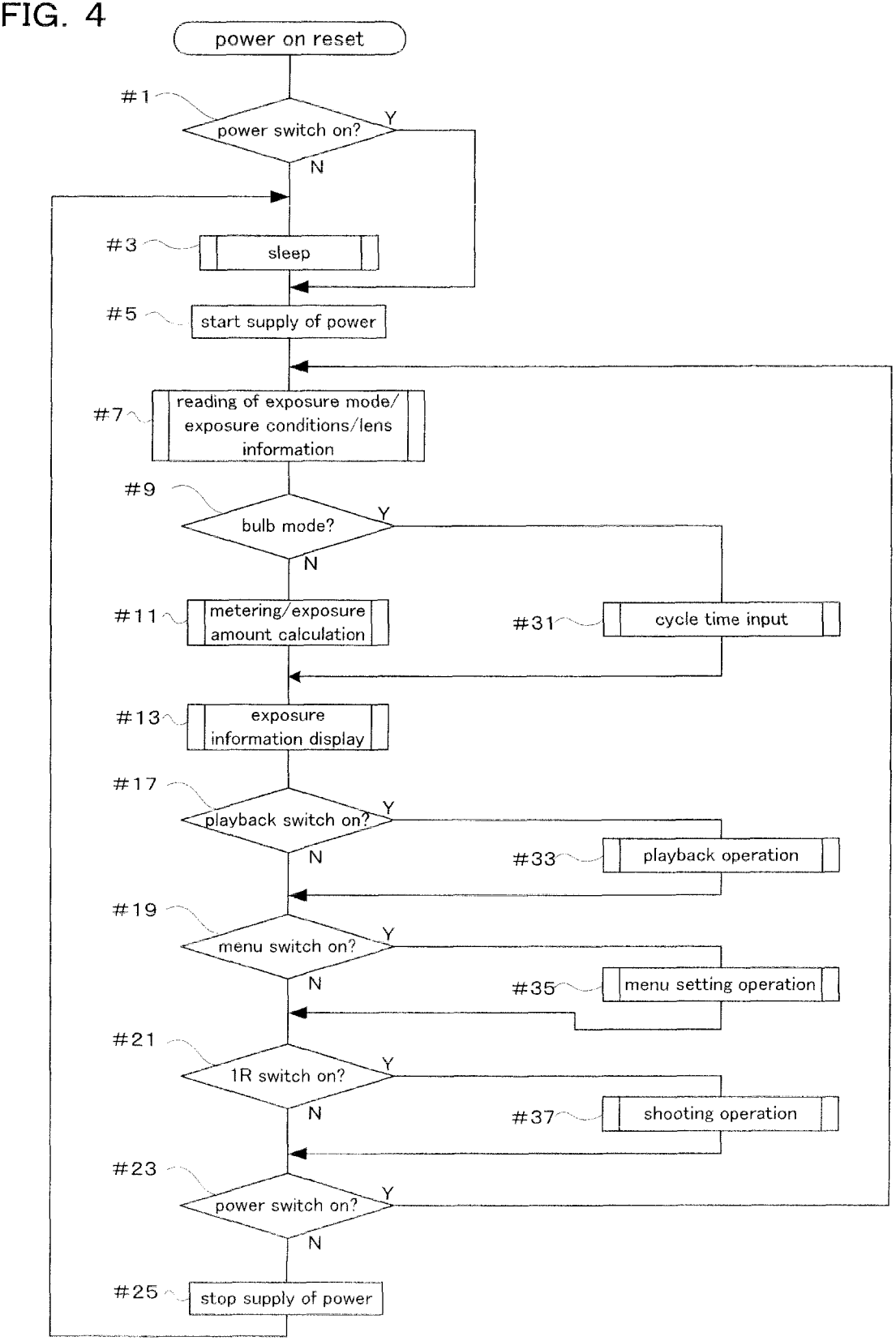
FIG. 4 is a flowchart showing a power on reset operation of the first embodiment of the present invention.

FIG. 4 shows a power on reset operation performed by the body CPU 251 at the camera body 200 side. If a battery is fitted into the camera body 200, this flow of operations starts, and it is determined whether or not the power switch of the camera body 200 is on (#1).

When the result of determination is that the power switch is off, a sleep state, which is a low power consumption state, is entered (#3). In this sleep state, interrupt processing is carried out only when the power switch is turned on, and processing for power switch on is carried out in steps #5 and after. Until the power switch is turned on, operations other than power switch interrupt processing are suspended, and consumption of the power supply battery is prevented. In the event that the power switch was on in step #1, or the sleep state of step #3 is left, supply of power commences (#5).

Next, if there is information such as exposure mode set by the exposure mode dial 22, ISO speed set by the information setting dial 24, or shutter speed or aperture value set manually, reading in of these exposure conditions and lens information is carried out (#7).

Reading of lens information in step #7 is the reading of lens specific information, such as maximum aperture of the interchangeable lens 100, and focal length information, from the lens CPU 111 by means of the communication circuit 273. In this step, in the event that bulb mode exposure has been set, or a long time has been set as the shutter speed, these items of information are read.

It is next determined whether or not bulb mode has been set (#9). From the fact that the exposure mode is read in step #7, it is determined whether or not bulb mode has been set as the read exposure mode.

If the result of determination in step #7 is that bulb mode has not been set, metering and exposure value calculation is carried out (#11). In this step, subject brightness is then measured by the photosensor 211, exposure amount is calculated, and exposure control values such as shutter speed and aperture value are calculated in accordance with exposure mode and exposure conditions, using this exposure value.

If the result of determination in step #9 is that bulb mode has been set, input of cycle time (cycle for repeatedly outputting image data) is carried out (#31). Input of this cycle time will be described later using FIG. 5. If input of cycle time is completed, processing advances to step #13. In the case of bulb mode, since opening and closing of the shutter 213 is carried out by user operation and is not related to metering, the metering and exposure value calculation of step #11 are not executed.

Figure 10:
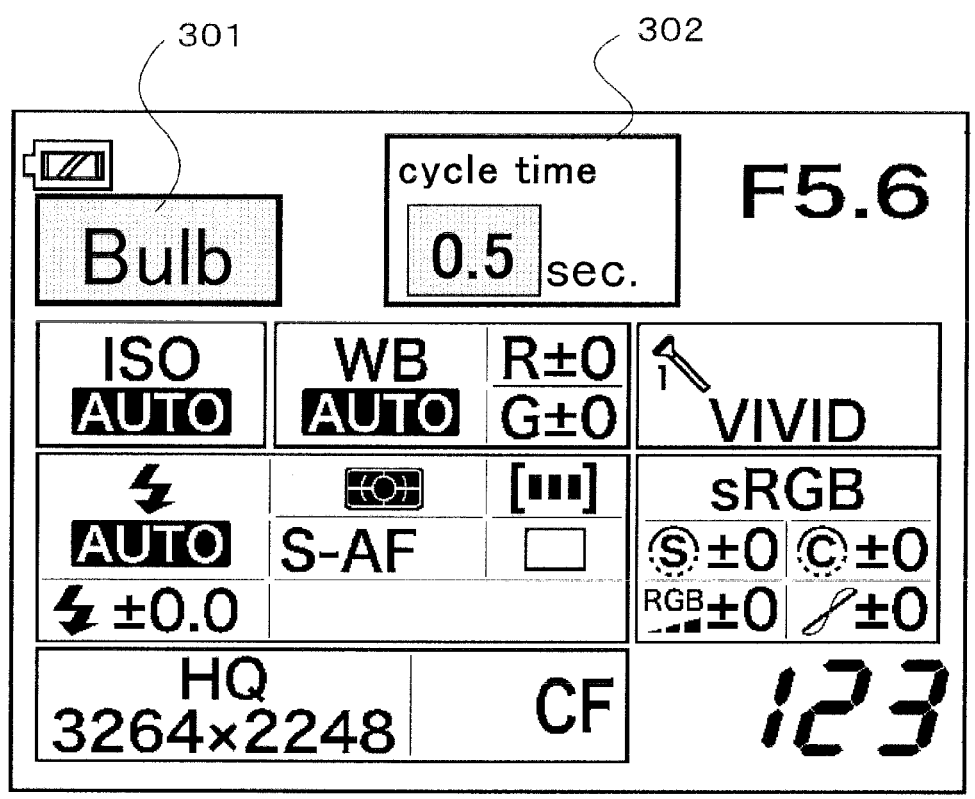
FIG. 10 shows exposure information display of a digital single lens reflex camera relating to a first embodiment of the present invention.

Next, the exposure information is displayed on the rear surface liquid crystal monitor 26 (#13). As exposure information, there are exposure mode and exposure conditions read in step #7 and exposure control values for shutter speed and aperture value calculated in #11. In the event that bulb mode has been set as the exposure mode, then as shown in FIG. 10, a bulb mode display 301 and cycle time display 302 are displayed on the rear surface liquid crystal monitor 26 together with other exposure information.

If display of exposure information is carried out, it is next determined whether or not a playback switch linked to the playback button 38 is on (#17). Playback mode is a mode for reading out image data stored in the storage medium 277 and displaying them on the rear surface liquid crystal monitor 26, when the playback button 38 has been operated. If the result of determination is that the playback switch is on, a playback operation is executed (#33).

If the result of determination in step #17 is that the playback switch is not on, it is determined whether or not the menu switch that links to the menu button 37 is on (#19). In this step, it is determined whether or not the menu button 37 has been operated and the menu mode has been set. If the result of determination is that the menu switch is on, menu display is performed on the rear surface liquid crystal monitor 26, and a menu setting operation is carried out (#35). Various setting operations such as AF mode, white balance, ISO speed setting, drive mode setting etc. can be carried out by the menu setting operation.

If the determination result in step #19 is that the menu switch is not on, it is next determined whether or not the release button 21 has been pressed down halfway, that is, whether or not the 1R switch is on. If the result of determination is that the 1R switch is on, a shooting operation sub-routine is executed to carry out exposure preparation and shooting (#37). This sub-routine will be described in detail later using FIG. 6.

If the result of determination in step #21 is that the 1R switch is not on, then similarly to step #1 it is determined whether or not the power switch is on (#23). If the result of determination is that the power switch is on, processing returns to step #7 and the operations described above are repeated. On the other hand, if the power switch is not on, supply of power is stopped (#25), and processing returns to step #3 where the previously described sleep state is entered.

Figure 5:
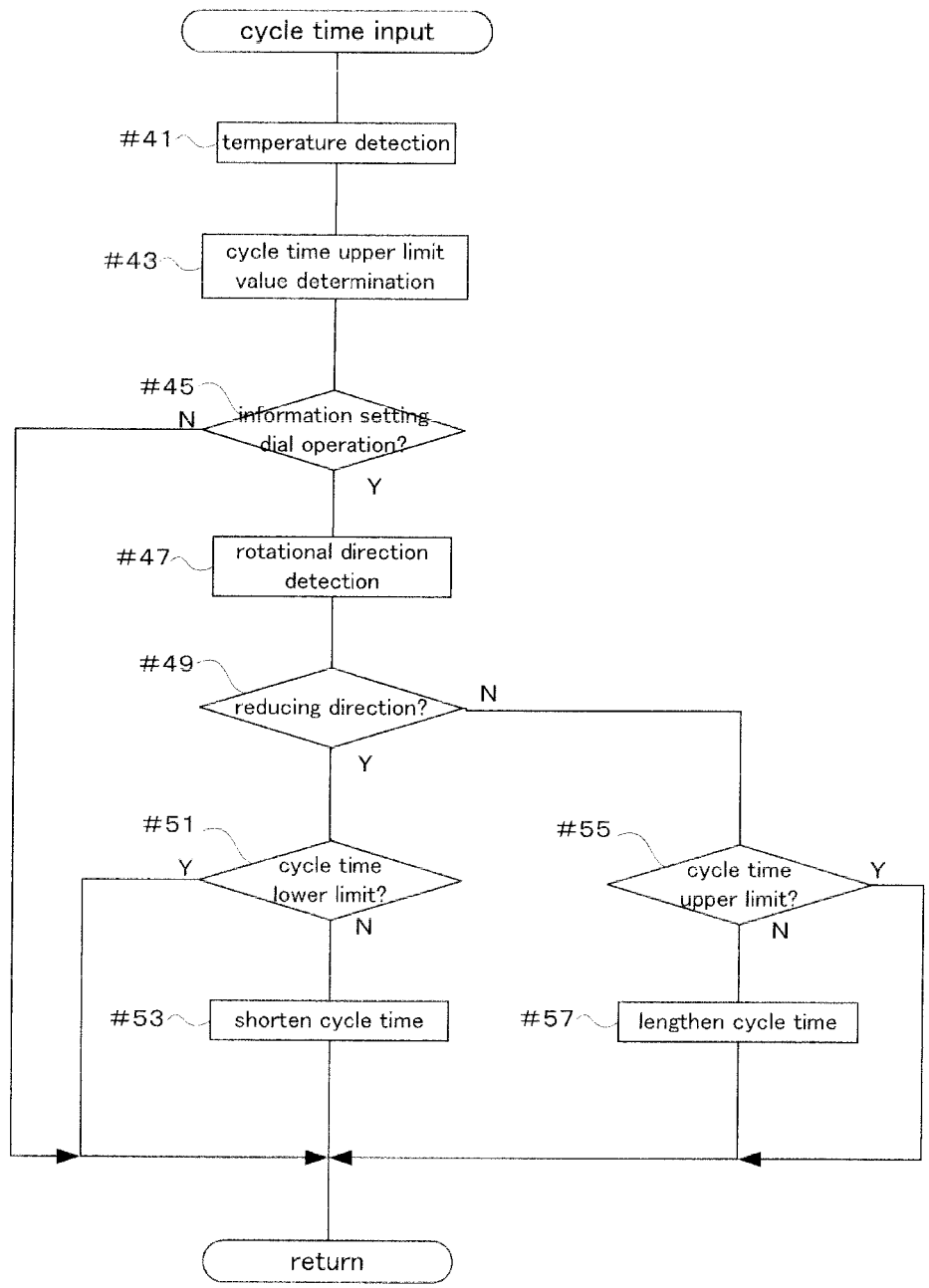
FIG. 5 is a flowchart showing a cycle time input operation of the first embodiment of the present invention.

Next, the input operation for cycle time of step #31 will be described using FIG. 5. If this subroutine is entered, ambient temperature close to the image sensor 221 that has been measured by the temperature measurement circuit 231 is first detected (#41). If the ambient temperature is obtained, determination of an upper limit value for cycle time is carried out based on this ambient temperature (#43).

Figure 8:
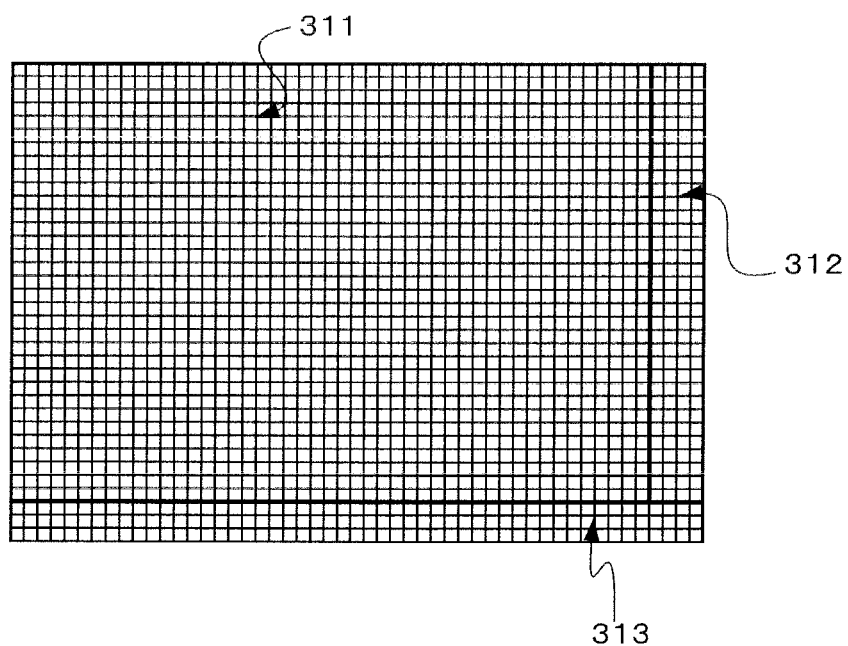
FIG. 8 shows respective regions of an image sensor of a digital single lens reflex camera relating to a first embodiment of the present invention.

As is shown conceptually in FIG. 8, photodiodes (pixels) are arrayed in two dimensional directions on the image sensor 221. In FIG. 8, each square represents a pixel. A majority of the pixels of the image sensor 221 are the effective pixel region 311, with the right side constituting a horizontally shielded pixel region 312 and the lower side constituting a vertically shielded pixel region 313. Image data is generated based on pixel signals output from pixels belonging to the effective pixel region 311, while dark current data is generated based on pixel signals output from pixels belonging to the horizontally shielded pixel region 312 and the vertically shielded pixel region 313.

Figure 9:
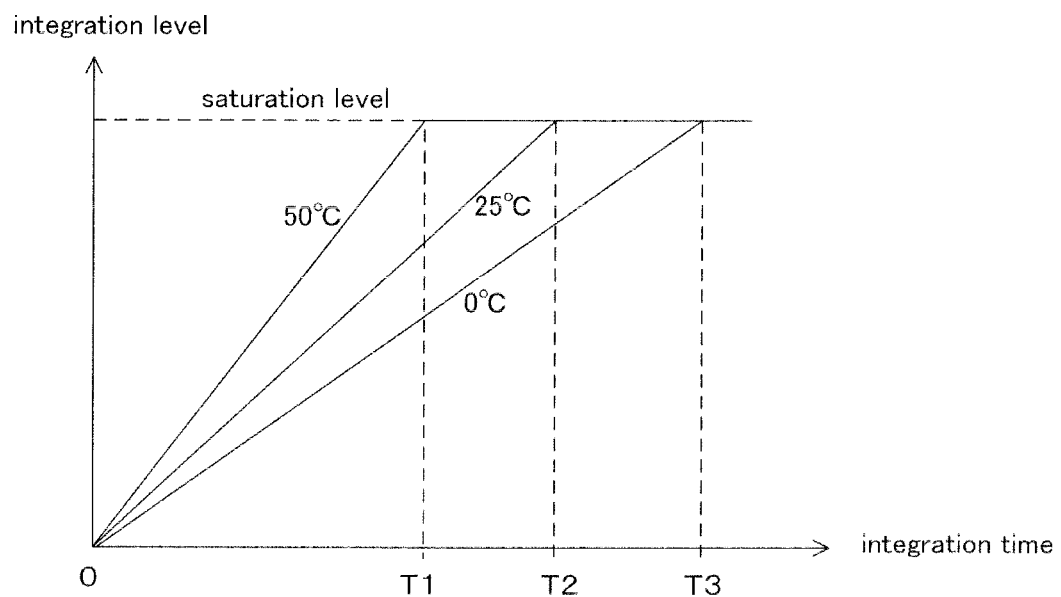
FIG. 9 is a graph showing a relationship between temperature, relating to dark current, and integration level in an image sensor of a digital single lens reflex camera of the first embodiment of the present invention.

As shown in FIG. 9, this dark current has a temperature dependent characteristic, and as the temperature close to the image sensor 221 become hot, the dark current (integrated value) also rapidly becomes large as time passes. Dark current is superimposed on the pixel signals of the subject image output from the image sensor 221 that have been photoelectrically converted, and if exposure time (integration time) becomes long the dark current can no longer be ignored. Dark current output from the horizontally shielded pixel region 312 and the vertically shielded pixel region 313 is also assumed to be generated in the effective pixel region 311, and in the dark current elimination circuit 227 dark current correction is carried out by deducting dark current data from image data based on the pixel signals.

The dark current quickly reaches saturation level as the temperature becomes high. If the dark current reaches saturation level, it will not be possible to correctly perform dark current elimination. In this embodiment therefore, in the event that an exposure operation is carried out over a long time, such as bulb mode, pixel signals are read from the image sensor 221 before the dark current reaches saturation level. Specifically, taking into consideration the dark current characteristic, the upper limit value for cycle time is controlled based on ambient temperature measured by the temperature measuring circuit 231 so that dark current does not saturate (#43). Specifically, a table for ambient temperature and upper limit value is stored, and determination is made by referring to this table.

Next, in order to input cycle time, it is determined whether or not the information setting dial 24 has been operated (#45). If the result of determination is that the information setting dial 24 has not been operated, the original routine is returned to. On the other hand, if the information setting dial 24 has been operated the switch detection circuit 283 detects direction of rotation of the dial (#47).

It is next determined whether or not the detection direction of rotation is a direction that causes a reduction in cycle time (#49). If the result of determination is that the rotation direction causes a reduction in cycle time, it is determined whether or not the previous cycle time has reached a lower limit value (#51). The lower limit value should be set appropriately, but can be, for example, about 0.1 seconds. If the result of determination is that the lower limit value has not been reached, the cycle time is successively shortened in predetermined steps from the currently set state (#53).

As shown in FIG. 10, the cycle time is displayed as a cycle time display 302 within exposure information on the rear surface liquid crystal monitor 26. Every time there is a rotation operation using the information setting dial 24 in a direction to shorten the cycle time, for example, if the currently set state is an initial value of 30 second, there is a gradual reduction in predetermined steps from FIG. 11(*c*) towards the lower limit value of FIG. 11(*a*). The predetermined step should be appropriately set taking into consideration ease of use. Once cycle time shortening is finished, the original routine is returned to.

If the result of determination in step #49 is that the rotation direction is not such as to reduce cycle time, then it is determined whether or not the previous cycle time has reached the upper limit value determined in step #43 (#55). If the result of determination is that the upper limit value has not been reached, the cycle time is successively extended in predetermined steps (#57). Every time there is a rotation operation using the information setting dial 24 in a direction to increase the cycle time, there is a gradual increase, in predetermined steps, from the current state towards the upper limit value of FIG. 11(*e*). The cycle time intervals of FIG. 11(*a*) to (*e*) are only one example, and can be appropriately changed.

Next, the shooting operation of step #37 will be described using FIG. 6. This subroutine is started if the 1R switch is turned on, and the first thing to happen is that exposure information being displayed on the rear surface liquid crystal monitor 26 is turned off (#61). Next, a phase difference AF subroutine is executed (#63). In this subroutine, defocus direction and defocus amount of the photographing system 101 are detected using well-known phase difference AF, drive control for the optical system drive mechanism 107 is carried out based on this defocus direction and defocus amount, and focusing of the photographing optical system 101 is carried out.

If phase difference AF is completed, then similarly to step #9 it is determined whether or not bulb mode has been set (#65). If the result of determination is that bulb mode has not been set, metering and exposure value calculation are carried out, and exposure control values such as shutter speed and aperture value are obtained (#67).

On the other hand, if the result of determination in step #65 is that bulb mode has been set, step #67 is skipped and processing advances to step #69. In the case of bulb mode, as described previously, the time for opening and closing the shutter 213 is determined by the photographer, and metering and exposure value calculation are not required.

Next it is determined whether or not the shutter button 21 has been pressed down fully, that is, if the 2R switch is on (#69). If the result of determination is that the 2R switch is not on, it is then determined whether or not the 1R switch is on (#87). If the result of determination is that the 1R switch is not on, the shooting operation is terminated and the original routine is returned to. On the other hand, if the result of determination is that the 1R switch is on, step #69 is returned to, and a standby state is entered where the states of the 1R switch and the 2R switch are alternately detected.

If the result of determination in step #69 is that the 2R switch is on, processing transfers to a step for performing exposure. First a retraction operation for the movable mirror 201 (moving to the raised position) is carried out (#71). As a result, subject light flux is guided to the image sensor 221 by the photographing optical system 101. Next, a stopping down operation is instructed to the lens CPU 111 and a stopping down operation for the aperture 103 is carried out (#73).

As a result, it is possible to prepare entry to the normal exposure operation or the bulb exposure operation, and so an exposure operation is started (#75). Exposure is the starting of travel of the front curtain of the shutter 213, together with charge accumulation of the image sensor 221. If a time corresponding to the shutter speed acquired in step #67 or a shutter speed that was manually set by the photographer has elapsed, or if bulb exposure completion has been instructed by the photographer, travel of the rear curtain of the shutter 213 starts, and charge accumulation of the image sensor 221 is terminated.

At the time of this exposure operation, if bulb mode has been set, then while the release button 21 is being pressed down completely the shutter 213 is open, and at this time image data is repeatedly acquired using the image sensor 221 at intervals of the cycle time, and an image is displayed on the rear surface liquid crystal monitor 26 while being updated, based on this image data. This exposure will be described in detail later using FIG. 7.

If the exposure operation is completed, an instruction to open up the aperture 103 is output to the CPU 111, and the aperture 103 is opened up (#77). Then, the movable mirror 201 is restored to the lowered position (#79), and image processing is carried out for a normal image that is read out from the image sensor 221 and temporarily stored in the SDRAM 267 or added image data (#81). Image data that has been image processed is stored in the storage medium 277 (#83), and display of the image that was being displayed on the rear surface liquid crustal monitor is stopped (#85). Once image display 26 is stopped, the original routine is returned to.

Next, the exposure operation of step #75 will be described using FIG. 7. If this subroutine is entered, first, similarly to step #9, it is determined whether or not bulb mode has been set (#101). If the result of determination is that bulb mode has not been set, normal exposure mode, such as program exposure mode, is executed.

As the normal exposure mode, first a timer for exposure time timing is started (#103), and together with opening of the shutter 213 exposure to the image sensor 221 is commenced (#105). That is, photoelectric conversion of a subject image formed on the image sensor 221 is carried out, and accumulation of signal charge is commenced.

If exposure is started, it is next determined whether or not an exposure time (set time) corresponding to a shutter speed calculated in step #67 or set manually has elapsed (#107). If the result of determination is that the exposure time has elapsed, imaging on the image sensor 221 is stopped together with closing of the shutter 213 (#109).

Next, reading of image signals from the image sensor 221 is carried out (#111), and the read out image signals are temporarily stored in the SDRAM 267 (#113). Display of an exposed image is carried out on the rear surface liquid crystal monitor 26 based on the temporarily stored image signals (#115).

If the result of determination in step #101 is that bulb mode has been set, first of all data of the added image storage region (not shown) allocated inside the temporary storage section 293 is cleared (#120), a timer for display cycle time timing is started (#121), and similarly to step #105 imaging is commenced with the opening of the shutter 213 (#123). Next, it is determined whether or not the timer for cycle time timing has reached the cycle time set in step #31 (#125).

If the result of determination in step #125 is that the cycle time has not elapsed, it is determined whether or not the full pressing of the release button 21 has been released, that is, whether or not the 2R switch is off (#151). In the event that the 2R switch is on and the cycle time has not elapsed, a standby state is entered where the determinations at steps #125 and #151 are alternately executed.

If the result of determination in step #125 is that the cycle time has elapsed, image forming of the image sensor 221 is stopped with the shutter 213 still open, and reading of image signals is carried out (#127, #129). Image data resulting from digitalization of the read image signals is temporarily held in a newest image saving region inside the storage region of the temporary storage section 293 (#131). This holding of the data is temporary saving for the adding processing of read image data that will be executed later.

Next, the timer for cycle time timing is restarted (#133), and imaging on the image sensor 221 is commenced (#135). Following on, previously added image data stored in the added image storage region of the temporary storage section 293, and the above described newest image data, are added by the adding processing section 294. The result of adding processing is again stored in the added image storage region of the temporary storage section 293 (#137) and this stored added image is displayed on the rear surface liquid crystal monitor 26 (#139). If the added image is displayed, step #125 is returned to, and the previously described steps are executed.

If the photographer looking at the displayed image decides that the exposure level has reached an intended level, and full pressing of the release button 21 is released, that is, if the 2R switch is turned off, in accordance with the determination of step #151 processing advances from step #151 to step #153, and a transfer is made to processing for completion of the exposure operation.

That is, similarly to steps #109, #111 and #113, imaging stops together with closing of the shutter 213, image date is read out, and temporary holding of image data is carried out (#153, #155, #157). Then, similarly to steps #137 to #139, an added mage resulting from addition processing is acquired, and this added image is displayed after being stored (#159, #160, #161). Once the added image is displayed, the original routine is returned to.

In this way, every time the cycle time set in step #31 elapses (Y in step #125) imaging by the image sensor 221 is stopped, image signals are read in, added to already added image data stored in the temporary storage section and, as shown in FIG. 12, displayed on the rear surface liquid crystal monitor 26. At the point in time when the cycle time initially elapses, since cycle time is short a completely dark image results, and the image is gradually made brighter by adding image data each time the cycle time elapses. The photographer can determine whether or not an intended brightness has been reached by observing the rear surface liquid crystal monitor 26.

With this embodiment, if bulb mode has been set the imaging operation is repeated at intervals of the cycle time during the exposure operation, and image data is stored in the temporary storage section 293 every time the imaging operation is carried out, and an added image resulting from adding the stored image data is displayed on the rear surface liquid crystal monitor 26. This cycle time can be manually set using the setting section 298, and can be appropriately changed. It is therefore possible to carry out display updating at an effective timing according to the exposure conditions of the photographer's intentions.

Also in this embodiment, the cycle time is controlled to a set value so that an upper limit value and a lower limit value are not exceeded. As a result, it is possible to prevent use that exceeds the performance of the image sensor 221. Further, in this embodiment, the upper limit of the cycle time is varied in accordance with a dark current characteristic. This means that it is possible to carry out correction of image data in accordance with the dark current, and it is possible to give an image with less noise.

Next, a second embodiment of the present invention will be described using FIG. 13 to FIG. 15. With the first embodiment, the cycle time was manually set, but with the second embodiment the cycle time is automatically changed according to subject brightness. Also, imaging and image display are also repeatedly executed at intervals of the cycle time for the case of long time exposure.

Figure 3:
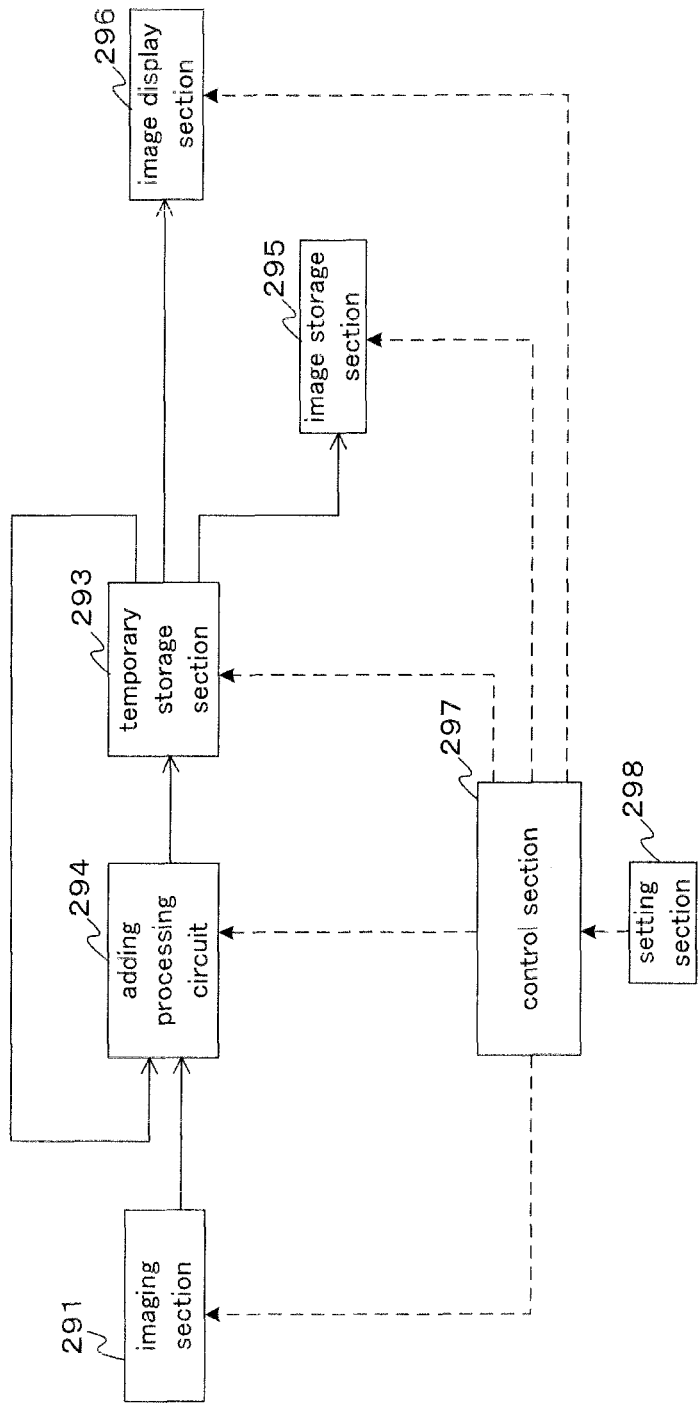
FIG. 3 is a block diagram showing in abstract form the structure relating to image forming and display in bulb mode etc., in a digital single lens reflex camera of the first embodiment of the present invention.
Figure 13:
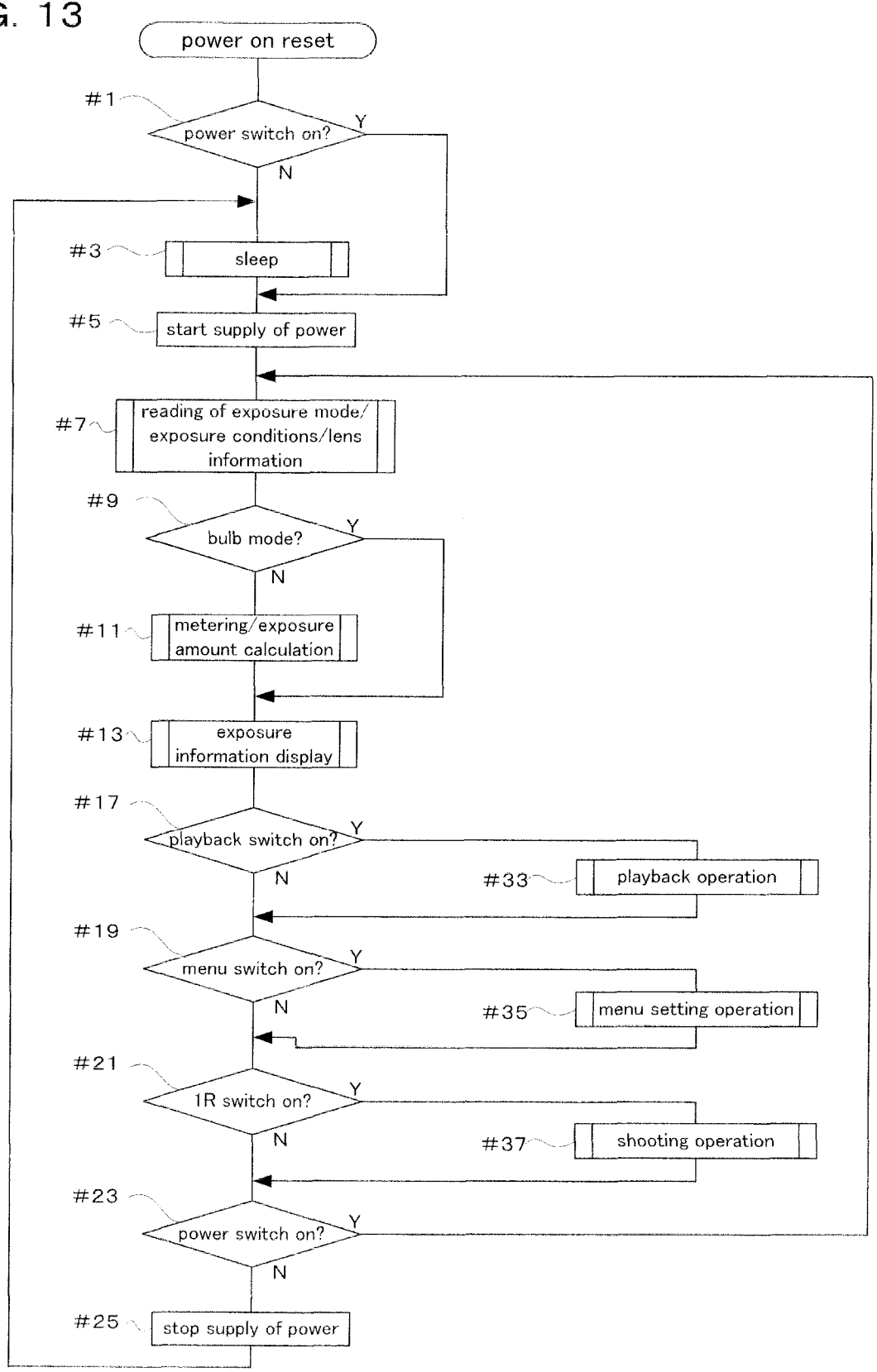
FIG. 13 is a flowchart showing a power-on reset operation of a second embodiment of the present invention.
Figure 14:
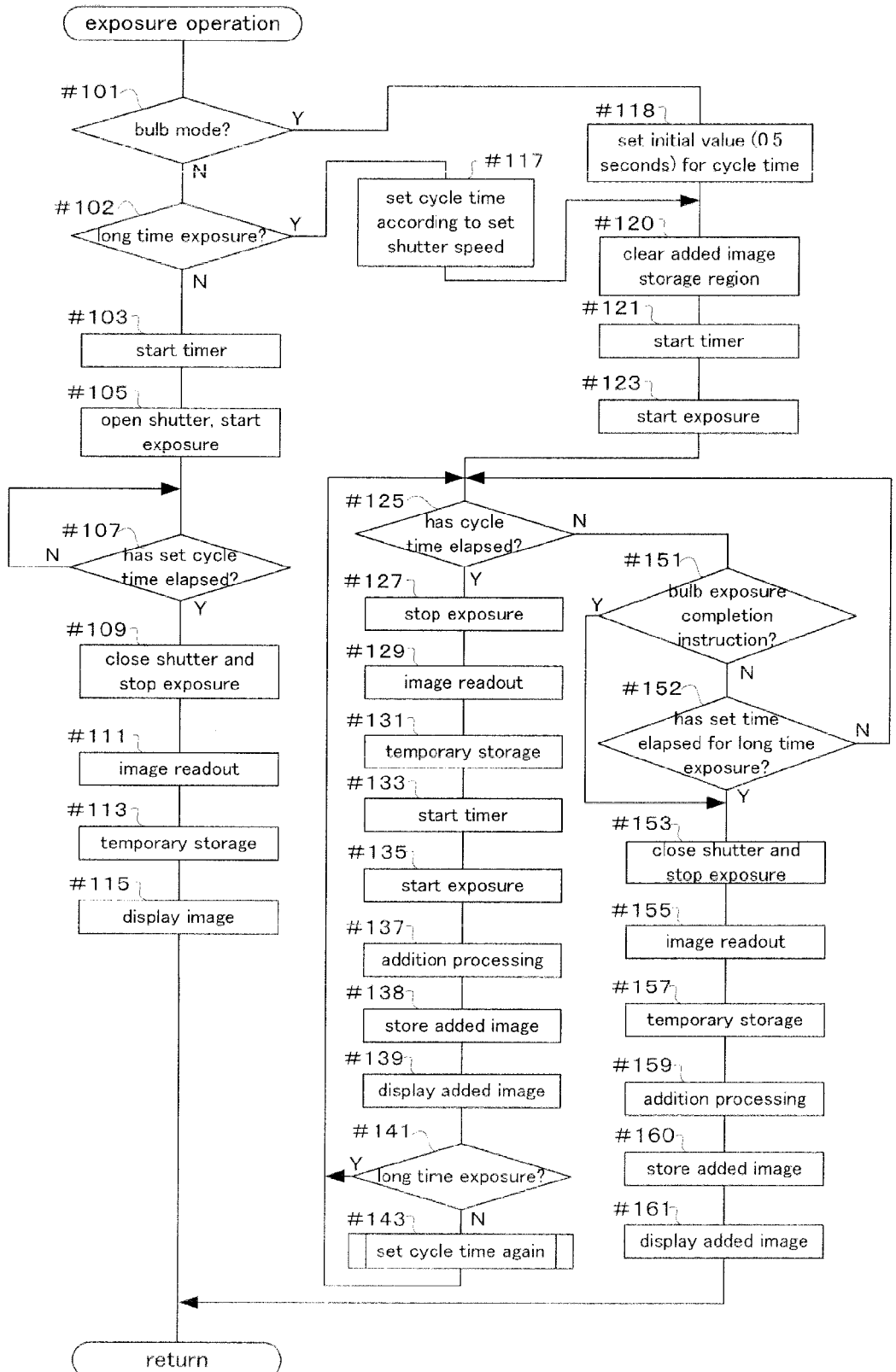
FIG. 14 is a flowchart showing an exposure operation of the second embodiment of the present invention.
Figure 15:
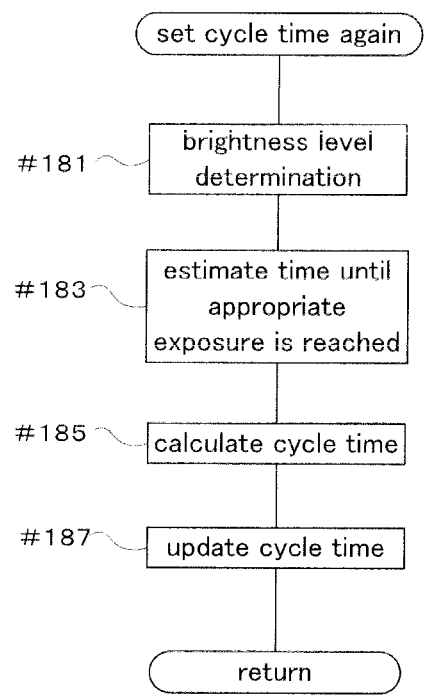
FIG. 15 is a flowchart showing resetting of cycle time in a second embodiment of the present invention.

The structure of the second embodiment is substantially the same as the structure of the first embodiment shown in FIG. 1 to FIG. 3, and the flowcharts shown in FIG. 4 to FIG. 7 are simply changed to the flowcharts shown in FIG. 13 to FIG. 15, with description centering on points of difference. The setting unit 298 of FIG. 3 is not manually set using the information setting dial 24 in the second embodiment, but is automatically set by the body CPU 251 etc.

FIG. 13 shows a power on reset operation performed by the body CPU 251 at the camera body 200 side. This flowchart has the same flow as the flowchart for power on reset shown in FIG. 4, except that the subroutine for cycle time input of step #31 is omitted, and so the same reference numerals will be used for the same steps, and detailed description will be omitted.

In the first embodiment, the cycle time input subroutine of step #31 was executed in order to manually set cycle time, but in the second embodiment the cycle time is automatically set based on subject brightness etc. and so step #31 is omitted. The shooting operation subroutine of step #37 is the same as the flowchart of FIG. 6 for the first embodiment.

Next, an exposure operation of step #75 within the subroutine for the shooting operation of step #37 will be described using FIG. 14. If this exposure operation subroutine is entered, it is determined whether or not the exposure mode is bulb mode (#101). If the result of determination is that it is not bulb mode, it is then determined whether or not it is a long time exposure (#102). Regarding whether or not it is a long time exposure, a long time exposure is determined if the shutter speed read in step #7 exceeds 30 second for example.

If the result of determination is that it is not a long time exposure, normal exposure is carried out. This normal exposure operation is the same as from step #103 to step #115 of FIG. 7, and the same steps have the same reference numerals, with detailed description thereof being omitted.

If the result of determination in step #101 is that bulb mode has been set, 0.5 seconds, for example, is set as an initial value for the cycle time (#118). Also, if the result of determination in step #102 is that a long exposure time has been set, the cycle time is set according to the set shutter speed (#117). As setting of the cycle time here, the cycle time is made 1/100th of the set shutter speed, for example.

If setting of cycle time is carried out in step #117 or step #118, then next the added image storage region of the temporary storage section 293 is cleared (#120), a timer for cycle time timing is started (#121), and imaging on the image sensor 221 is commenced (#123).

It is then determined whether or not the time of the time for cycle time timing has reached the set cycle time (#125). If the result of determination is that the cycle time has not elapsed, it is determined whether completion of bulb exposure has been instructed (that is, whether full pressing of the release button 21 has been released and the 2R switch turned off) (#151).

If the result of determination in step #151 is that the 2R switch is still on, it is determined whether the time set by the long time exposure has elapsed (#152). If the result of determination is that the set time has not elapsed, step #125 is returned to. In this way, in the case where the 2R switch is still on with both the cycle time and the set long time not elapsed, a standby state is entered where the determinations of steps #125, #151 and #152 are repeated.

Figure 7:
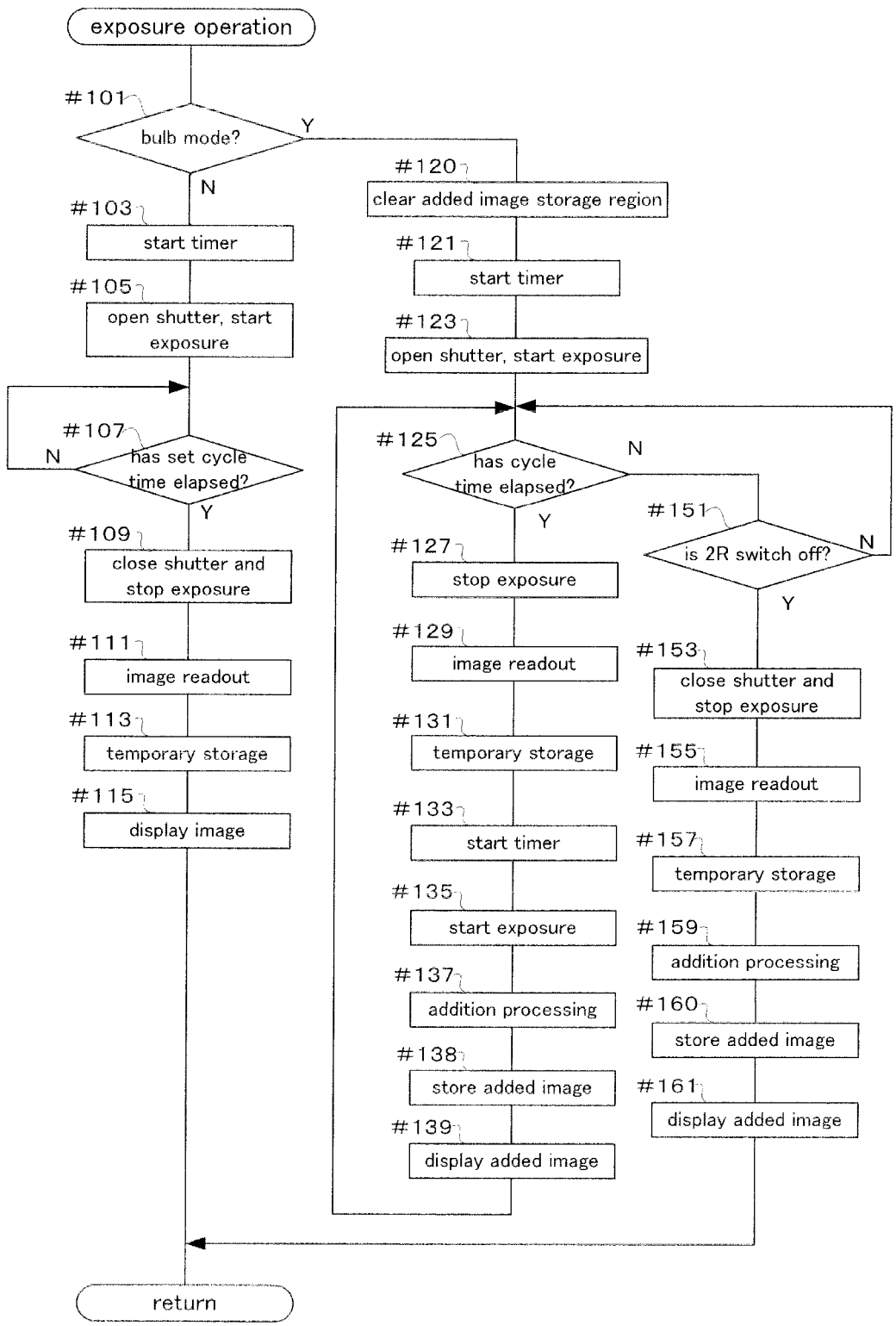
FIG. 7 is a flowchart showing an exposure operation of the first embodiment of the present invention.

If the result of determination in step #125 is that the cycle time has elapsed, then similarly to from step #127 to #139 in FIG. 7, image forming of the image sensor 221 is stopped with the shutter 213 still open (#127), and reading of pixel signals is carried out (#129).

Next, image data based on the read out pixel signals is temporarily stored in the temporary storage section 293 (#131), and after the timer for cycle time timing is restarted (#133) imaging is commenced (#135). Addition of temporarily stored image data and previously added image data is then carried out (#137), and this added image is stored again in the added image storage region of the temporary storage section 293 (#138), and then displayed (#139).

In this way, every time it is determined in step #125 that the cycle time has elapsed, similarly to the case of the first embodiment, together with reading of pixel signals from the image sensor 221, image data based on the image signals is stored in a storage region of the temporary storage section 293, and an overall added image is generated and displayed.

If display of the added image is carried out, next, similarly to step #102, it is determined whether or not there is a long time exposure (#141). If the result of determination is that there is a long time exposure, processing returns to step #125 and the operations described above are executed. On the other hand, if there is not a long time exposure, that is, in the event that bulb mode has been set, resetting of the cycle time is carried out (#143).

Cycle time when bulb mode has been set is set at an initial value in step #118, but this cycle time is subjected to automatic adjustment in step #143 so that cycle time is shortened when subject brightness is high, or extended when subject brightness is low. A subroutine for resetting of this cycle time will be described later using FIG. 15. Once resetting of cycle time has been carried out step #125 is returned to.

If the result of determination in step #151 is that there is a bulb exposure completion instruction, or if the result of determination in step #152 is that the set time has elapsed, processing for completing the exposure operation is carried out in steps #153 to #161. These steps are the same as FIG. 7, and the same steps have the same reference numerals, with detailed description thereof being omitted.

Next, a subroutine for resetting cycle time in step #143 will be described using FIG. 15. If this subroutine for resetting cycle time is entered, determination of brightness level is carried out (#181). As the brightness level, an average brightness of image data read out in step #129 is used. Generally, if brightness of each pixel of image data has an 8-bit resolution, the brightness level of each pixel is from 0 to 255. Average brightness is an average of those brightness levels for each pixel. Besides average brightness, it is also possible to appropriately use other metered calculations, such center-weighted brightness.

Using the obtained brightness level, prediction of exposure time is then carried out (#183) until correct exposure is attained. Here, correct exposure assumes the case where average of brightness level of each pixel is, for example, about 140. Accordingly, if the current average brightness level and the time taken to reach that brightness level are known, it is possible to estimate the time taken to attain correct exposure. If estimated time is obtained, calculation of cycle time is next carried out (#185).

As this calculation, for example, similarly to step #117, the estimated time is divided by 100. Cycle time is update based on the time obtained here (#187), and the original routine is returned to. If the processing flow for the exposure operation shown in FIG. 14 is returned to, in step #125 determination is made using the re-set cycle time, and imaging and display are carried out at this time interval.

In this way, in the second embodiment of the present invention, when in bulb mode it is possible to automatically re-set the cycle time according to subject brightness. It is therefore possible to carry out display updating at an effective timing according to subject brightness. Also, with a long exposure time, cycle time is automatically set according to the set time. It is therefore possible to carry out display updating at an effective timing according to the set time.

The set cycle time in steps #117 and step #120 are only examples, and can be appropriately changed. Also, with respect to the determination as to whether or not there is a long time exposure in step #102, the determination value for whether or not there is a long time can also be appropriately changed. Further, regarding setting of the cycle time in step #117, besides setting the cycle time simply by division, it is also possible to adopt various methods, such as, for example, dividing the long time into zones, and determining a set time for each zone.

In the first and second embodiments of the present invention, in the case of exposure in bulb mode or over a long time, the imaging section 291 is repeatedly operated at intervals of the cycle time, image data repeatedly output from the imaging section 291 is sequentially added, added image data is generated, and image display is carried out based on this added image data. The cycle time is set either manually or automatically. It is therefore possible to perform display update at an effective timing, and it is possible for the photographer to confirm the appearance of the shot as imaging progresses in bulb mode or over a long time.

Next, a third embodiment of the present invention will be described using FIG. 16 to FIG. 20. In the first and second embodiments, an added image was displayed from the start. However, for a short while after commencing exposure the screen will remain black and the photographer is unable to confirm whether or not exposure is being carried out, and may feel uneasy. With the third embodiment, in order to make it possible for the photographer to confirm that the exposure is in progress even in a period where the brightness level of a subject image immediately after starting the exposure is low, a notification display is carried out to show that bulb exposure etc. is in progress.

The structure of the third embodiment is partially similar to the structure of the first embodiment, and so parts of the structure that are the same will have detailed description omitted.

Figure 16:
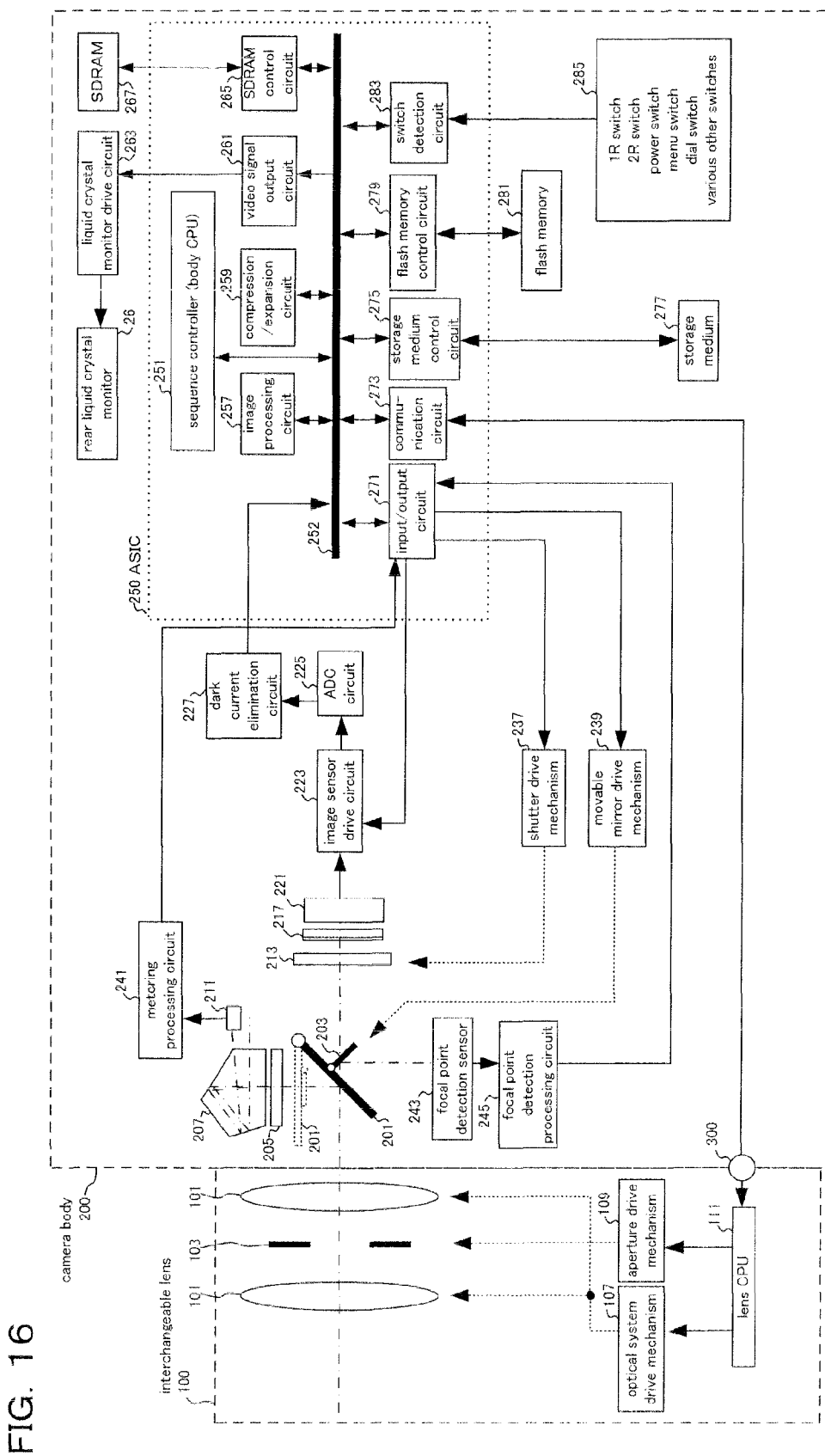
FIG. 16 is a block diagram showing the overall structure of electrical systems of a digital single lens reflex camera relating to a third embodiment of the present invention.

The external appearance of a digital single lens reflex camera of the third embodiment of the present invention is the same as in FIG. 1. Electrical circuits of this digital single lens reflex camera are shown in FIG. 16. Compared to the electrical circuits of the first embodiment (refer to FIG. 2), the third embodiment differs only in that the temperature measurement circuit 231 has been omitted. This is because in this embodiment, the function of determining an upper limit for cycle time according to surrounding temperature is omitted. In this embodiment also, it is obviously also possible to determine an upper limit of cycle time according to surrounding temperature, similarly to the first and second embodiments.

Figure 17:
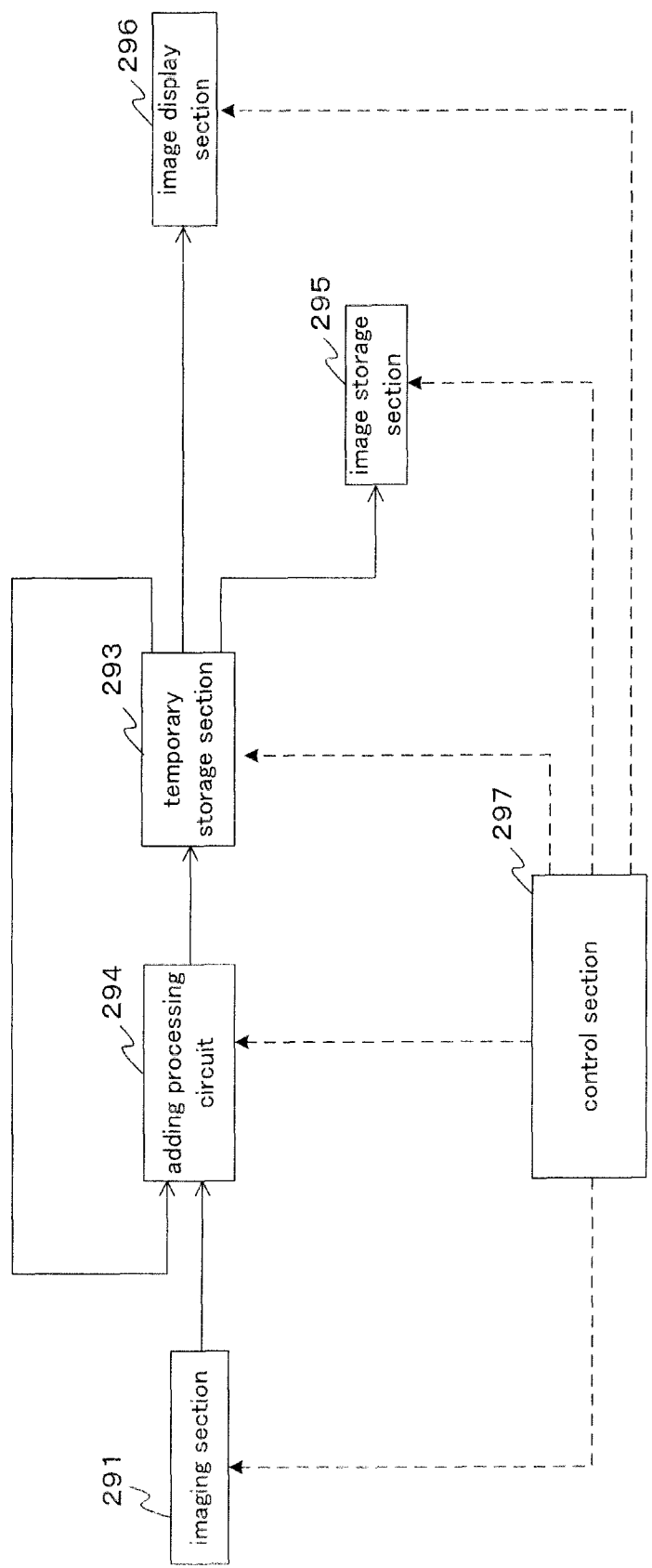
FIG. 17 is a block diagram showing in abstract form the structure relating to image forming and display in bulb mode etc., in a digital single lens reflex camera of the third embodiment of the present invention.

FIG. 17 shows a structure relating to image display during exposure, for bulb exposure. Compared to the first embodiment (refer to FIG. 3) there is a difference in that the setting section 298 is omitted. Naturally, the setting section 298 is also provided in the third embodiment, but as it is not important it has been omitted from FIG. 17.

With this type of arrangement, the control section 297 performs control so that image data that has been acquired by the imaging section 291 is sequentially added by the adding processing section 294 every set cycle time, and this added image is displayed on the image display section 296. Display by the rear surface liquid crystal monitor 26 at the time of bulb exposure involves first displaying notification information 320a at the time of starting bulb exposure (FIG. 20(a)), and displaying only notification information 320b within a specified period after that (FIG. 20(b)).

Also, image data is cumulatively added from the start of exposure, and an added image for bulb exposure is displayed once a specified brightness level has been reached, as shown in FIG. 20(c). At the stage of FIG. 20(c) the exposure time is insufficient and so the image is dark, but after that if the image gradually changes to a brighter image and images are repeatedly cumulatively added a number of times, it will become an image that appears over exposed, as shown in FIG. 20(g). The notification information 320c to 320g is also displayed in a superimposed manner during display of the added images. If this notification information 320c to 320g is also present during execution of bulb exposure, the elapsed time for the bulb exposure is displayed.

Next, detailed operation of the digital single lens reflex camera of the third embodiment of the present invention will be described using the flowcharts shown in FIG. 18 and FIG. 19. In the third embodiment also, if a battery is fitted, the processing flow for power on reset is executed. The processing flow for this power on reset is the same as in FIG. 4 for the first embodiment, and so detailed description will be omitted.

Processing flow for the cycle time input of step #31 in the processing flow of the power on reset (refer to FIG. 4) will be described using FIG. 18. The processing flow for this cycle time input differs from the processing flow of the cycle time input of the first embodiment (refer to FIG. 5) only in that step #41 (temperature detection) and step #43 (determination of cycle time upper limit value) are omitted. As described above, with this embodiment the temperature measurement circuit 231 is omitted, which means that steps #41 and #43 are omitted from the processing flow for cycle time input.

With this embodiment, the determination as to whether or not the cycle time has reached an upper limit at step #55 can be appropriately set, but it is possible, for example, to make 9 minutes a length of time that will not be affected by dark current. Apart from this, it is the same as the processing flow (FIG. 5) for cycle time input of embodiment one, and so detailed description will be omitted.

Next, the shooting operation of step #37 in the processing flow of the power on reset (refer to FIG. 4) is the same as the processing flow of the shooting operation in the first embodiment (refer to FIG. 6) and so detailed description is omitted.

Next, the exposure operation of step #75 in the processing flow for the shooting operation will be described using FIG. 19. In the description, steps carrying out the same processing as the flow of FIG. 7 for the first embodiment have the same step numbers attached, and detailed description thereof is omitted.

If the exposure operation processing flow is entered, it is first determined whether or not bulb mode has been set (#101). If the result of this determination is that bulb mode has not been set, normal exposure mode, such as program exposure mode, is executed in steps #103 to #115. This normal exposure mode processing is the same as for the flow of FIG. 7, and so detailed description is omitted.

If the result of determination in step #101 is that bulb mode has been set, then first the added image storage region that has been allocated inside the temporary storage section 293 is cleared (#119), and the cycle time that was manually input in step #31 is set (#120A). Next, a timer for display cycle time timing is started (#121), and similarly to step #105, together with opening of the shutter 213 imaging is commenced (#123).

Display of notification information such as is shown in FIG. 20(a) is then started (#124). That is, at the time bulb exposure commences, the screen is jet black, and if there is no display at all the photographer will be unsure as to whether or not the exposure using bulb exposure has started. In this embodiment therefore, by displaying the notification information 320a it is possible for the photographer to recognize that the exposure has started.

If the display of notification information has started, it is first determined whether or not the timer for cycle time timing has reached the cycle time set in step #120A (#125). If the result of determination is that the cycle time has not elapsed, it is determined whether or not the full pressing of the release button 21 has been released, that is, whether or not the 2R switch is off (#151). In the event that the 2R switch is on and the cycle time has not elapsed, a standby state is entered where the determinations at steps #125 and #151 are alternately executed.

If the result of determination in step #125 is that the cycle time has elapsed, then similarly to step #109 and step #111, image forming of the image sensor 221 is stopped with the shutter 213 still open, and reading of pixel signals is carried out (#127, #129).

Next 1 is added to the update counter (#130A). The update counter is reset at the same time as the timer is started in step #121, and every time this step #130A is passed through 1 is added. By multiplying a count value of this update counter by the cycle time set in step #120A, it is possible to obtain a cumulative time from when the exposure using bulb exposure started.

Next, the timer for cycle time timing is restarted (#131A), and imaging on the image sensor 221 is commenced (#133A).

Next, added image data is read from a storage region that was previously stored in the storage region of the temporary storage section 293 and adding processing for this image data and image data read out in step #129 is carried out (#135A). Image data of the added image obtained here is stored in a storage region of the temporary storage region 293 that is used for added image storage (#137A).

If accumulation of added images is completed, determination of brightness level is then carried out (#139A). The brightness level is determined based on image data read out in step #129. In this embodiment, since pixel signals are digitalized at a resolution of 8-bits, it is possible for the charge accumulation amount for each pixel to be expressed by a number from 0-255. This charge accumulation amount corresponds to the subject brightness level corresponding to that pixel, which means that if an average value for all pixels is obtained a brightness level for image data is obtained.

Next, it is determined whether or not the brightness level obtained in step #139A has reached a predetermined brightness level (#141A). In this embodiment the specified brightness level is made 20. The specified brightness level can obviously be appropriately varied according to how the added image display appears.

If the result of determination in step #141A is that the predetermined brightness level has not been reached, the notification information 320b, as shown in FIG. 20(b), is displayed (#147A). At this stage, the exposure amount from bulb exposure is insufficient, and it can be considered that even if the added image is displayed the screen will be unintelligible, and so, as shown in FIG. 20(b), the fact that bulb exposure is in progress and an elapsed time from the start of bulb exposure, are displayed.

This elapsed time is calculated based on a count value of the update counter obtained in step #130A, and set cycle time. If the display of notification information 320b is carried out, step #125 is returned to, and the previously described operations are executed. There is also no problem in providing a counter for obtaining cumulative exposure time when using bulb exposure, and displaying elapsed time based on this counter.

If the result of determination in step #141A is that the predetermined brightness level has been reached, an added image that has been added in step #135A is displayed (#143A). Specifically, by executing from step #125 to step #147A once or a plurality of times, the brightness level of the added image improves. If the result of determination is that the brightness level has reached the predetermined level, then since the image from bulb exposure has reached a level at which it can be displayed, an added image is displayed on the rear surface liquid crystal monitor 26.

The notification information 320c to 320g, as shown in FIG. 20(c) to FIG. 20(g), is displayed superimposed on the added image (#145A). The notification information 320c to 320g here is display of the fact that there is a bulb exposure, together with the elapsed time from commencement of the bulb exposure. The added image and the notification information continue to be displayed until the next cycle time has elapsed. If display is carried out, step #125 is returned to, and the previously described steps are executed.

If the result of determination in step #151 is that the full pressing of the release button 21 has been released, that is, it has been determined that the 2R switch has been turned off, then similarly to step #127 imaging is stopped together with closing of the shutter 213 (#153). Specifically, the exposure operation is completed, and after that the original routine is returned to.

Figure 20:
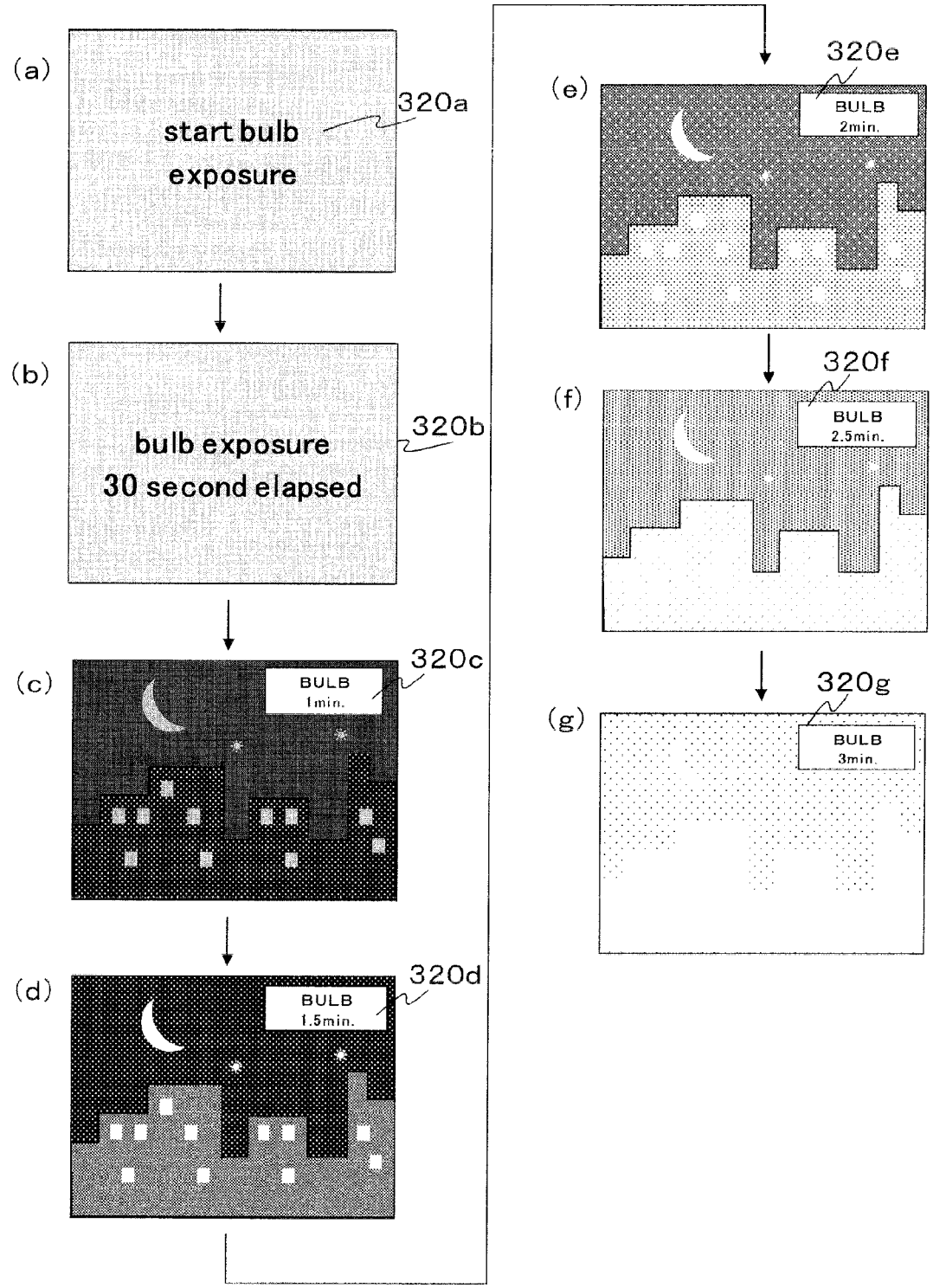
FIG. 20 shows display of bulb mode exposure time for the third embodiment of the invention, with FIG. 20(a) to FIG. 20(g) showing change with lapse of cycle time.

In this way, imaging by the image sensor 221 is stopped and image data output every time the cycle time that was set in step #31 (#120A) elapses (Y at #125). Addition processing for this image data and the previous added image being stored in the storage region of the temporary storage section 293 is carried out, and the result is stored in the storage region of the temporary storage section 293. The added image stored in each storage region is updated and displayed in the rear surface liquid crystal monitor 26 every time the cycle time elapses, as shown in FIG. 20. At the initial stages of exposure, since exposure amount is small an added image is not displayed. After that, by cumulatively adding image data every time the cycle time elapses, the image gradually becomes brighter. If image brightness reaches a predetermined level, an added image is displayed from then on.

Also, in this embodiment if bulb mode has been set, at the time of starting an exposure using bulb exposure an image acquired from the image sensor 221 is not displayed, and instead notification information 320a, 320b indicating that bulb exposure is in progress is displayed. It is therefore possible for the photographer to easily recognize that the exposure operation is progressing, even in a period where the brightness level of the image after exposure has started is low.

Further, in this embodiment, the fact that the elapsed time since the start of bulb exposure is displayed is extremely useful.

Figure 21:
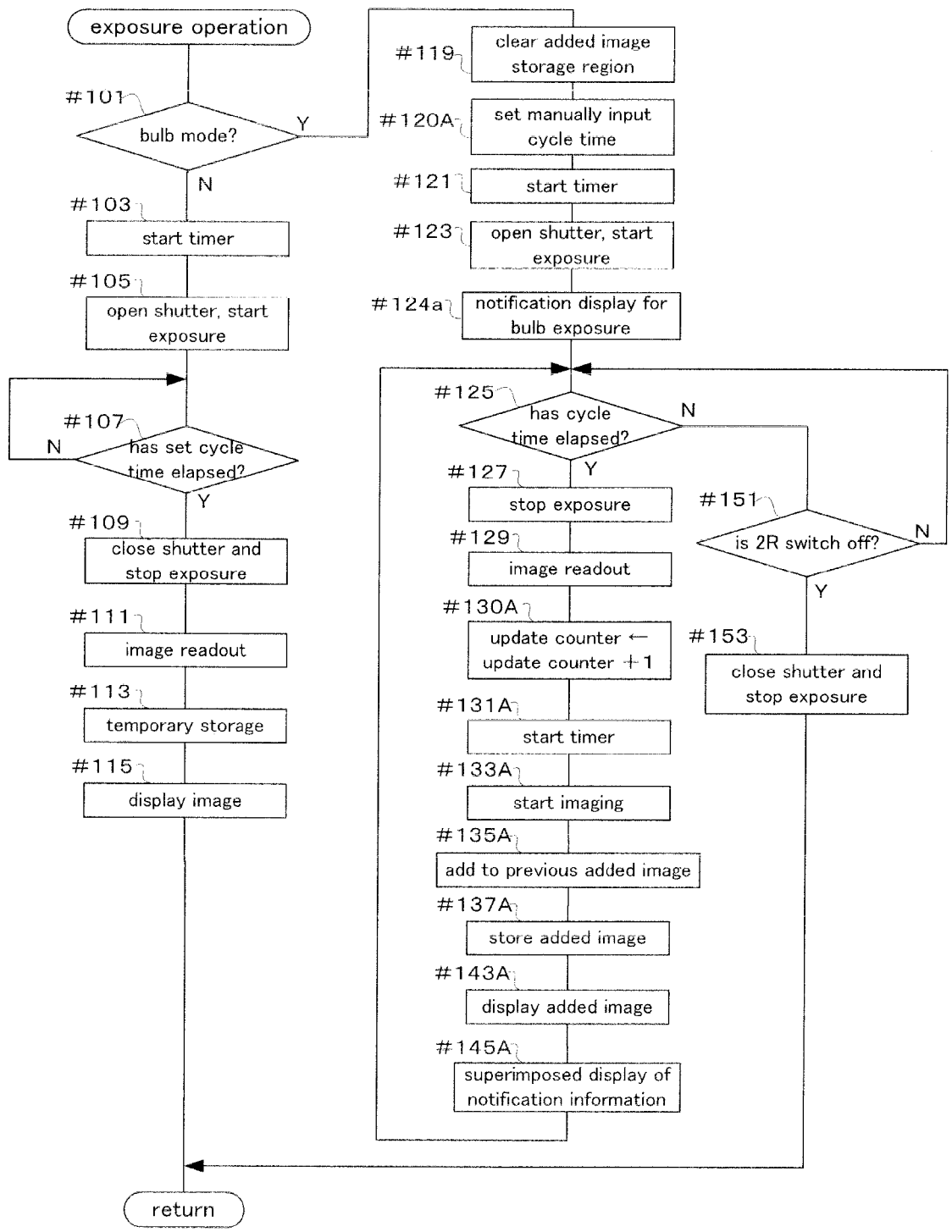
FIG. 21 is a flowchart showing an exposure operation of a fourth embodiment of the present invention.
Figure 22:
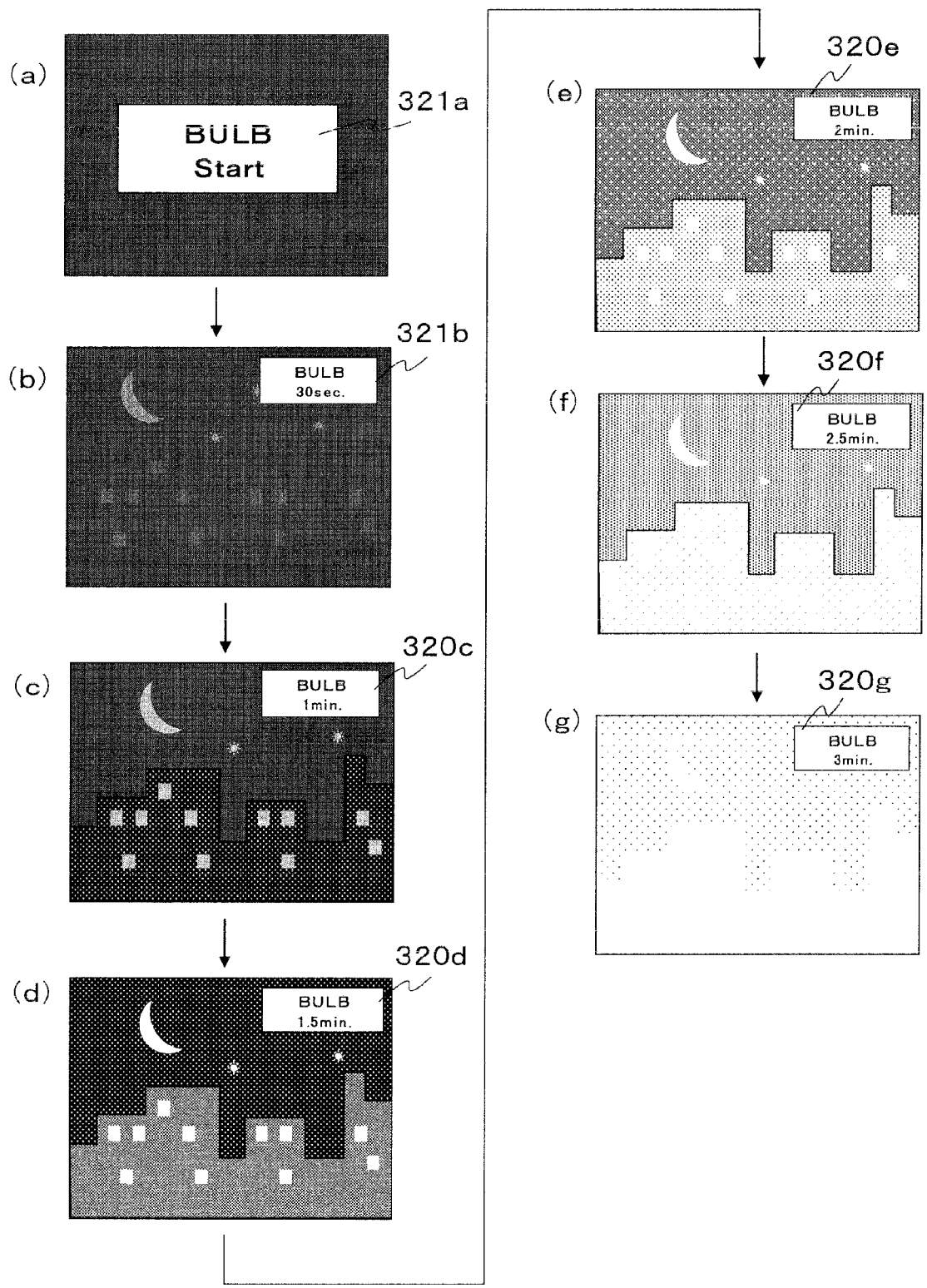
FIG. 22 shows display of bulb mode exposure time for the fourth embodiment of the invention, with FIG. 22(a) to FIG. 22(g) showing change with lapse of cycle time.

Next, a fourth embodiment of the present invention will be described using FIG. 21 and FIG. 22. In the third embodiment, if the added image reaches a predetermined brightness level display of the added image is carried out, but with the fourth embodiment only the notification display 321*a* is displayed until an initial cycle time elapsed, and if the initial cycle time elapses and an image is read, the image is displayed.

Figure 6:
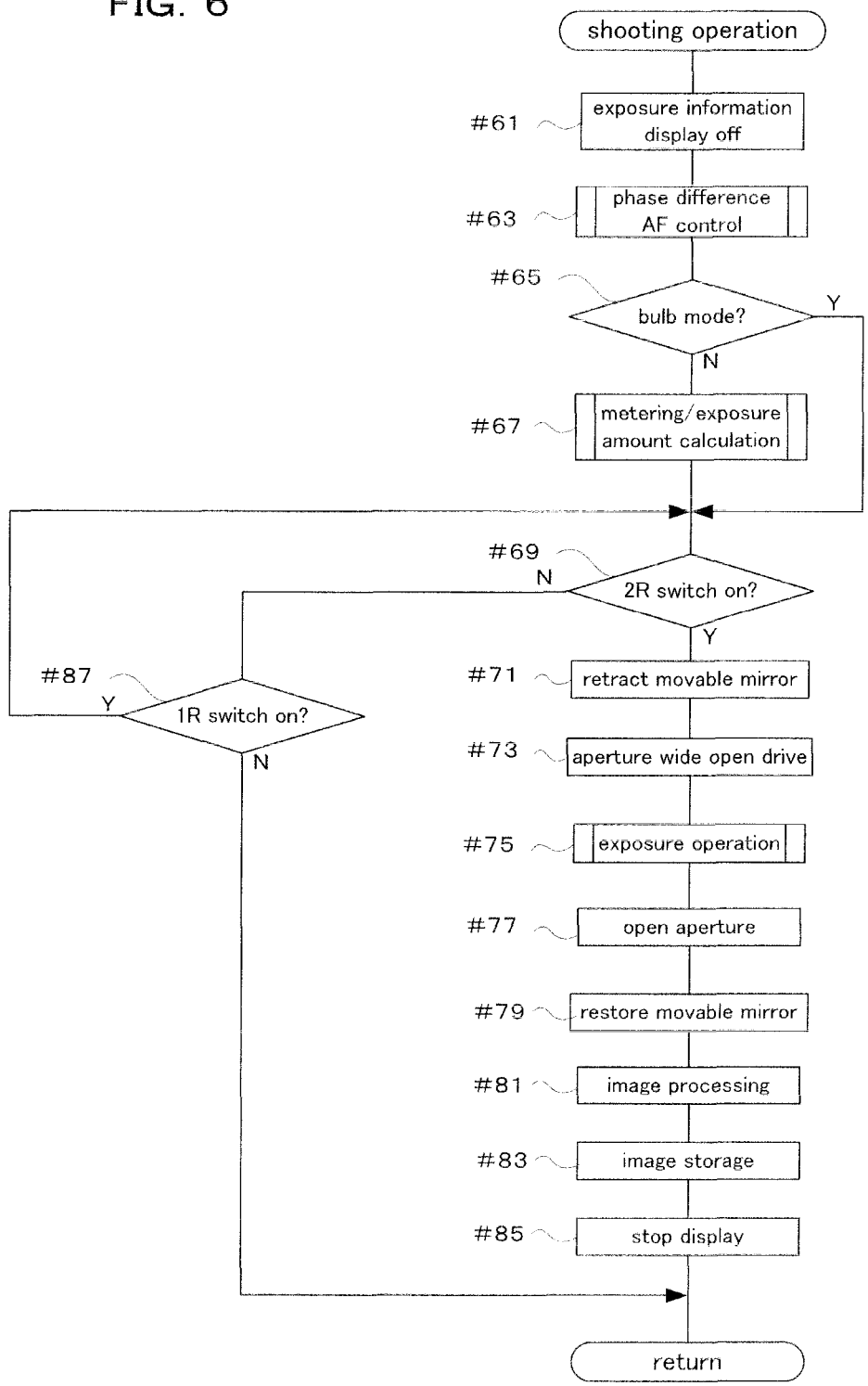
FIG. 6 is a flowchart showing a shooting operation of the first embodiment of the present invention.
Figure 11:
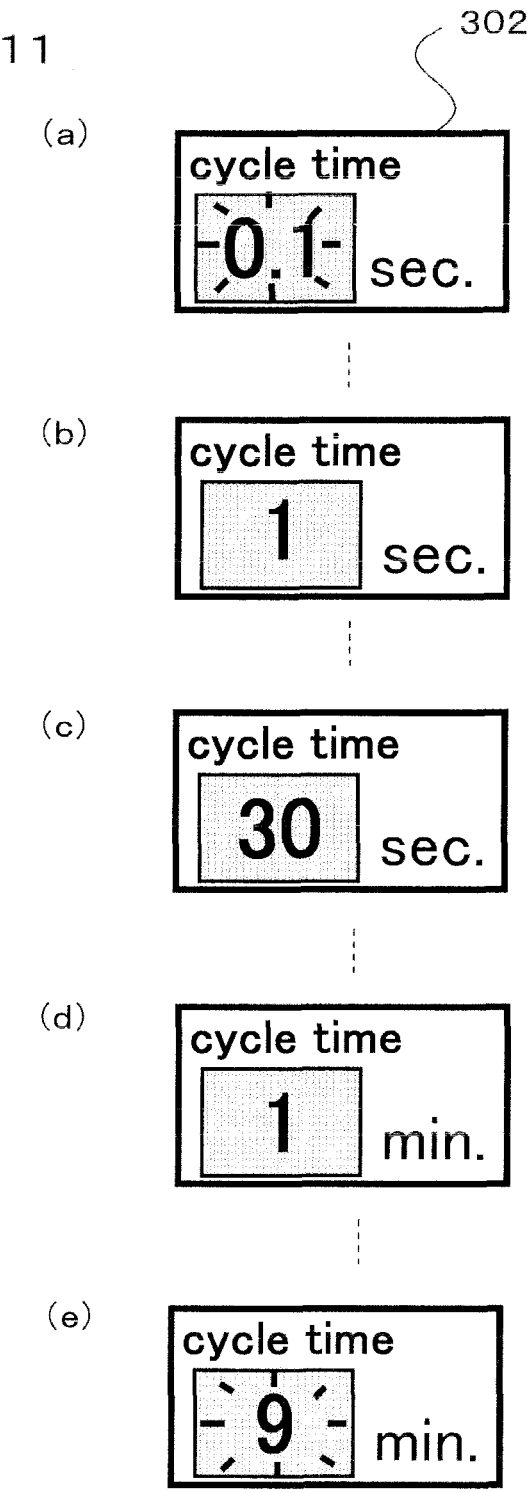
FIG. 11 shows update display for a digital single lens reflex camera of the first embodiment of the invention, with FIG. 11(a) to FIG. 11(e) showing display of respectively different cycle times.
Figure 18:
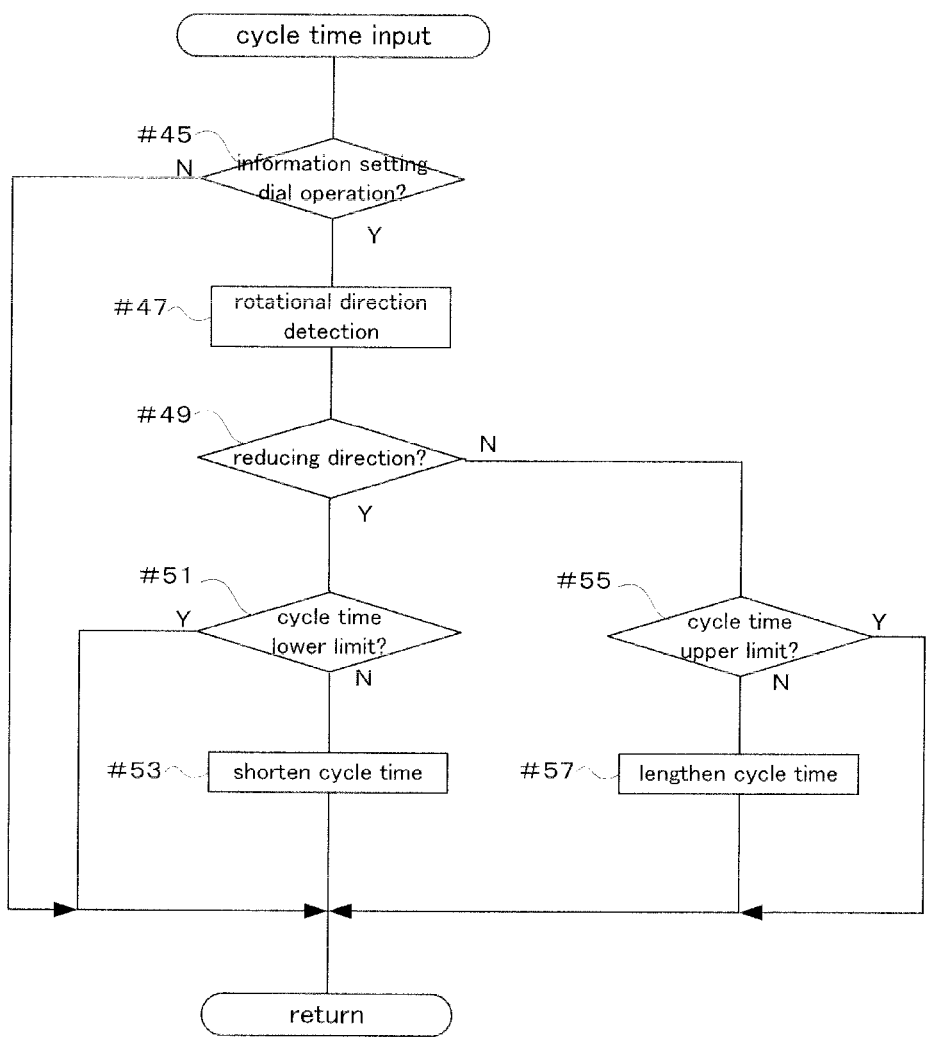
FIG. 18 is a flowchart showing a cycle time input operation of the third embodiment of the present invention.

The structure of the fourth embodiment is the same as that of the third embodiment, the flowcharts shown in FIG. 4, FIG. 6, and FIG. 18 are also the same, and the exposure information display shown in FIG. 10 and the cycle time display shown in FIG. 11 are also the same. The point of difference is that the flowchart showing the exposure operation shown in FIG. 19 is replaced with the flowchart in FIG. 21, and description will center on this difference. Each of the steps within the flowchart shown in FIG. 21 that are the same as the steps in the flowchart shown in FIG. 19 have the same reference numerals attached, and detailed description thereof is omitted.

Figure 19:
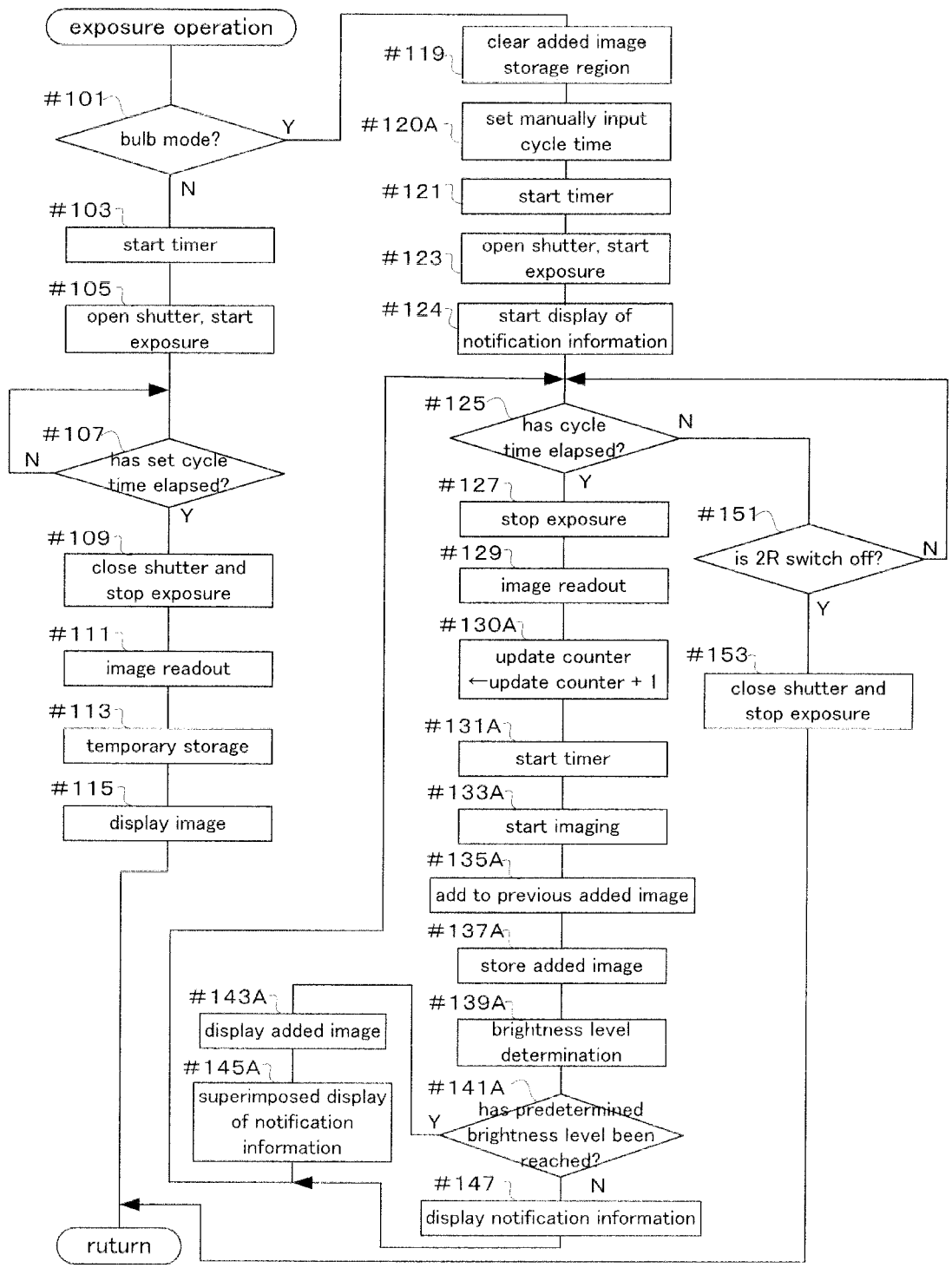
FIG. 19 is a flowchart showing an exposure operation of the third embodiment of the present invention.

If the processing flow for the exposure operation is entered, it is determined whether or not it is bulb mode (#101), and in the event that bulb mode has not been set, then similarly to the third embodiment shown in FIG. 19, a normal exposure mode, such as program exposure mode, is carried out. On the other hand, if bulb mode has been set, then similarly to the third embodiment from step #119 to step #123 is executed. Next, notification display for bulb exposure is carried out (#124*a*). This notification display can be the same display as in FIG. 20(*a*), but in this embodiment notification display 321*a* as shown in FIG. 22(*a*) is carried out.

If the notification display 321*a* for bulb exposure is carried out, it is next determined whether or not the cycle time has elapsed (#125). If the result of determination is that the cycle time has not elapsed, then similarly to the third embodiment a state is entered where the determinations at steps #125 and #151 are alternately executed. On the other hand, if the cycle time has elapsed, then similarly to the third embodiment from step #127 to step #137A are executed.

After that, in the third embodiment determination of the brightness level of the added image etc. was carried out, but with this embodiment display of the added image is carried out regardless of the brightness level (#143A). Specifically, since the cycle time has elapsed and reading of an image from the image sensor 221 is carried out, this read image is displayed immediately. The notification information 321*b* and 320*c* to 320*g*, as shown in FIG. 22(*b*) to FIG. 22(*g*), is then displayed superimposed on the added image (#145A).

If the added image and the notification information 321*b* and 320*c* to 320*g* is displayed, step #125 is returned to, the previously described operations are executed, and similarly to the first embodiment the added image and the notification displays 321*b* and 321*c* to 320*g* are updated and displayed every time the cycle time elapses.

If the 2R switch is turned off, then as with the third embodiment the shutter is closed, the imaging operation is stopped, and the original routine is returned to.

In this way, with the fourth embodiment of the present invention a predetermined period from start of the bulb exposure displays that the bulb exposure is being executed. It is therefore possible for the photographer to easily recognize that the exposure is being carried out immediately after commencement of bulb exposure. Also, if an image is read out after the initial cycle time has elapsed, the acquired image is immediately displayed, which means that it is possible to confirm the exposure state using bulb exposure from the initial stage.

In the fourth embodiment, at the point in time where the cycle time initially elapses, an image read from the image sensor 221 is displayed, but it is also possible to have an arrangement where an image is displayed at the point in time where the cycle time elapses a second and subsequent time, and only a notification display is displayed up to then.

With the third and fourth embodiments of the present invention, a specified period from start of the bulb exposure displays that the bulb exposure is being executed on the rear surface liquid crystal monitor 26, which is a display section. It is therefore possible for the photographer to easily recognize that the exposure operation is progressing, even in a period where the brightness level of the exposed image immediately after exposure has started is low.

In the third and fourth embodiments, as notification information there are display indicating bulb exposure and display of the elapsed time from the start of bulb exposure, but it is also possible to omit the elapsed time. Also, the characters "bulb exposure" and "BULB" are displayed in order to indicate that bulb exposure has commenced, but this is not limiting and it is also possible to have another display such as a symbol or an icon.

Also, with the third and fourth embodiments in the case where the exposure operation is completed, if imaging is stopped in step #153 (FIG. 19, FIG. 21) the original routine is returned to. However, because the imaging section 291 accumulates signal charge on the image sensor 221, it is also possible, similarly to step #155 in FIG. 7 of the first embodiment, to read these signals, generate an added image, and display the added image.

Further, with the third and fourth embodiments, when bulb mode has been set added images are generated, but it is also possible to generate and display added images in the case where long time exposure is carried out, for example, exposure of a few seconds. This approach can also be similarly adopted in other embodiments.

Still further, with the third and fourth embodiments, in step #31 the cycle time is manually set, but this is not limiting and it is also completely possible, similarly to the second embodiment for example, to automatically set the cycle time according to subject brightness, so as to either shorten the cycle time if the brightness is high, or conversely to extend the cycle time if the brightness is low.

Next, a fifth embodiment of the present invention will be described using FIG. 23 to FIG. 27. In the first to fourth embodiments, because added images etc. are displayed at the time of a long time exposure such as bulb exposure, the rear surface liquid crystal monitor 26 was in a display state during long time exposure However, bulb exposure lasts over a comparatively long time, which means that the photographer must watch the display screen the entire time. Also, a display device for image display used with an imaging device such as a camera has comparatively high power consumption, and so if the display state is maintained during execution of bulb exposure the power supply batteries will be used up in a short time.

With this embodiment therefore, in connection with update of an added image, the display screen is only illuminated for a predetermined time, and for a long time exposure such as bulb exposure the photographer can observe without becoming fatigued.

The structure of the fifth embodiment is partially similar to the structure of the first and third embodiments, and so detailed description of parts of the structure that are the same will be omitted.

Figure 23:
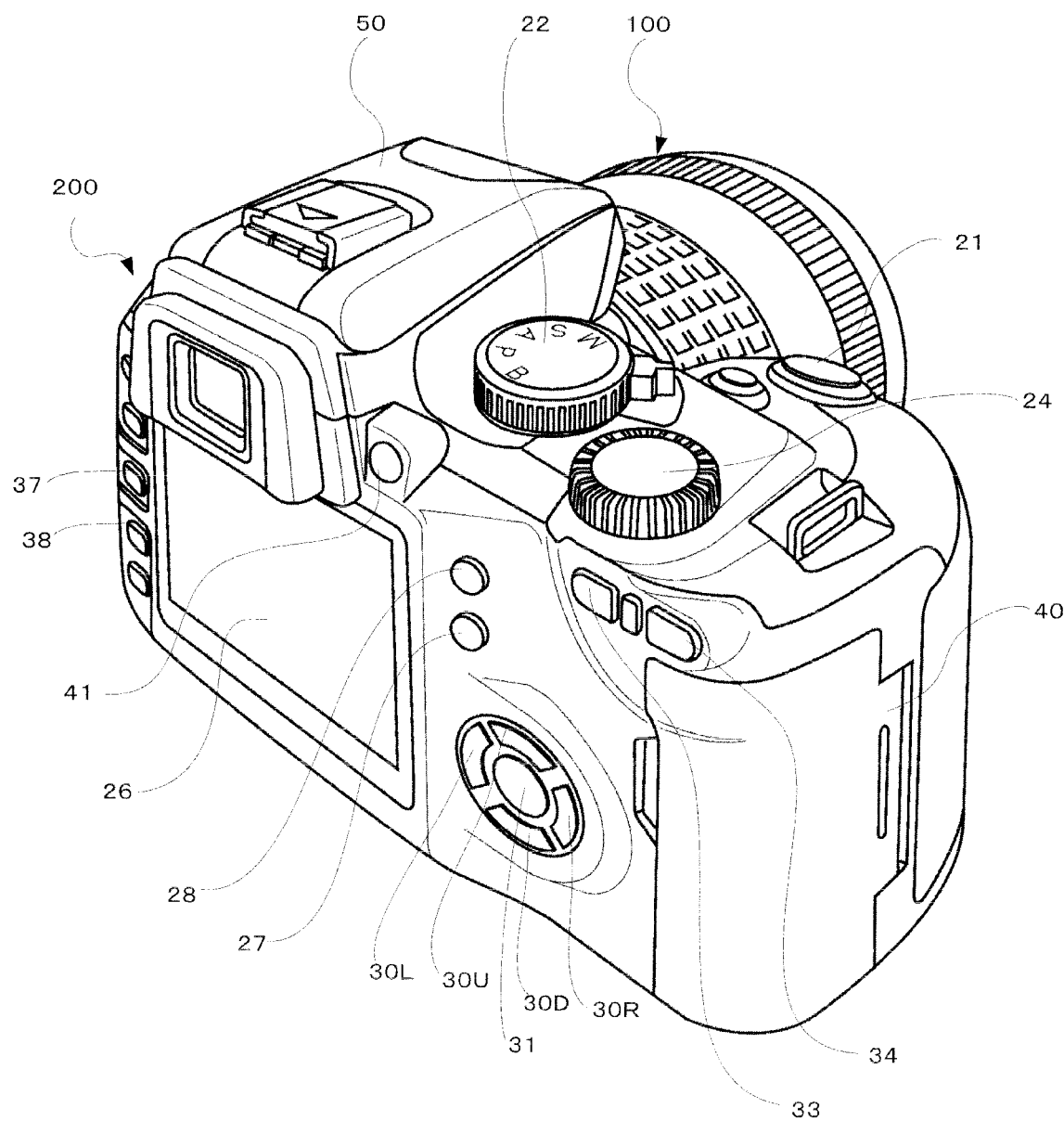
FIG. 23 is an external perspective drawing looking at a digital single lens reflex camera of a fifth embodiment of the present invention from a rear surface.

FIG. 23 is an external perspective drawing looking at a digital single lens reflex camera of the fifth embodiment from a rear surface side. It is different from the digital single lens reflex camera of the first embodiment shown in FIG. 1 only in that an LED (Light Emitting Diode) 41 for bulb display is arranged.

Specifically, a bulb display LED (Light Emitting Diode) 41 is arranged close to the viewfinder eyepiece on the rear surface of the camera body 200. This bulb display LED 41 is lit up during execution of bulb exposure, and shows that bulb exposure is in progress to the user. The remaining members are the same as for the digital single lens reflex camera shown in FIG. 1, and the same members have the same reference numerals, with detailed description being omitted.

Figure 24:
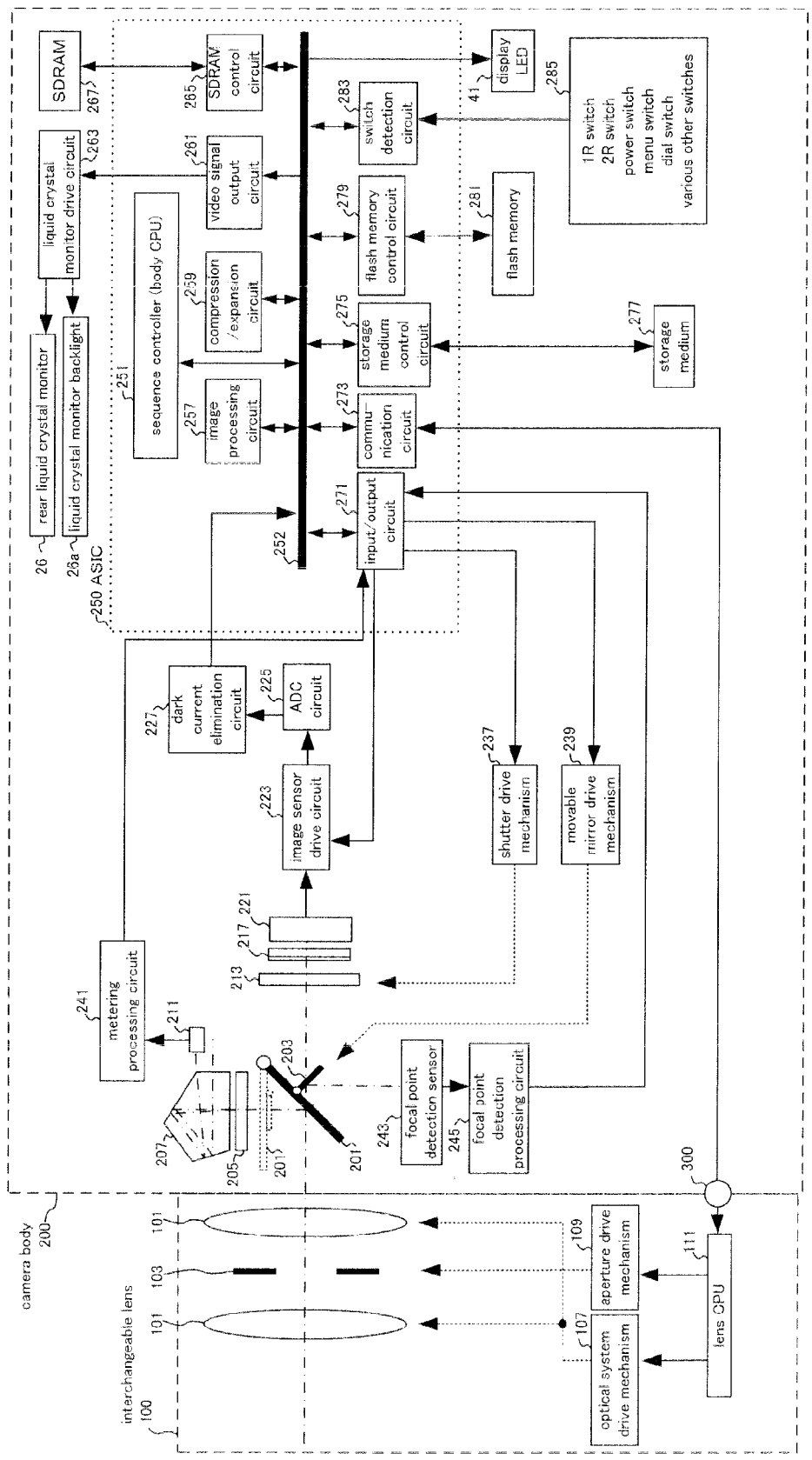
FIG. 24 is a block diagram showing the overall structure of electrical systems of a digital single lens reflex camera relating to the fifth embodiment of the present invention.

FIG. 24 is a block diagram showing electrical circuits of the digital single lens reflex camera of the fifth embodiment. Compared to the electrical circuits of the first embodiment (refer to FIG. 2), the fifth embodiment differs only in that the temperature measurement circuit 231 has been omitted, and the display LED 41 and a liquid crystal monitor backlight 26a are added.

The omission of the temperature measurement circuit 231 is the same as in the third embodiment shown in FIG. 16. Also, the display LED 41 connected to the data bus 252 is lit up in response to a light up command from the body CPU 251, and turned off in response to a turn off command.

The liquid crystal monitor backlight 26a for illuminating the rear surface liquid crustal monitor 26 is arranged at the rear surface side of the rear surface liquid crystal monitor 26, and is drive controlled by the liquid crystal monitor drive circuit 263. The structure other than for the points of difference described above is the same as for the first embodiment shown in FIG. 2, and so detailed description will be omitted.

Figure 25:
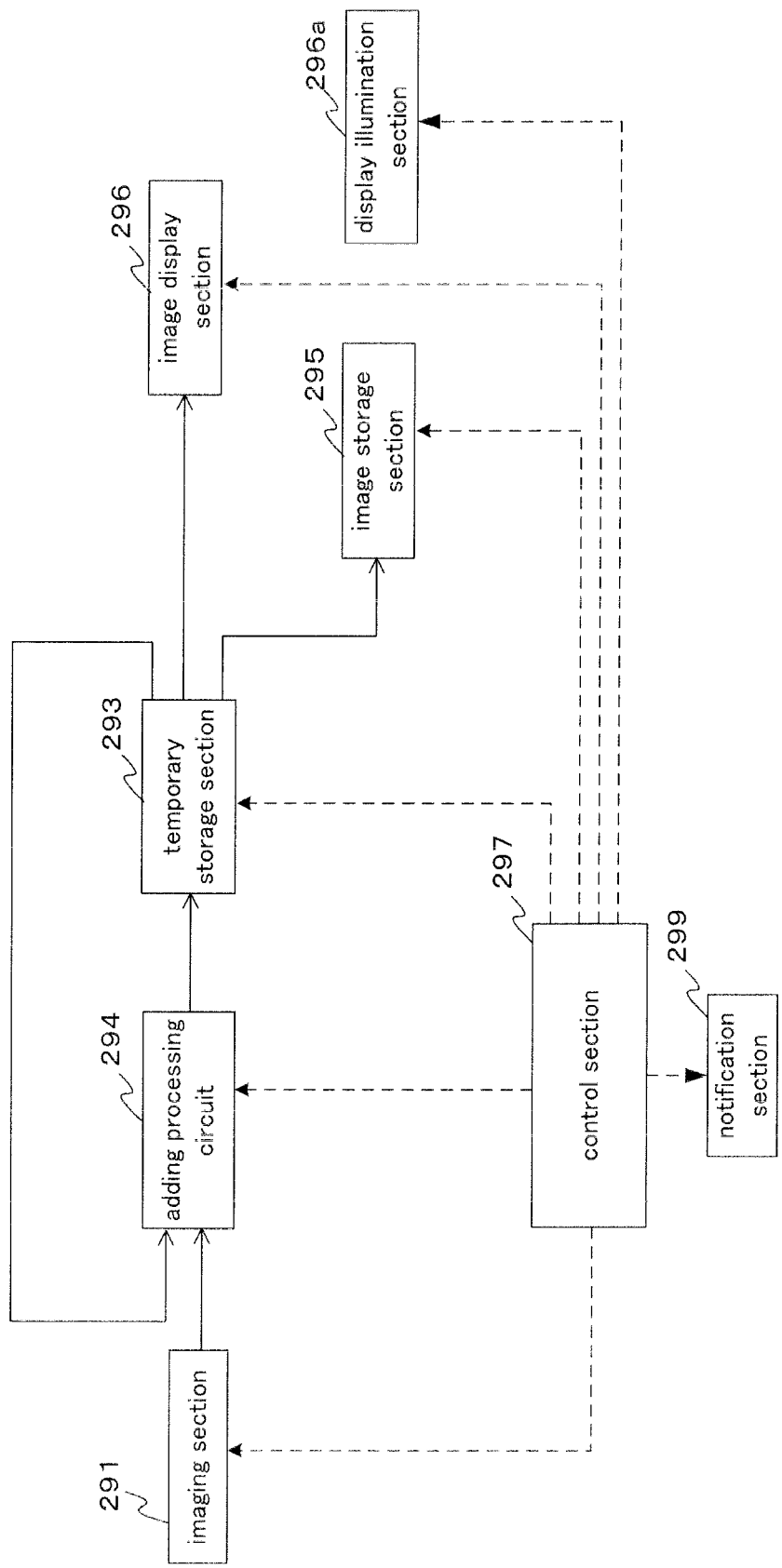
FIG. 25 is a block diagram showing in abstract form the structure relating to image forming and display in bulb mode etc., in a digital single lens reflex camera of the fifth embodiment of the present invention.

FIG. 25 shows a structure relating to image display during exposure, for bulb exposure. Compared to the first embodiment (refer to FIG. 3) there is a difference in that a display illumination section 296a and a notification section 299 are provided.

Specifically, the display illumination section 296a is comprised of the liquid crystal monitor backlight 26a and the liquid crystal monitor drive circuit 263, and performs illumination of the image display section 296, so it is possible for the photographer to easily observe the image display section 296 even in a dark place. The notification section 299 is comprised of the display LED 41 etc., which is lit up during bulb exposure to notify the photographer. The notification section 299 is not limited to an LED, and can be another display element such as a lamp.

With this type of arrangement, the control section 297 performs control so that image data that has been acquired by the imaging section 291 is sequentially added by the adding processing section 294 every set cycle time, and this added image is displayed on the image display section 296. Display on the rear surface liquid crystal monitor 26 at the time of bulb exposure is first displaying notification information 330a on the rear surface liquid crystal monitor 26 at the time of commencement of bulb exposure (FIG. 27(a)), and the notification section 299 lighting up.

Also, image data from the start of exposure is cumulatively added, and an added image is displayed on the rear surface liquid crystal monitor 26 every time the cycle time elapses, as shown in FIG. 27(b) to FIG. 27(g). At the stage of FIG. 27(b) the exposure time is insufficient and so the image is dark, but after that if the images are repeatedly cumulatively added a number of times it gradually changes to a brighter image, it will become an image that appears slightly over exposed, as shown in FIG. 27(g).

Further, at the time the cycle time elapses, the image display section 296 is illuminated by the display illumination section 296a from the time of update for a predetermined time, and it possible to easily view the added image displayed on the rear surface liquid crystal monitor 26. If a predetermined time elapses, illumination by the display illumination section 296a is turned off, and after that if the cycle time elapses again illumination by the display section illumination section 296a is recommenced. In this way, it is possible for the display illumination device 296a to not always be on, and to reduce power consumption. Also, during bulb exposure, since the notification section 299 is always in a display state, it is possible for the photographer to easily confirm that the bulb exposure is being executed.

Next, detailed operation of the digital single lens reflex camera of the fifth embodiment of the present invention will be described using the flowchart shown in FIG. 26. In the fifth embodiment also, if a battery is fitted, the processing flow for power on reset is executed. The processing flow for this power on reset is the same as in FIG. 4 for the first embodiment, and so detailed description will be omitted.

Also, cycle time input of step #31 in the processing flow of the power on reset (refer to FIG. 4) is the same as the processing flow of the cycle time input in the third embodiment (refer to FIG. 18) and so detailed description is omitted. Also, the shooting operation of step #37 in the processing flow of the power on reset (refer to FIG. 4) is the same as the processing flow of the shooting operation in the first embodiment (refer to FIG. 6) and so detailed description is omitted.

Next, the exposure operation of step #75 within the shooting operation processing flow (FIG. 6) will be described using FIG. 26. In the description, steps carrying out the same processing as the flow of FIG. 7 for the first embodiment have the same step numbers attached, and detailed description thereof is omitted.

If this processing flow is entered, first, similarly to step #9 (refer to FIG. 4), it is determined whether or not bulb mode has been set (#101). If the result of determination is that bulb mode has not been set, normal exposure mode, such as program exposure mode, is executed. Processing in normal exposure mode of step #103 to step #115 is similar to that of the first embodiment shown in FIG. 7, and so detailed description will be omitted.

If the image display of step #115 is carried out there is display of an exposed image and the liquid crystal monitor backlight 26a is lit up, to illuminate the rear surface liquid crystal monitor 26 (#116). If lighting up of the liquid crystal monitor backlight 26a is carried out, the original routine is returned to.

If the result of determination in step #101 is that bulb mode has been set, then the added image storage region that has been allocated inside the temporary storage section 293 is cleared (#118B), and the cycle time that was manually input in step #31 is set (#119B). Next, a timer for display cycle time timing is started (#120B), and similarly to step #105, together with opening of the shutter 213 imaging is commenced (#121B).

Next, the bulb display LED 41 is lit up, to display the fact that the bulb exposure has commenced (#122B). This bulb display LED 41 is always kept on during bulb exposure, until it is turned off in step #173B, which will be described later.

Display of notification information 330a for bulb exposure, such as is shown in FIG. 27(a) is then started (#123B). That is, at the time bulb exposure commences, the screen is jet black, and if there is no display at all the photographer will be unsure as to whether or not the exposure using bulb exposure has started. In this embodiment therefore, by displaying the notification information 330a it is possible for the photographer to recognize that the exposure has started. Next, the liquid crystal monitor backlight 26a is lit up (#124B) to illuminate the rear surface liquid crystal monitor 26, making it possible for the photographer to easily view the added image.

If the backlight is lit up, it is next determined whether or not the timer for cycle time timing has reached the cycle time set in step #119 (#125). If the result of determination is that the cycle time has not elapsed, it is determined whether or not the full pressing of the release button 21 has been released, that is, whether or not the 2R switch is off (#151).

If the result of determination in step #151 is that the 2R switch is off, it is determined whether or not 10 seconds has elapsed from commencement of lighting up the liquid crystal monitor backlight 26a (#155B). In this embodiment, a time is provided that starts a timing operation in synchronization with lighting up of the liquid crystal monitor backlight 26a, and in this step determination is made based on the time measured by this timer.

If the result of determination in step #155B is that 10 second has not elapsed, then step #125 is returned to and a standby state is entered where the determinations of step #125, step #151 and step #155 are repeatedly carried out. On the other hand, if the result of determination in step #155B is that 10 second have elapsed, then it is determined whether or not the cycle time that was set in step #119B is 30 seconds or more (#157B). If the result of determination is less than 30 seconds, processing returns to step #125 and the operations described above are executed.

On the other hand, if the result of determination in step #157B is that the set cycle time is 30 seconds or more, illumination by the liquid crystal monitor backlight 26a is turned off (#159B). In this embodiment, if the set cycle time is 30 seconds or more, then every time the added image is updated the liquid crystal monitor backlight 26a is lit up for 10 seconds, and the rear surface liquid crystal monitor 26 is illuminated. Once 10 seconds elapses, the liquid crystal monitor backlight 26a is turned off. Also, if the set cycle time is less than 30 seconds, the liquid crystal monitor backlight 26a is kept turned on.

In step #157B, determining whether or not to turn off the backlight according to the set cycle time is because if the length of time the backlight is on is made 10 seconds, in the event that the set cycle time exceeds 10 seconds but is less than 30 seconds the backlight will be repeatedly turned on and off in a short period of time, causing illumination flicker, and making it difficult to view the screen of the rear surface liquid crystal display monitor 26. The set time in step #157B (30 seconds) and the set time in step #155 (10 seconds) are only illustrative examples, and they can be appropriately changed taking into consideration reducing power supply consumption and ease of viewing the display.

If the result of determination in step #125 is that the cycle time has elapsed, then similarly to step #109 and step #111, image forming of the image sensor 221 is stopped with the shutter 213 still open, and reading of pixel signals is carried out (#127, #129). Next, the timer for cycle time timing is restarted (#130B), and imaging on the image sensor 221 is commenced (#131B).

Next added image data is read from a storage region that was previously stored in the storage region of the temporary storage section 293, and adding processing for this image data and image data read in step #129 is carried out (#133B). Image data of the added image obtained here is stored in a storage region of the temporary storage region 293 that is used for added image storage (#135B).

An added image that has been added in step #135B is then displayed on the rear surface liquid crystal monitor 26 (#137B), the liquid crystal monitor backlight 26a is lit up, and the rear surface liquid crystal monitor 26 is illuminated (#139B). If lighting up of the backlight is carried out, step #125 is returned to, and the previously described operations are executed By executing from step #125 to step #139B a plurality of times, the brightness level of the added image improves, as shown in FIG. 27(b) to FIG. 27(g).

The photographer will release the full pressing of the release button 21 when the added image displayed on the rear surface liquid crystal monitor 26 reaches an appropriate level or the level desired by the photographer. Specifically, if the result of determination in step #151 is that it has been determined that the 2R switch has been turned off, then similarly to step #127 imaging is stopped together with closing of the shutter 213, and the exposure operation is completed (#161B).

If imaging is stopped, next, similarly to step #129, reading of image data from the image sensor 221 is carried out ((#163B), and similarly to step #133 the image read out this time is added to the previous added image (#165B). After this, similarly to step #135, the added image is temporarily held (#167B) and the added image is displayed on the rear surface liquid crystal monitor 26 (#169B).

In this embodiment, at the point in time where a finger is taken away from the release button 21 and the bulb exposure is completed, image signals accumulated in the image sensor 221 are read out, these image signals are added to the previous added image, and that added image is displayed. If display of the added image is carried out, the liquid crystal monitor backlight 26a is turned on, and the rear surface liquid crystal monitor 26 is illuminated (#171B), and the bulb display LED 41 is turned off upon completion of the bulb exposure (#173B).

Figure 27:
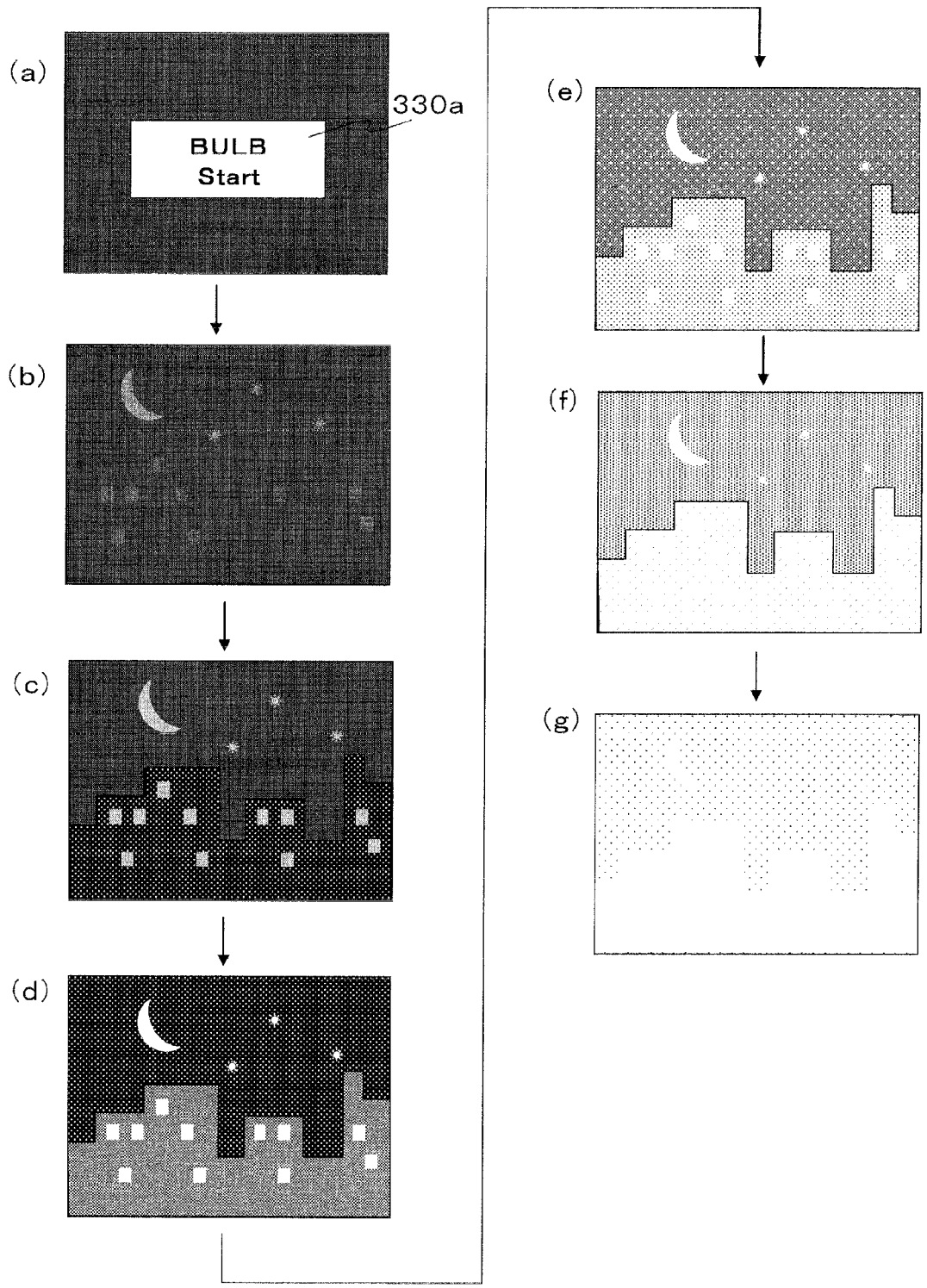
FIG. 27 shows display of bulb mode exposure time for the fifth embodiment of the invention, with FIG. 27(a) to FIG. 27(g) showing change with lapse of cycle time.

In this way, with this embodiment imaging by the image sensor 221 is stopped and image data output every time the cycle time that was set in step #119B elapses (Y at #125). Addition processing for this image data and the previous added image being stored in the storage region of the temporary storage section 293 is carried out, and the result is stored. The added image stored in each storage region is updated and displayed in the rear surface liquid crystal monitor 26 every time the cycle time elapses, as shown in FIG. 27, and it is possible to observe the exposure state for bulb exposure in real time.

Also, with the fifth embodiment of the present invention, if the cycle time elapses and the image is updated, the liquid crystal monitor backlight 26a is turned on for a predetermined time (10 seconds in this embodiment). The liquid crystal monitor backlight 26a for the rear surface liquid crystal monitor 26 is not always kept on during bulb exposure, which means it is possible to reduce power consumption. Further, lighting of the liquid crystal monitor backlight 26a is at the image cycle time, which means that the photographer can observe the image with interest.

Further, with the fifth embodiment of the present invention, in the event that the set cycle time is less than a predetermined time (30 seconds in this embodiment), lighting of the liquid crystal monitor backlight 26a is carried out continuously. Therefore, turning on and off of the backlight is not repeated at short intervals and there is no visually annoying flicker.

Also with the fifth embodiment of the present invention, the LED for bulb display is lit once the bulb exposure is commenced, and once bulb exposure is completed the bulb display LED 41 is turned off. It is therefore possible to easily confirm whether or not the bulb exposure is in progress, which is extremely useful.

Figure 28:
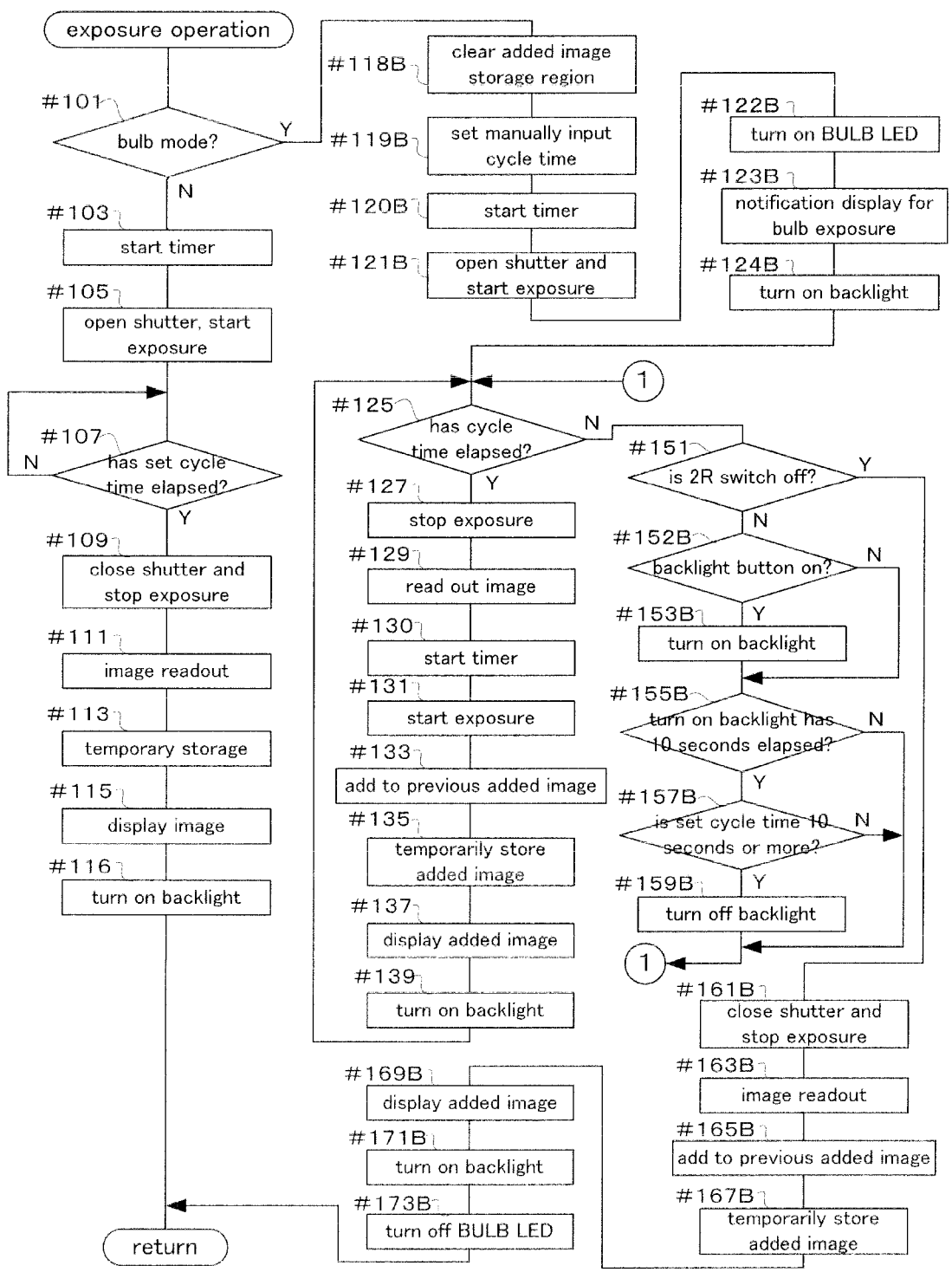
FIG. 28 is a flowchart showing an exposure operation of a sixth embodiment of the present invention.

Next, a sixth embodiment of the present invention will be described using FIG. 28. With the fifth embodiment of the present invention, if the added image is updated, the liquid crystal monitor backlight 26a is turned on for a predetermined time (10 seconds), and if the predetermined time elapses the liquid crystal monitor backlight 26a is turned off. In the sixth embodiment, a backlight button is provided, and the liquid crystal monitor backlight 26a is turned on if this backlight button is operated.

The structure of the sixth embodiment is the same as that of the fifth embodiment shown in FIG. 23 to FIG. 25, the flowcharts shown in FIG. 4, FIG. 6, and FIG. 18 are also the same, and bulb mode exposure time display shown in FIG. 27, the exposure information display shown in FIG. 10 and the update display shown in FIG. 11 are also the same. The point of difference is that the flowchart showing the exposure operation shown in FIG. 26 is replaced with the flowchart in FIG. 28, and description will center on this difference. Each of the steps within the flowchart shown in FIG. 28 that are the same as the steps in the flowchart shown in FIG. 26 have the same reference numerals attached, and detailed description thereof is omitted.

Figure 26:
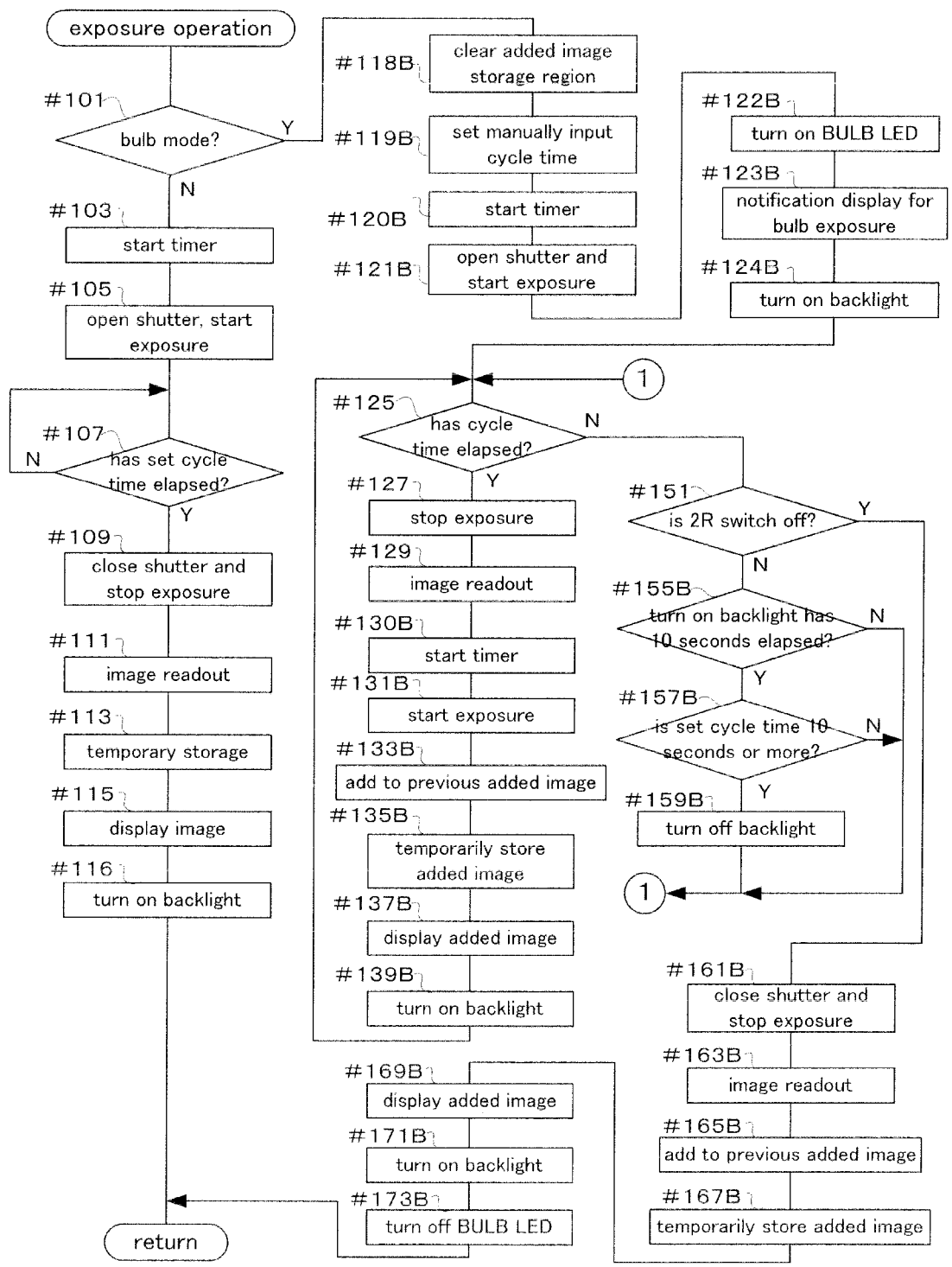
FIG. 26 is a flowchart showing an exposure operation of a fifth embodiment of the present invention.

If the processing flow for the exposure operation is entered, it is determined whether or not it is bulb mode (#101), and in the event that bulb mode has not been set, then similarly to the fifth embodiment shown in FIG. 26, a normal exposure mode, such as program exposure mode, is carried out. On the other hand, if bulb mode has been set, then similarly to the fifth embodiment from step #118B to step #124B are executed. At this time, lighting up of the bulb display LED 41 and the liquid crystal monitor backlight 26a is also the same as with the fifth embodiment.

If the backlight is lit up, it is next determined whether or not the cycle time has elapsed (#125). If the result of determination is that the cycle time has not elapsed, then similarly to the fifth embodiment it is determined in step #151 whether or not the 2R switch is off. If the result of determination is that the 2R switch is off, then similarly to the fifth embodiment steps #161 and after are executed.

On the other hand, if the result of determination in #151 is that the 2R switch is not off, it is determined whether or not the backlight button is on (#152B). The backlight button can be a dedicated button provided on the rear surface of the camera body 200, but in this embodiment the OK button 31 is also used for this function. Specifically, determination as to whether or not the OK button 31 has been operated is carried out. If the result of determination is that the backlight button is on, the liquid crystal monitor backlight 26a is lit.

When the liquid crystal monitor backlight 26a is lit in step #153B, the added image is not updated. After lighting the backlight, if the image cycle time elapses within 10 seconds, the added image is then also updated. In the event that the backlight is lit, or the backlight button was not on in step #152B, steps #155B and after are executed, as in the fifth embodiment.

In this way, with the sixth embodiment, the backlight button is provided, and the liquid crystal monitor backlight 26a is turned on if this backlight button is operated. It is therefore possible to illuminate the rear surface liquid crystal monitor 26 and easily confirm the added image by operating the backlight button, even after initially lighting the liquid crystal monitor backlight 26a and then turning it off when a predetermined time has elapsed.

Figure 29:
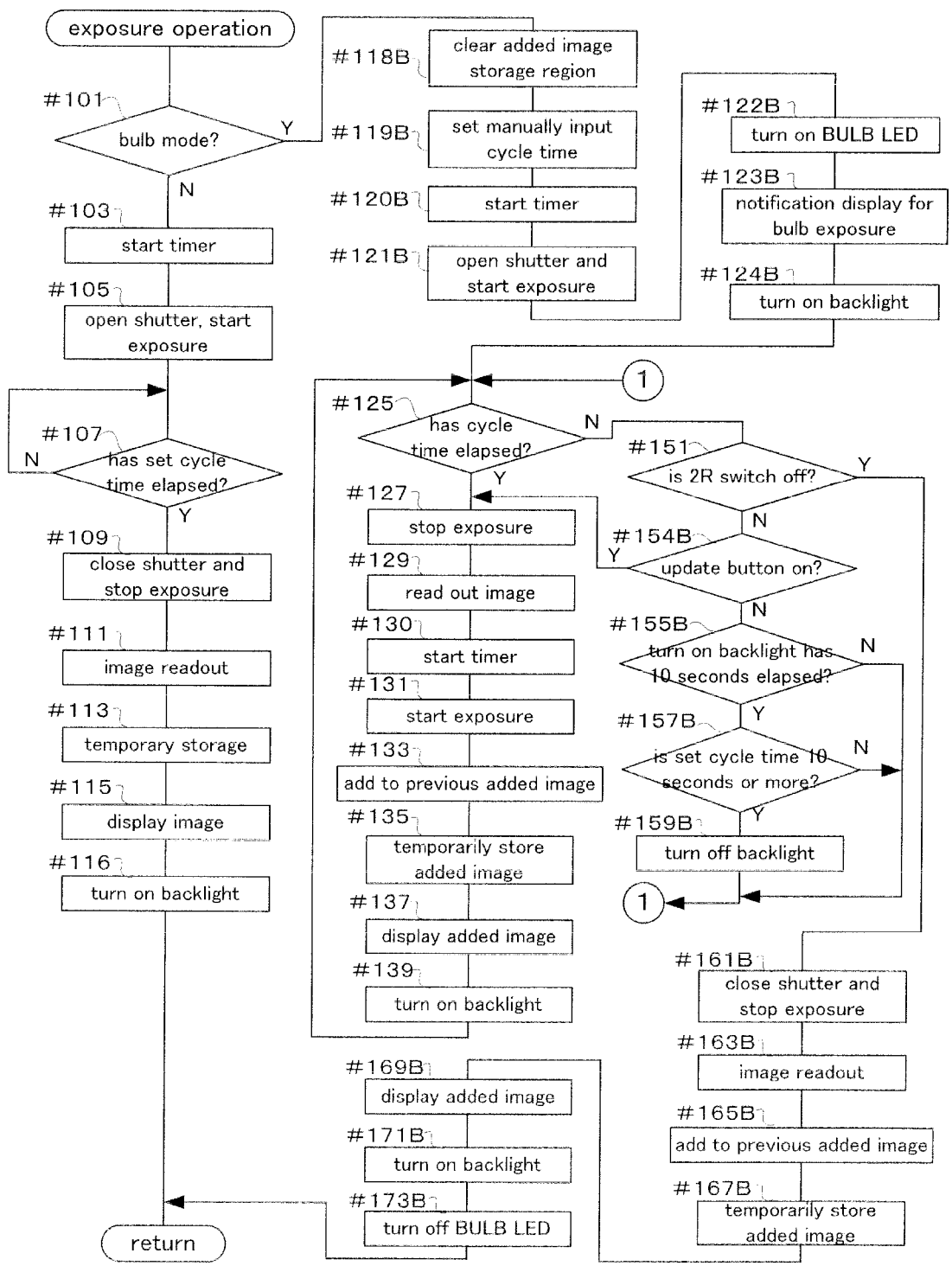
FIG. 29 is a flowchart showing an exposure operation of a seventh embodiment of the present invention.

Next, a seventh embodiment of the present invention will be described using FIG. 29. In the fifth embodiment and the sixth embodiment, the added images are only updated at set cycle time intervals, and between the cycle times it is not possible to confirm the state of progress of the bulb exposure. With the seventh embodiment, an update button is provided, and if this update button is operated update of the image is carried out together with lighting of the backlight.

The structure of the seventh embodiment is the same as that of the fifth embodiment shown in FIG. 23 to FIG. 25, the flowcharts shown in FIG. 4, FIG. 6, and FIG. 18 are also the same, and bulb mode exposure time display shown in FIG. 27, the exposure information display shown in FIG. 10 and the update display shown in FIG. 11 are also the same. The point of difference is that the flowchart showing the exposure operation shown in FIG. 26 is replaced with the flowchart in FIG. 29, and description will center on this difference. Each of the steps within the flowchart shown in FIG. 29 that are the same as the steps in the flowchart shown in FIG. 26 have the same reference numerals attached, and detailed description thereof is omitted.

If the flowchart for the exposure operation is entered, then similarly to the fifth embodiment it is determined in step #125 whether or not the cycle time has elapsed. If the result of determination is that the cycle time has elapsed, then similarly to the fifth embodiment step #127 and after are executed.

On the other hand, if the result of determination in #125 is that the cycle time has not elapsed, it is determined whether or not the 2R switch is off (#151). If the result of determination is that the 2R switch is off, then similarly to the fifth embodiment steps #161B and after are executed. On the other hand, if the result of determination is that the 2R switch is not in off, it is then determined whether or not the update button is on (#154B).

The update button can be a dedicated button provided on the rear surface of the camera body 200, but in this embodiment the OK button 31 is also used for this function. Specifically, determination as to whether or not the OK button 31 has been operated is carried out. If the result of determination is that the update button is not on, then similarly to the first embodiment steps #155B and after are executed.

On the other hand, if the result of determination in step #154B is that the update button is on, there is a jump to step #127, and besides reading out image data similarly to the cycle time elapsed time and generating added image data, in step #137 an updated added image is displayed, and the liquid crystal monitor backlight 26a is lit up (#139).

In this way, with the seventh embodiment of the present invention, an update button is provided, and if this update button is operated, by pseudo creating a state that is the same as when the cycle time has elapsed, update of the added image is carried out, and the liquid crystal monitor backlight 26a is lit. Therefore, when the bulb exposure progresses, it is possible to confirm the state of progress of the bulb exposure at an arbitrary timing other than the update timing of the image.

Figure 30:
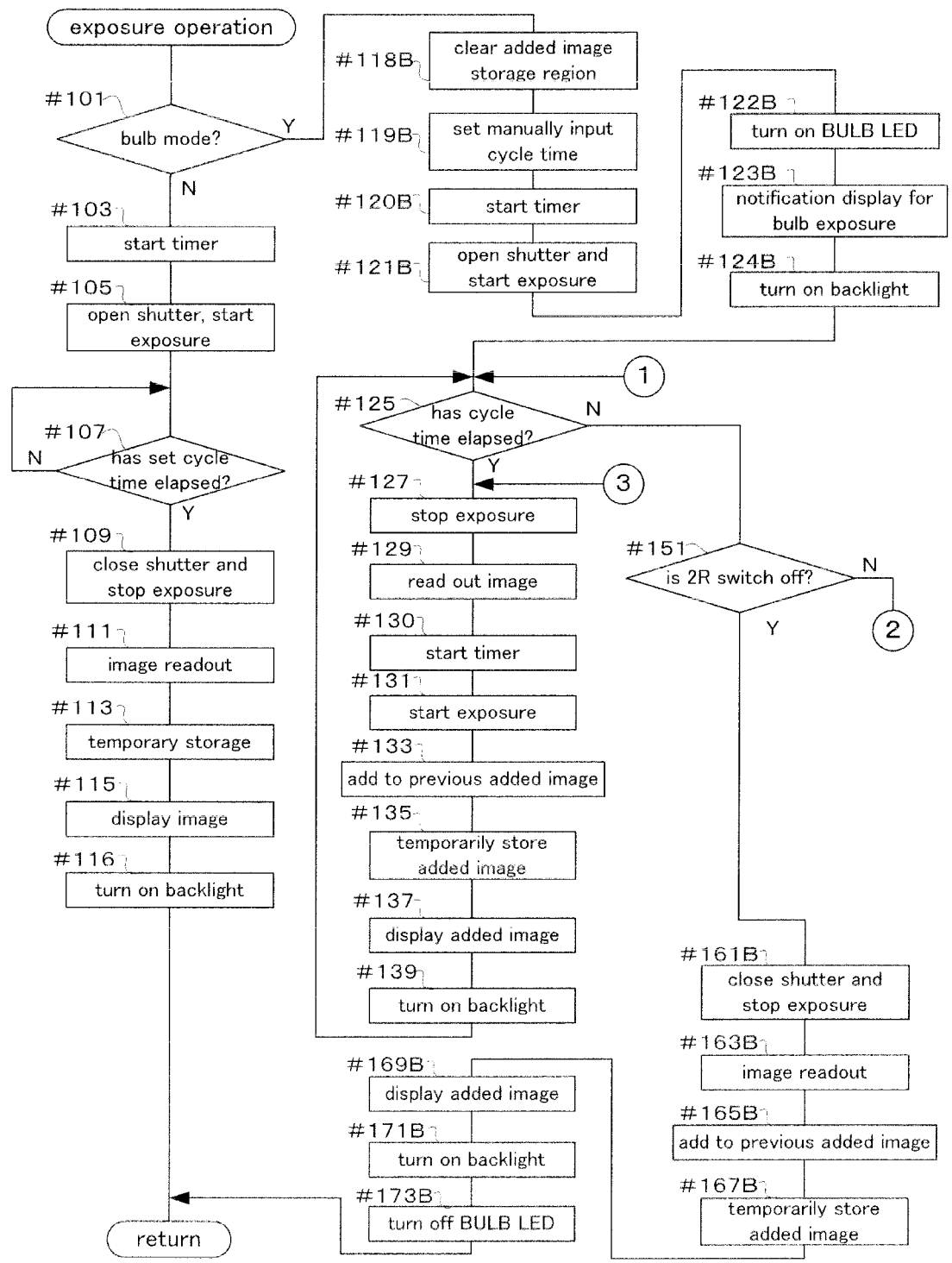
FIG. 30 is a flowchart showing an exposure operation of an eighth embodiment of the present invention.
Figure 31:
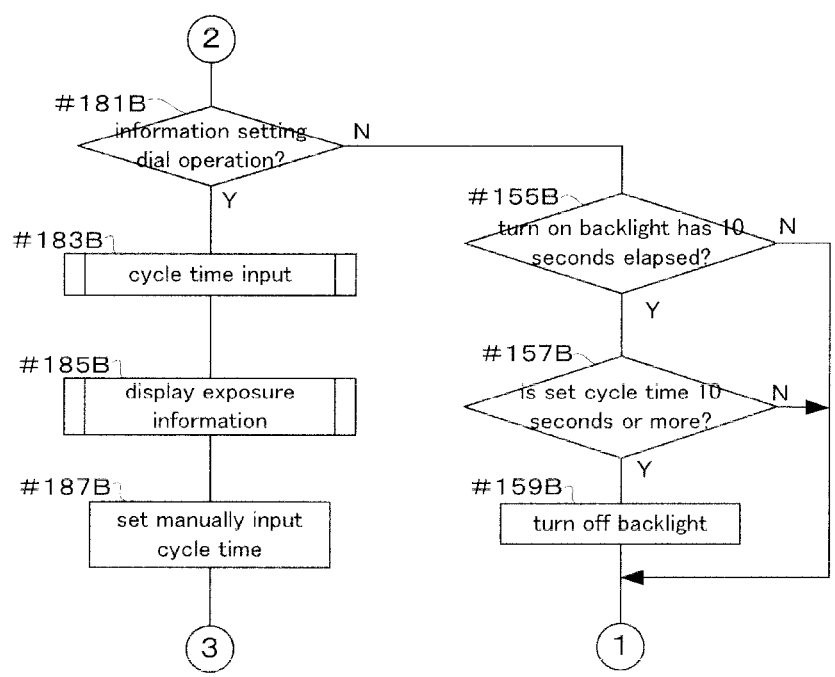
FIG. 31 is a flowchart showing an exposure operation of the eighth embodiment of the present invention.

Next, an eight embodiment of the present invention will be described using FIG. 30 and FIG. 31. With the first to seventh embodiments, the cycle time for the added image could not be changed during bulb exposure. With the eighth embodiment, it is made possible to change this cycle time during an exposure operation for bulb exposure.

The structure of the eighth embodiment is the same as that of the fifth embodiment shown in FIG. 23 to FIG. 25, the flowcharts shown in FIG. 4, FIG. 6, and FIG. 18 are also the same, and bulb mode exposure time display shown in FIG. 27, the exposure information display shown in FIG. 10 and the update display shown in FIG. 11 are also the same. The point of difference is that the flowchart showing the exposure operation shown in FIG. 26 is replaced with the flowcharts in FIG. 30 and FIG. 31, and description will center on this difference. Each of the steps within the flowcharts shown in FIG. 30 and FIG. 31 that are the same as the steps in the flowchart shown in FIG. 26 have the same reference numerals attached, and detailed description thereof is omitted.

If the flowchart for the exposure operation is entered, then similarly to the fifth embodiment it is determined in step #125 whether or not the cycle time has elapsed. If the result of determination is that the cycle time has elapsed, then similarly to the fifth embodiment step #127 and after are executed.

On the other hand, if the result of determination in #125 is that the cycle time has not elapsed, it is determined whether or not the 2R switch is off (#151). If the result of determination is that the 2R switch is off, then similarly to the fifth embodiment steps #161B and after are executed. On the other hand, if the result of determination is that the 2R switch is not off, it is then determined whether or not the information setting dial 24 has been operated (#181B).

If the result of determination in step #181B is that the information setting dial 24 has not been operated, then similarly to the fifth embodiment steps #155B and after are executed. On the other hand, if the information setting dial 24 has been operated, the subroutine for cycle time input described using FIG. 18 is executed (#183B). In this subroutine for cycle time update, the operation state of the information setting dial 24 is determined, and it is possible to change the cycle time.

If cycle time input is completed, then exposure information display is carried out (#185B) similarly to step #13 (FIG. 4). The cycle time that was changed in step #183B is displayed. Next, similarly to step #111B, a manually input cycle time is set (#187B). If setting of cycle time is completed, there is a jump to step #127, and following that determination as to whether or not the cycle time has elapsed in step #125 is carried out based on the cycle time that has been changed in this step.

In this way, with the eighth embodiment of the present invention, if the information setting dial 24 is operated during execution of bulb exposure, the cycle time is changed in accordance with the operation state of the information setting dial 24, and after that the cycle time for added images is changed based on the changed cycle time. Therefore, when the bulb exposure progresses, if the cycle time is shortened or lengthened it is possible to change the cycle time for images.

Also, as has been described, in the fifth to eighth embodiments of the present invention, the display screen of the rear surface liquid crystal monitor 26 is illuminated for only a predetermined time in association with update of the image display on the rear surface liquid crystal monitor 26. It is therefore possible to limit consumption of the power supply battery as much as possible.

In the fifth to eighth embodiments, the rear surface liquid crystal monitor 26, as the display section, is illuminated by the liquid crystal monitor backlight 26a, but as long as the display illumination section performs illumination so that it is possible to easily confirm display on the display section, it is not limited to a backlight. The illumination section can be appropriately selected according to the members used as the display section.

Also, in the fifth to eighth embodiments, in order to indicate the fact that bulb exposure has started, notification display for bulb exposure was displayed at the time of commencing bulb exposure, it is also possible to continue display during execution of bulb exposure, and at this time it is possible to display elapsed time after commencement of bulb exposure. Also, the characters "bulb exposure" and "BULB" are displayed as the bulb exposure notification display, but this is not limiting and it is also possible to have another display such as a symbol or an icon.

Next, a ninth embodiment of the present invention will be described using FIG. 32 to FIG. 35. In the first to eighth embodiments, update of added images was carried out at cycle time intervals. However, bulb exposure etc. extends over a comparatively long time, and there is no variation in a display image until the image is updated, which means that there is problem of looking at the display image for that entire time.

Therefore, in the ninth embodiment, notification is given to the photographer at the time of image update using a sound generating section or the like. In this way, it is possible for the photographer to observe a display image without difficulty in a long time exposure such as bulb exposure.

The structure of the ninth embodiment is partially similar to the structure of the first and third embodiments, and so detailed description of parts of the structure that are the same will be omitted.

Figure 32:
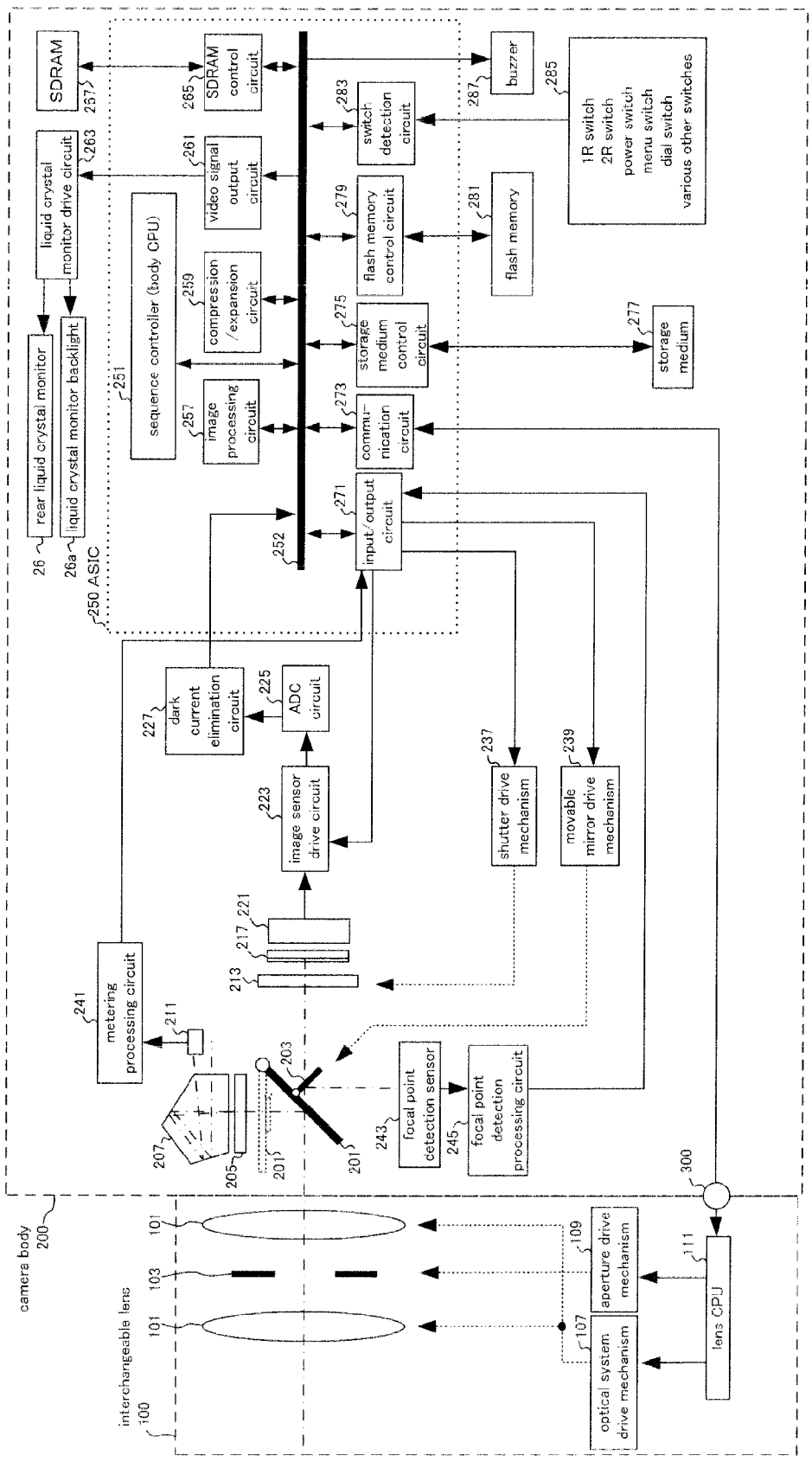
FIG. 32 is a block diagram showing the overall structure of electrical systems of a digital single lens reflex camera relating to a ninth embodiment of the present invention.

The external appearance of a digital single lens reflex camera of the ninth embodiment of the present invention is the same as in FIG. 1. Electrical circuits of this digital single lens reflex camera are shown in FIG. 32. Compared to the electrical circuits of the first embodiment (refer to FIG. 2), the ninth embodiment differs only in that the temperature measurement circuit 231 has been omitted, a buzzer 287 has been added, and a liquid crystal monitor backlight 26a has been added.

The omission of the temperature measurement circuit 231 is the same as in the third embodiment shown in FIG. 16. Also, the liquid crystal monitor backlight 26a is arranged on the rear surface of the liquid crystal monitor 26, and illumination of the rear surface liquid crystal monitor 26 is the same as for the fifth embodiment in FIG. 24.

Also, the buzzer 287 connected to the data bus 252 is a sound generating section described later, and performs notification display using sound when an image is updated at the time of bulb exposure. The structure other than for the points of difference described above is the same as for the first embodiment shown in FIG. 2, and so detailed description will be omitted.

Figure 33:
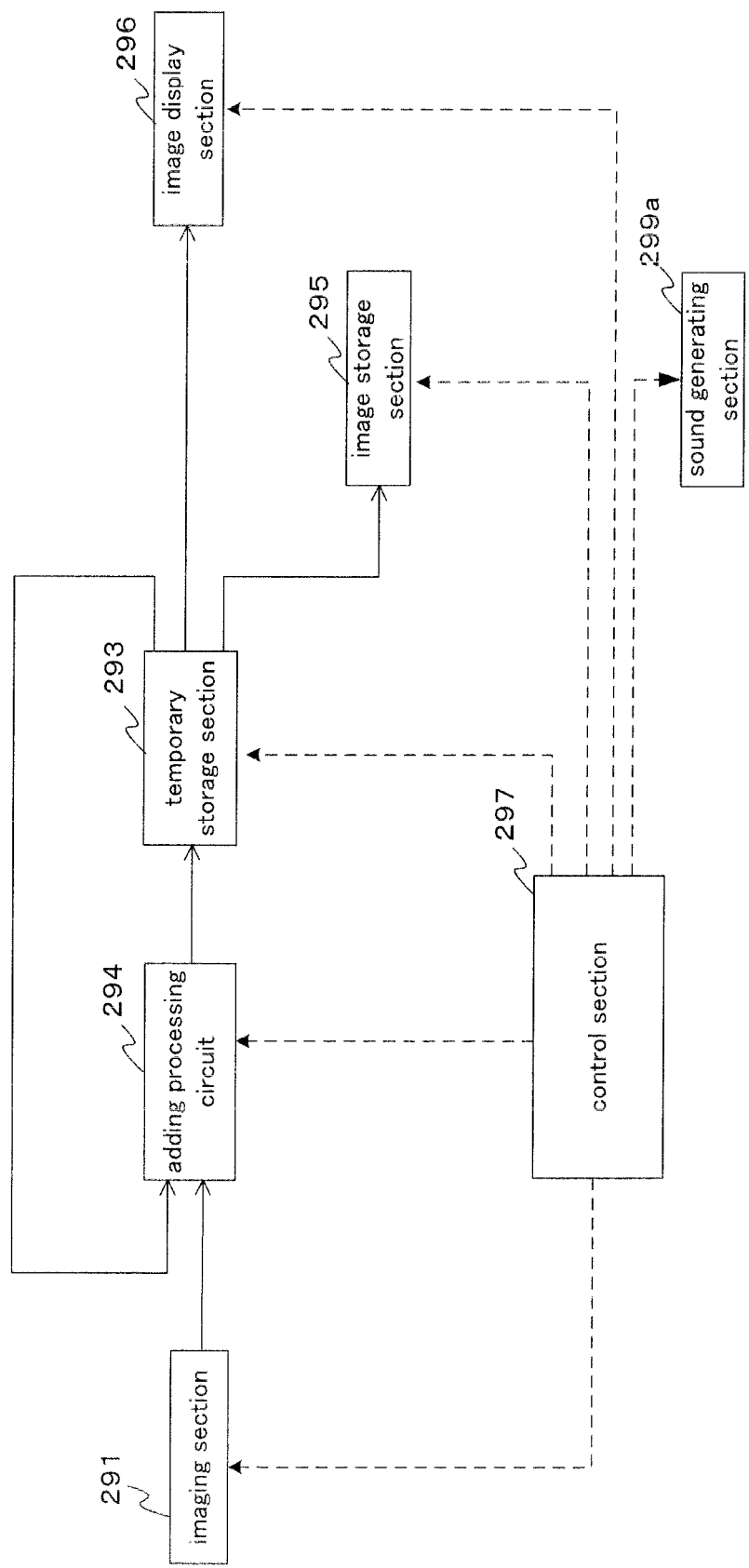
FIG. 33 is a block diagram showing in abstract form the structure relating to image forming and display in bulb mode etc., in a digital single lens reflex camera of the ninth embodiment of the present invention.

FIG. 33 shows a structure relating to image display during exposure, for bulb exposure. Compared to the first embodiment (refer to FIG. 3) there is a difference in that the setting section 298 is omitted, and the sound generating section 299a is provided. Naturally, the setting section 298 can also be provided in the ninth embodiment, but as it is not important it has been omitted in FIG. 33.

Also, in the ninth embodiment the sound generating section 299a connected to the control section 297 is provided, and this sound generating section 299a is constituted by a buzzer 287. The sound generating section 299a issues a notification to the photographer using a notification sound every time the added image displayed on the image display section 296 is updated.

With this type of arrangement, display on the rear surface liquid crystal monitor 26 at the time of bulb exposure is first displaying notification information 321a at the time of commencement of bulb exposure to notify that the bulb exposure has commenced (FIG. 35(a)).

If the initial cycle time has elapsed, image data is read from the imaging section 291, and an added image (at the initial stage, with the initially read image data directly) is displayed on the rear surface liquid crystal monitor 26 as shown in FIG. 35(b) together with the notification information 321b (with this example, cycle time is 30 seconds). Also, at the same time a sound (for example a beep) is output from the sound generating section 299a to notify of update of the image.

After that, image data that has been acquired by the imaging section 291 is sequentially added by the adding processing section 294 every set cycle time, and this added image is displayed on the image display section 296. As shown in FIG.

Figure 35:
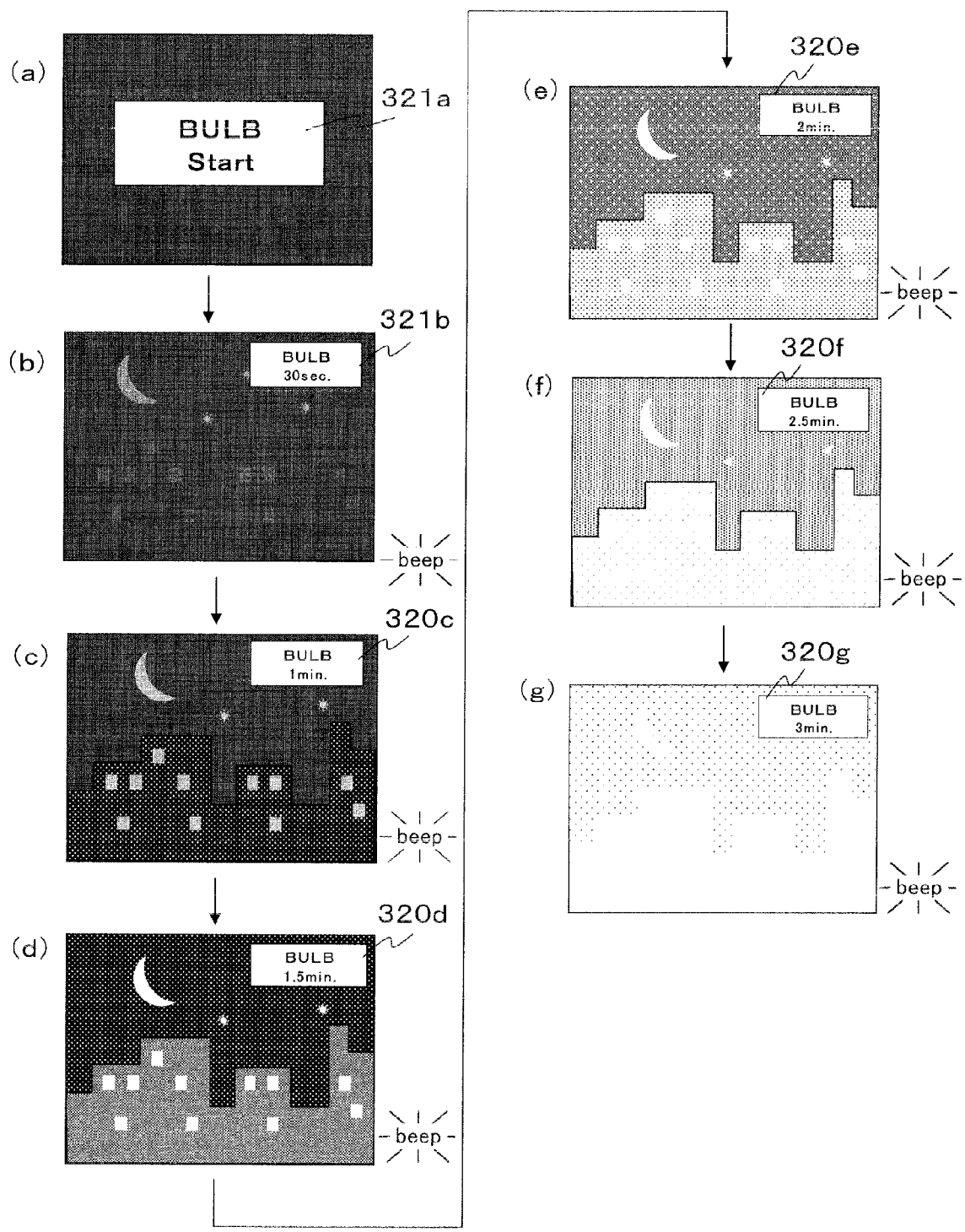
FIG. 35 shows display of bulb mode exposure time for the ninth embodiment of the invention, with FIG. 35(a) to FIG. 35(g) showing change with lapse of cycle time.

35(*c*) to FIG. 35(*g*), every time the added image is updated, notification information 320*c* to 320*g* is displayed superimposed, and at the same time notification is also carried out using a notification sound from the sound generating section 299*a*.

Also, at the stage of FIG. 35(*b*) the exposure time is insufficient and so the image is dark, but after that if the images are gradually changed to brighter images and the cumulative adding is repeated a number of times, it will become an image that appears over exposed, as shown in FIG. 35(*g*). In addition to this notification information 321*b* to 320*g* being present during execution of bulb exposure, the elapsed time for the bulb exposure is displayed.

Figure 34:
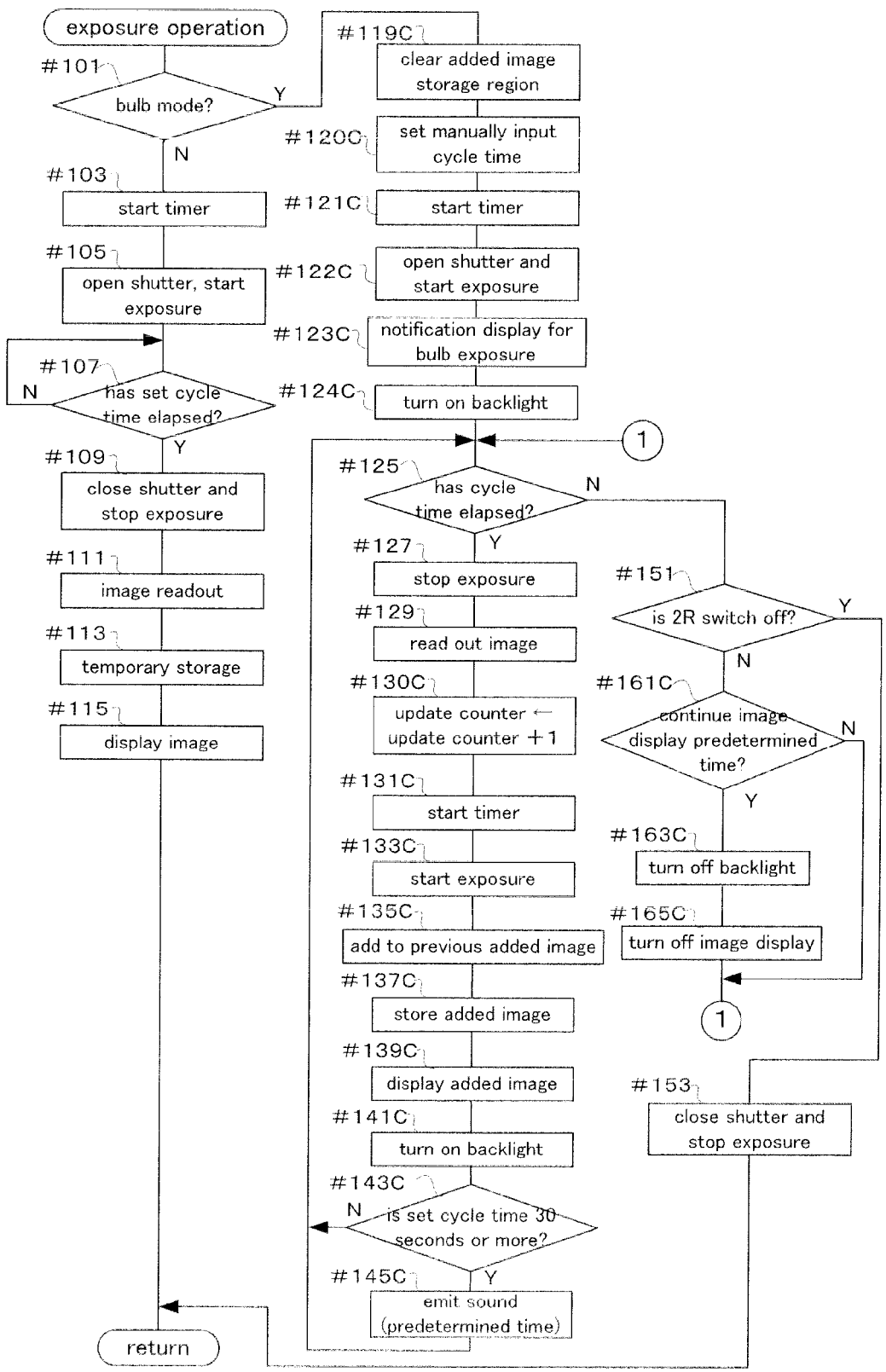
FIG. 34 is a flowchart showing an exposure operation of the ninth embodiment of the present invention.

Next, detailed operation of the digital single lens reflex camera of the ninth embodiment of the present invention will be described using the flowchart shown in FIG. 34. In the ninth embodiment also, if a battery is fitted, the processing flow for power on reset is executed. The processing flow for this power on reset is the same as in FIG. 4 for the first embodiment, and so detailed description will be omitted.

Also, cycle time input of step #31 in the processing flow of the power on reset (refer to FIG. 4) is the same as the processing flow of the cycle time input in the third embodiment (refer to FIG. 18) and so detailed description is omitted. Also, the shooting operation of step #37 in the processing flow of the power on reset (refer to FIG. 4) is the same as the processing flow of the shooting operation in the first embodiment (refer to FIG. 6) and so detailed description is omitted.

Next, the exposure operation of step #75 within the shooting operation processing flow (FIG. 6) will be described using FIG. 34. In the description, steps carrying out the same processing as the flow of FIG. 7 for the first embodiment have the same step numbers attached, and detailed description thereof is omitted.

If this processing flow is entered, first, similarly to step #9 (refer to FIG. 4), it is determined whether or not bulb mode has been set (#101). If the result of determination is that bulb mode has not been set, normal exposure mode, such as program exposure mode, is executed in step #103 to step #115. This normal exposure mode processing is the same as for the flow of FIG. 7, and so detailed description is omitted.

If the result of determination in step #101 is that bulb mode has been set, then first the added image storage region that has been allocated inside the temporary storage section 293 is cleared (#119C), and the cycle time that was manually input in step #31 is set (#120C). Next, a timer for display cycle time timing is started (#121C), and similarly to step #105, together with opening of the shutter 213 imaging is commenced (#122C).

Display of notification information 321*a* for bulb exposure, such as is shown in FIG. 35(*a*) is then started (#123C). That is, at the time bulb exposure commences, the screen is jet black, and if there is no display at all the photographer will be unsure as to whether or not the exposure using bulb exposure has started. In this embodiment also therefore, similarly to the third embodiment, by displaying the notification information 321*a* it is possible for the photographer to recognize that the exposure has started.

If the display of notification information is started, then next the liquid crystal monitor backlight 26*a* is lit up (#124C), to illuminate the rear surface liquid crystal monitor 26. In this way, the display screen of the liquid crystal monitor 26 becomes bright and it is possible to view.

Next, it is determined whether or not the timer for cycle time timing has reached the cycle time set in step #120C (#125). If the result of determination is that the cycle time has not elapsed, it is determined whether or not the full pressing of the release button 21 has been released, that is, whether or not the 2R switch is off (#151).

If the result of determination in #151 is that the 2R switch is not off, it is next determined whether or not the image display is maintained over a predetermined time (#161C). In this step, it is determined whether or not the timer for cycle time timing that started a timing operation in step #121C (or in step #131C the second and subsequent times) has reached a predetermined time, for example, 10 seconds.

If the result of determination in step #161C is that the predetermined time has not been reached, step #125 is returned to and image display by the liquid crystal monitor 26 and lighting of the liquid crystal monitor backlight 26*a* are continued.

On the other hand, if the result of determination in step #161C is that the predetermined time has elapsed the liquid crystal monitor backlight 26*a* is turned off (#163C) and display of the added image on the liquid crystal monitor 26 is turned off (#165C). This is in order to reduce power supply consumption, so that the added image is displayed for only a predetermined time at the time of update.

With this embodiment, notification display for the bulb exposure is displayed on the liquid crystal monitor 26, but by also turning notification display for bulb exposure in addition to turning off the image display of step #165C, and turning off the power supply to the liquid crystal monitor 26 itself, it is possible to further reduce power supply consumption. In step #165C, if the image display is turned off, step #125 is returned to.

If the result of determination in step #125 is that the cycle time has elapsed, then similarly to step #109 and step #111, image forming of the image sensor 221 is stopped with the shutter 213 still open, and reading of pixel signals is carried out (#127, #129).

Next 1 is added to the counter (#130C). The update counter is reset at the same time as the timer is started in step #121, and every time this step #130 is passed through 1 is added. By multiplying a count value of this update counter by the cycle time set in step #120, it is possible to obtain a cumulative time from when the exposure using bulb exposure started.

Next, the timer for cycle time timing is restarted (#131C), and imaging on the image sensor 221 is commenced (#133C).

Next added image data is read from a storage region that was previously stored in the storage region of the temporary storage section 293, and adding processing for this image data and image data read in step #129 is carried out (#135C). Image data of the added image obtained here is stored in a storage region of the temporary storage section 293 that is used for added image storage (#137C).

If accumulation of the added image is completed, the added image stored in the temporary storage section 293 is next displayed on the rear surface liquid crystal monitor 26 (#139). Illumination of the liquid crystal monitor 26 is then carried out using the liquid crystal monitor backlight 26*a*. As has been described, with image display using the liquid crystal monitor 26 and illumination using the liquid crystal monitor backlight 26*a*, display of an added image is turned off if added image display continues for a predetermined time (#163C, #165C).

Next, it is determined whether or not the cycle time set in step #120C is 30 seconds or more (#143C). If the result of determination is that the set cycle time is 30 seconds or more, a notification sound is emitted for a predetermined time (for example 0.3 seconds) by the sound generating section 299*a* (buzzer 287). It is possible to let the photographer know that the image has been updated using the notification sound.

Here, the fact that whether or not to emit a notification sound is switched depending on whether or not the set cycle time is a determined time or longer is because in the event that the cycle time is short, intervals between emission of the notification sound will be short, giving a noisy impression. This determined time is not limited to 30 seconds, and can be appropriately altered. If the result of determination in step #143C is that the set cycle time is less than 30 seconds, or if the notification sound has been emitted in step #145C, step #125 is returned to and the previously described operations are executed.

In step #122C, at the initial stage where the imaging operation has commenced notification information 321a is displayed on the liquid crystal monitor 26, as shown in FIG. 35(a), and illuminated by the liquid crystal monitor backlight 26a. If it is determined in step 161C that the predetermined time has elapsed, illumination by the liquid crystal monitor backlight 26a is turned off.

Next, if it is determined in step #125 that the cycle time has elapsed a formed image is read out, and the image at this time is displayed as shown in FIG. 35(b) (#139C), and at the same time if the set time is 30 seconds or greater a notification sound is emitted by the sound generating section 299a (#145C). Also, illumination by the liquid crystal monitor backlight 26a is carried out for a predetermined time (from #141C to #163C).

As shown in FIG. 35(c) to FIG. 35(g), every time it is determined in step #125 that the cycle time has elapsed, the added image and notification display 320c to 320g are updated. At this time a notification sound is also emitted for a predetermined time. At the initial stage the added image is insufficiently bright, and so the screen remains dark, but with the screen becoming brighter as the accumulation time increases the photographer completes the bulb exposure at the point in time when they determine that their desired brightness has been attained.

As the notification information 321b to 320g, as shown in FIG. 35 there is display indicating that bulb exposure is being executed, and display of cumulative exposure time for the bulb exposure. Also in this embodiment, the cumulative exposure time is obtained using a count value of the update counter that is made to count in step #130C and the set cycle time, but this is not limiting and it is also possible to provide a counter for obtaining the cumulative exposure time at the time of bulb exposure, and displaying elapsed time based on this counter.

If it is determined in step #151 that the 2R switch has been turned off as a result of the photographer taking their finger off the release button 21 at the point in time where their desired brightness has been reached, then similarly to step #127 imaging is stopped together with closing of the shutter 213 (#153). Specifically, the exposure operation is completed, and after that the original routine is returned to.

In this way, with the ninth embodiment of the present invention, every time the set cycle time elapses (Y at #125), imaging by the image sensor 221 is stopped, image data is output, this image data and an immediately preceding added image stored in the storage region of the temporary storage section 293 are added, and the result is stored. The added image stored in each storage region is updated and displayed in the rear surface liquid crystal monitor 26 every time the cycle time elapses, as shown in FIG. 35.

Also, with this embodiment, every time the image is updated a notification sound is emitted by the sound generating section 299a, and when this notification sound is emitted, since the rear surface liquid crystal monitor 26 should only be viewed when the notification sound is emitted, the photographer can view without any problem.

Further, with this embodiment, after the image has been updated the liquid crystal monitor backlight 26a is only lit for a predetermined time, which means that it is possible to reduce consumption of the power supply. Also, since the notification sound by the sound generating section 298 is stopped if the set cycle time is short, it is possible to prevent the notification sound being emitted at short time intervals.

In this embodiment, as notification information there are display indicating bulb exposure and display of the elapsed time from the start of bulb exposure, but it is also possible to omit the elapsed time. Also, the characters "bulb exposure" and "BULB" are displayed in order to indicate that bulb exposure has commenced, but this is not limiting and it is also possible to have another display such as a symbol or an icon.

Next, a tenth embodiment of the present invention will be described using FIG. 36 to FIG. 40. In the first to ninth embodiments, added images were displayed over the course of a long time exposure, such as bulb exposure. However, when confirming the image after exposure, there will be times when it is instantly recognized that exposure is wrong.

In the tenth embodiment therefore, individual added images acquired over the course of a long time exposure such as bulb exposure are stored, so that it is possible to confirm the individual added images after exposure.

The structure of the tenth embodiment is partially similar to the structure of the first and third embodiments, and so detailed description of parts of the structure that are the same will be omitted.

The external appearance of the digital single lens reflex camera of the tenth embodiment is similar to FIG. 1, and electrical circuits are similar to FIG. 16, and so detailed description will be omitted.

Figure 36:
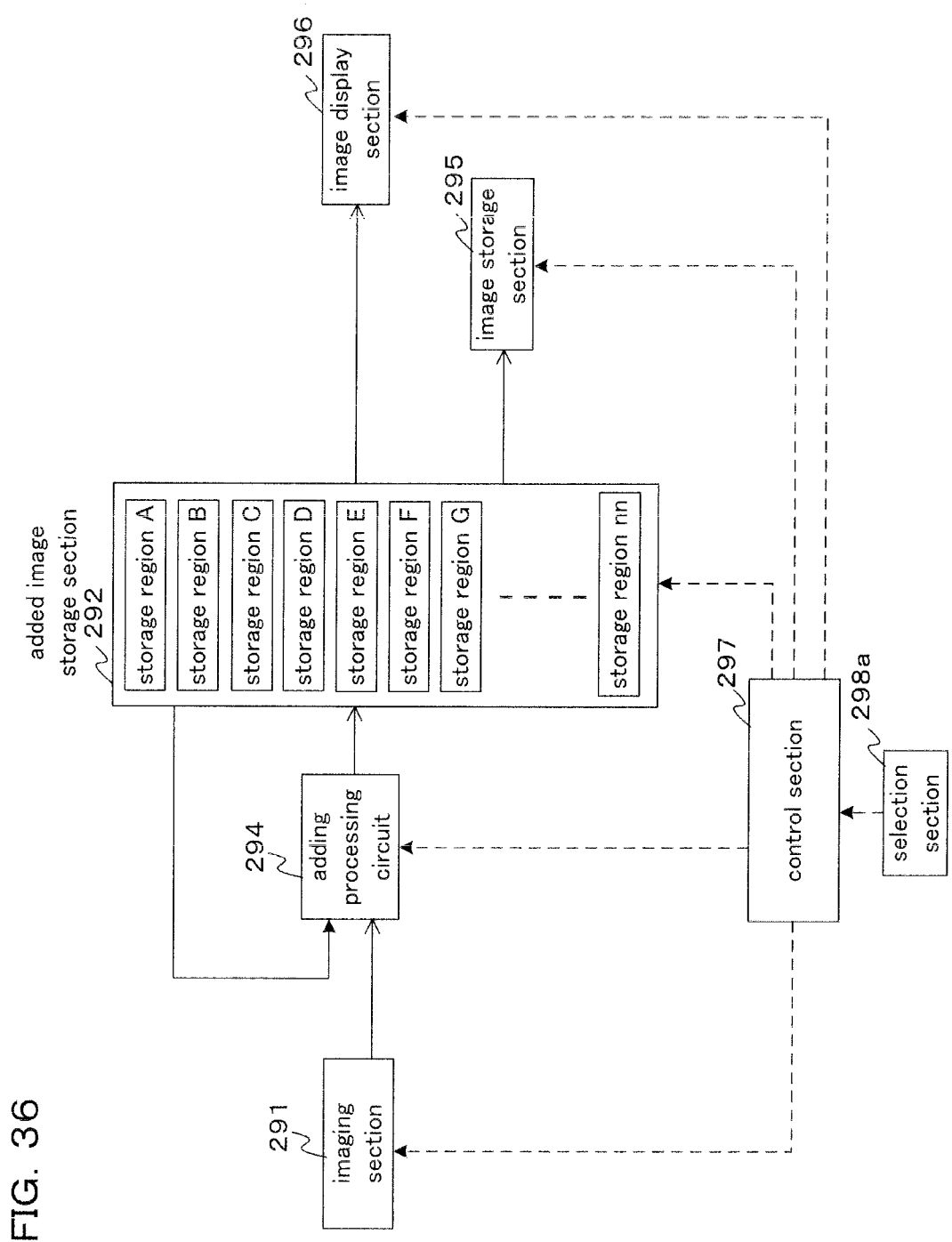
FIG. 36 is a block diagram showing in abstract form the structure relating to image forming and display in bulb mode etc., in a digital single lens reflex camera of a tenth embodiment of the present invention.

Next, the structure relating to image display during exposure, in bulb exposure etc., will be described using FIG. 36. Similarly to FIG. 3, the control section 297 is constructed of a body CPU 251 for controlling the overall digital single lens reflex camera.

The imaging section 291, similarly to FIG. 3, includes the image sensor 221 image sensor drive circuit 223, ADC circuit 225 and dark current elimination circuit 227, and outputs image data based on image signals. Output of the imaging section 291 is connected to the adding processing section 294.

The adding processing section 294 is made up of the body CPU 251 and an image processing circuit 257. The adding processing section 294 is input with image data from the imaging section 291, and also input with previous added image data stored in the storage region of the added image storage section 292, and adds the two together to generate an added image and outputs the result to the added image storage section 292.

The added image storage section is constituted by a temporary storage device such as SDRAM 267, and has a plurality of storage regions divided into from storage region A to storage region n, with each storage region sequentially storing the added image data thus far.

That is, initial image data is stored in the storage region A, then if image data is output from the imaging section 291, adding processing for that image data and previous added image data stored in the storage region A are carried out, and new added image data is stored in the storage region B. In this manner, in accordance with control by the control section 297, every time image data is output from the imaging section 291, image data to that point is subjected to adding processing and sequentially stored in the storage regions in the added image storage section 292.

The image display section 296, similarly to FIG. 3, is comprised of a liquid crystal monitor 26 and a liquid crystal monitor drive circuit 263, and displays image data that has been read from the added image storage section 292.

A selection section 298a is made up of a cross-shaped button 20 and an OK button 31, and selects a finally stored image from among a plurality of subject images formed at the time of bulb exposure. The image storage section 295, similarly to FIG. 3, is comprised of a storage medium 277, and stores an image selected by the selection section 298a.

With this type of structure, the control section 297 causes output of image data from the imaging section 291 at intervals of the set cycle time, and the adding processing section 294 adds this image data to the preceding added image stored in the added image storage section 292. Added values for image data up to the time of respective image data output are then stored in a respective storage region of the added image storage section 292.

Figure 39:
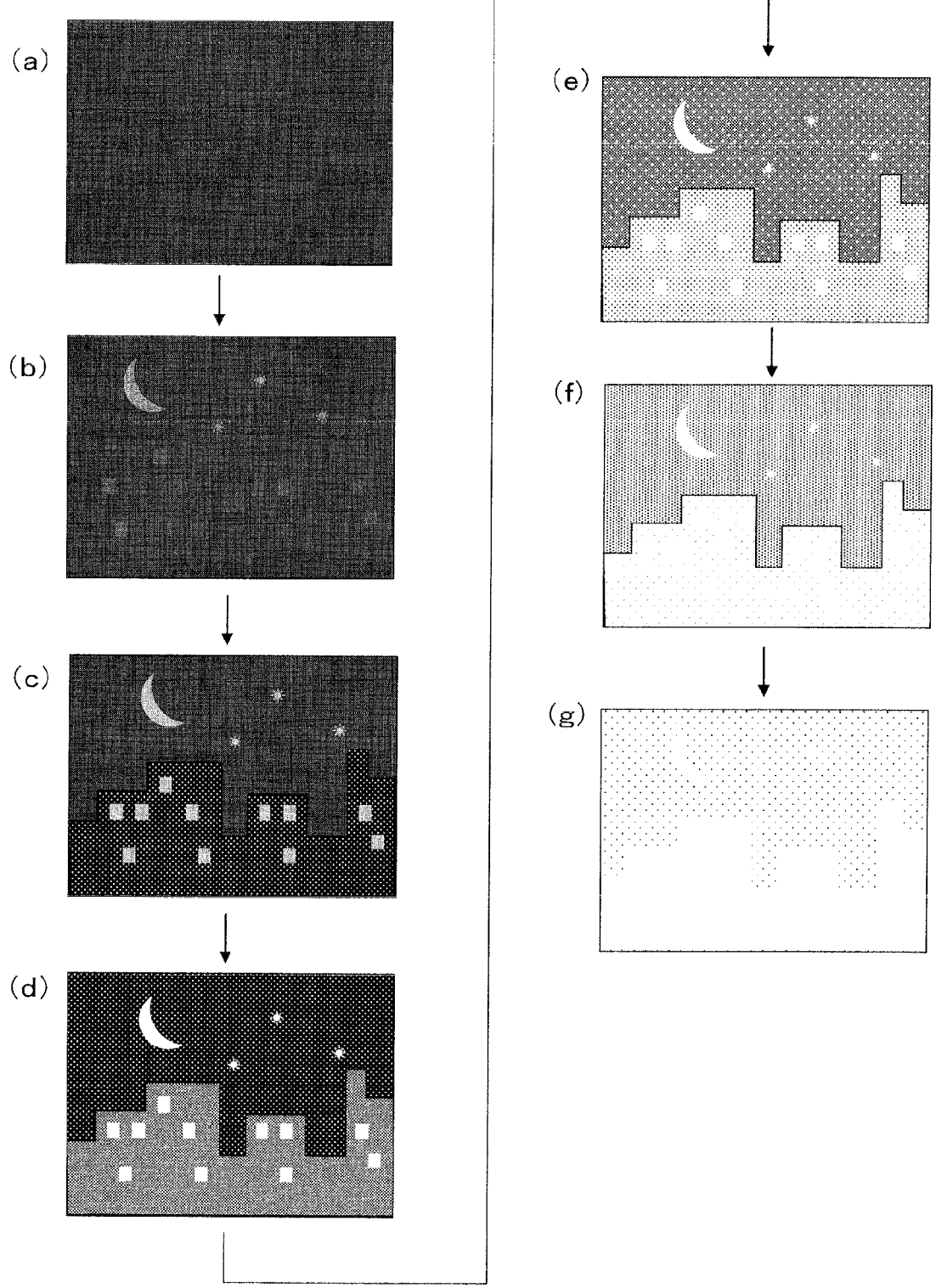
FIG. 39 shows display of bulb mode exposure time for the tenth embodiment of the invention, with FIG. 39(a) to FIG. 39(g) showing change with lapse of cycle time.

An image based on the image data stored in the added image storage section 292 is then displayed on the image display section 296. Image data stored in storage region A has the earliest exposure, and so is an mage that appears under exposed, as shown in FIG. 39(*a*). Next, since the next stored image of storage region B is added to the image data having the initial exposure, it becomes slightly brighter as shown in FIG. 39(*b*).

Every time image data is sequentially accumulated in the added image storage region 292, the image becomes gradually brighter, with the image of the storage region D approaching correct exposure, as shown in FIG. 39(*d*), and if accumulation of image data continues further it becomes an over exposed mage as shown in FIG. 39(*g*) that is stored in storage region G.

Figure 40A:
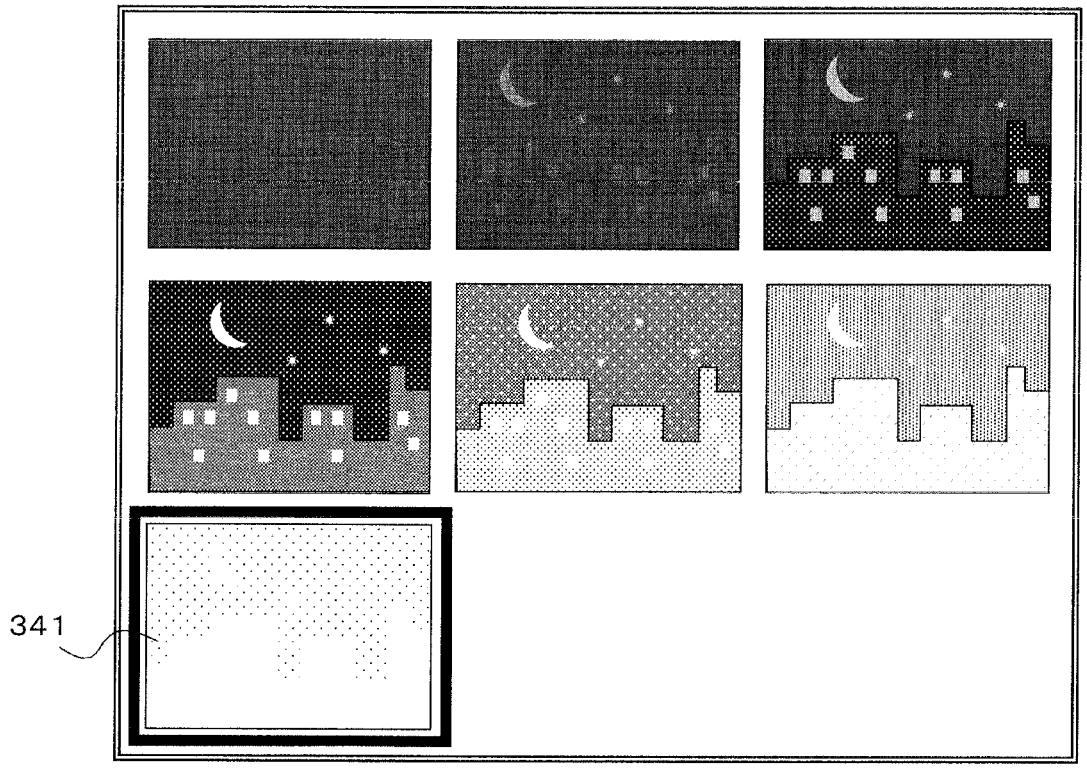
FIG. 40A and FIG. 40B show list display of all added images at the time of completion of bulb mode exposure with the tenth embodiment of the present invention, with FIG. 10A being a list display immediately after exposure completion, and FIG. 40B being list display for a selected time.
Figure 40B:
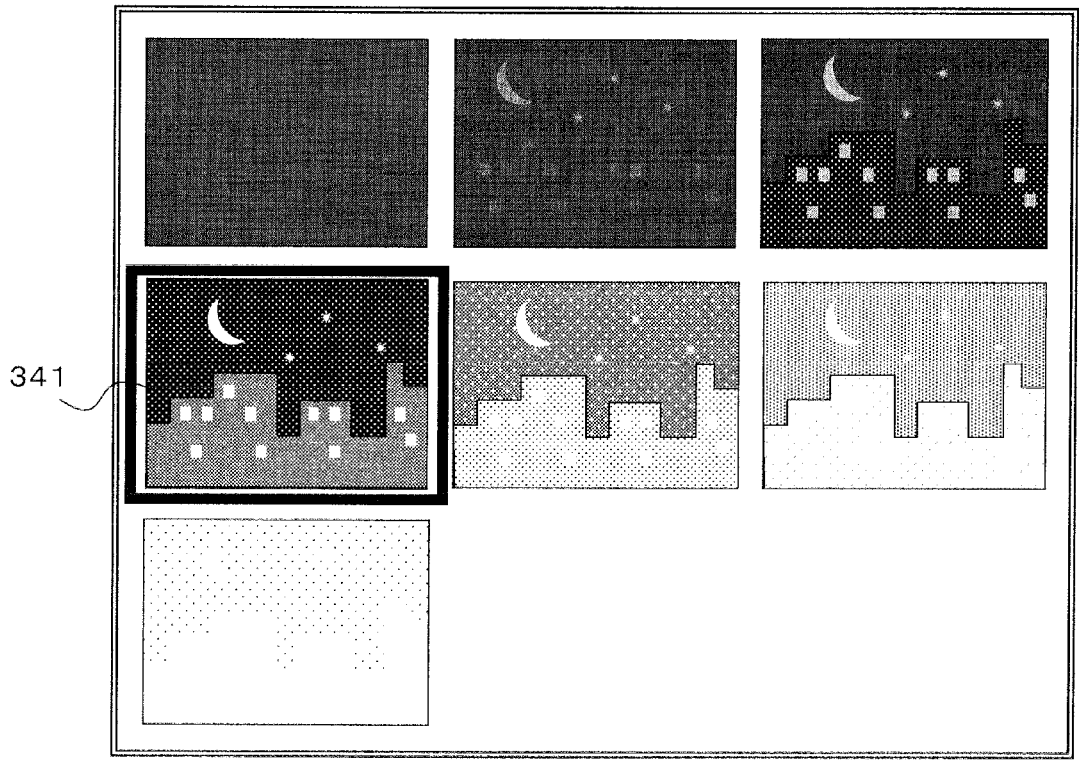

If exposure is completed, images based on image data stored in the respective storage regions are displayed in tabulated form as thumbnails, as shown in FIG. 40, on the image display section 296. In the case immediately after completion of bulb exposure, a selection frame 341 indicates an image corresponding to the final exposure.

The photographer selects an image that accords with their intentions from among the images shown in table form by moving the selection frame 341 by operating the cross-shaped button 30 until it indicates a good image, and then using the OK button 31. If the image is selected, that image is stored in the storage medium 277.

Figure 37:
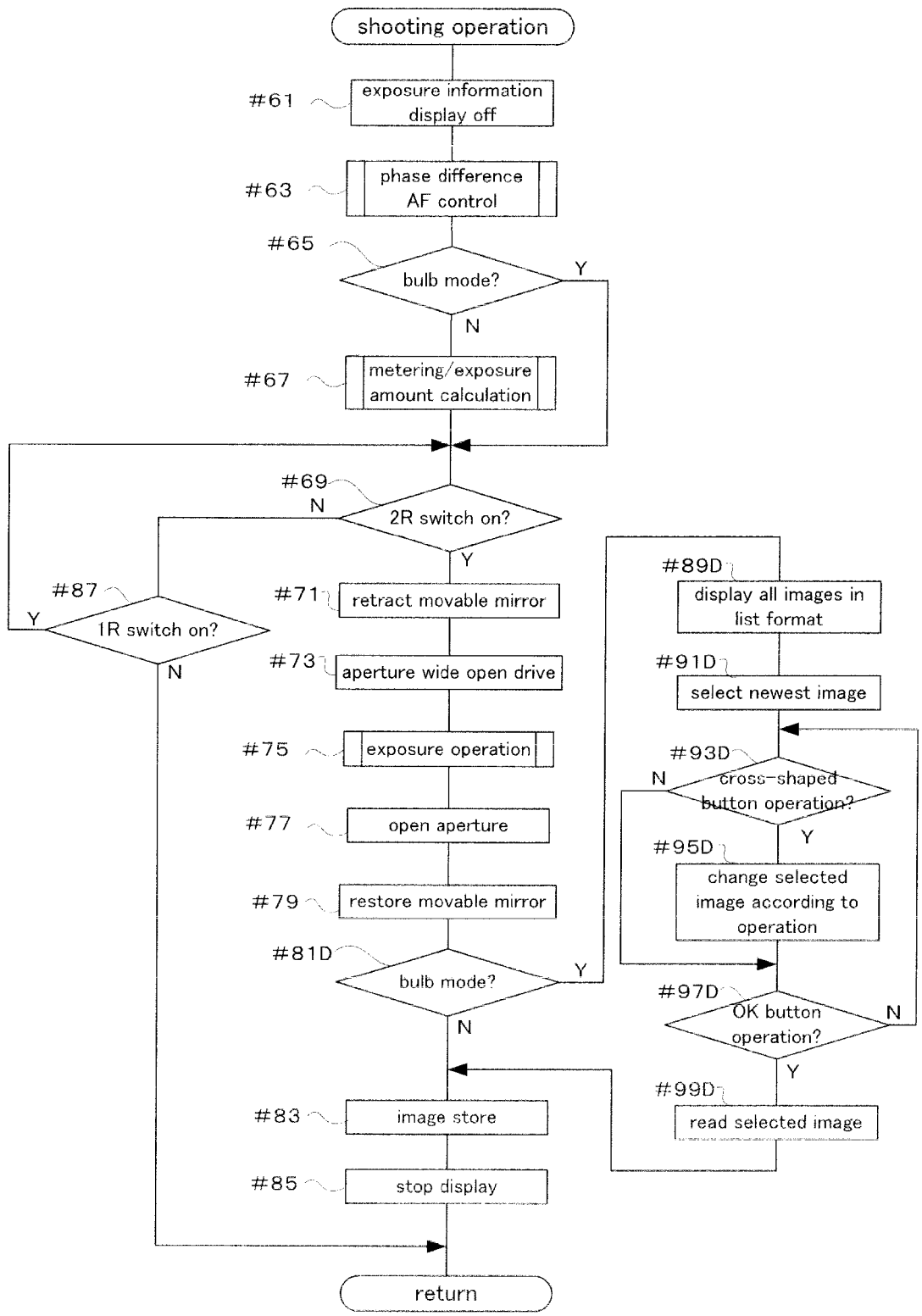
FIG. 37 is a flowchart showing a shooting operation of the tenth embodiment of the present invention.

Next, detailed operation of the digital single lens reflex camera of the tenth embodiment of the present invention will be described using the flowchart shown in FIG. 37. In the tenth embodiment also, if a battery is fitted, the processing flow for power on reset is executed. The processing flow for this power on reset is the same as in FIG. 4 for the first embodiment, and so detailed description will be omitted.

Also, cycle time input of step #31 in the processing flow of the power on reset (refer to FIG. 4) is the same as the processing flow of the cycle time input in the third embodiment (refer to FIG. 18) and so detailed description is omitted.

The shooting operation of step #37 in the processing flow of the power on reset (refer to FIG. 4) will be described using the flowchart shown in FIG. 37. Processing flow of this shooting operation is the same as the processing flow of the shooting operation in the first embodiment shown in FIG. 6, and steps #61 to #79, step #83 and step #85 Steps carrying out the same processing therefore have the same step numbers attached, and description will center on pints of difference.

If the 1R switch is turned on, processing flow for the shooting operation is entered, processing advances to step #61 to step #69, and if the 2R switch is turned on there is a transfer to operation for carrying out exposure in step #71 and after.

The exposure operation is started in step #75. In this step, travel of the front curtain of the shutter 213 commences, together with charge accumulation of the image sensor 221. Then, if a time corresponding to the shutter speed acquired in step #67 or a shutter speed that was manually set by the photographer has elapsed, travel of the rear curtain of the shutter 213 starts, and charge accumulation of the image sensor 221 is terminated.

Here, if bulb mode has been set, then while the release button 21 is being pressed down completely the shutter 213 is open, and at this time image data is repeatedly acquired using the image sensor 221 at intervals of the cycle time, and an added image is displayed on the liquid crystal monitor 26 while being updated, based on this image data. This exposure operation will be described in detail later using FIG. 38.

If the exposure operation is completed, an instruction to open up the aperture 103 is output to the CPU 111, the aperture 103 is opened up (#77), and an operation to restore the movable mirror 201 to the lowered position is carried out (#79). Then, as in step #65, it is determined whether or not there is bulb mode (#81D).

If the determination in step #81D is that it is not bulb mode, image processing of data for a normal image read from the image sensor 221 and temporarily stored in the SDRAM 267, or for an added image, is carried out, and the image processed image data is stored in the storage medium 277 (#83). Display of the image that is displayed on the rear surface liquid crystal monitor 26 is the stopped (#85). Once image display is stopped, the original routine is returned to.

If the result of determination in step #81D is that there is bulb mode, all added images are displayed as a list (#89D). That is, thumbnail display is carried out as shown in FIG. 39A based on image data stored in respective regions of the added image storage section 292. The newest image, that is the finally exposed image, is then selected, and display of the selection frame 341 is carried out (#91D).

Next, determination as to whether or not the cross-shaped button 30 has been operated is carried out (#93D), and if it has not been operated there is a jump to step #97D. On the other hand, if the result of determination is that the cross-shaped key 30 has been operated the selection frame 341 is moved in accordance with the operation direction and the selected image is changed (#95D).

It is then determined whether or not the OK button 31 is operated (#97D), and if the result of determination is that the OK button 31 has not been operated step #93 is returned to and the previously described processing is executed. On the other hand, if the result of determination is that the OK button 31 has been operated then image data of the selected image is read out from the added image storage section 292 (#99D). If reading is complete, processing advances to previously described step #83, and processing is executed.

Figure 38:
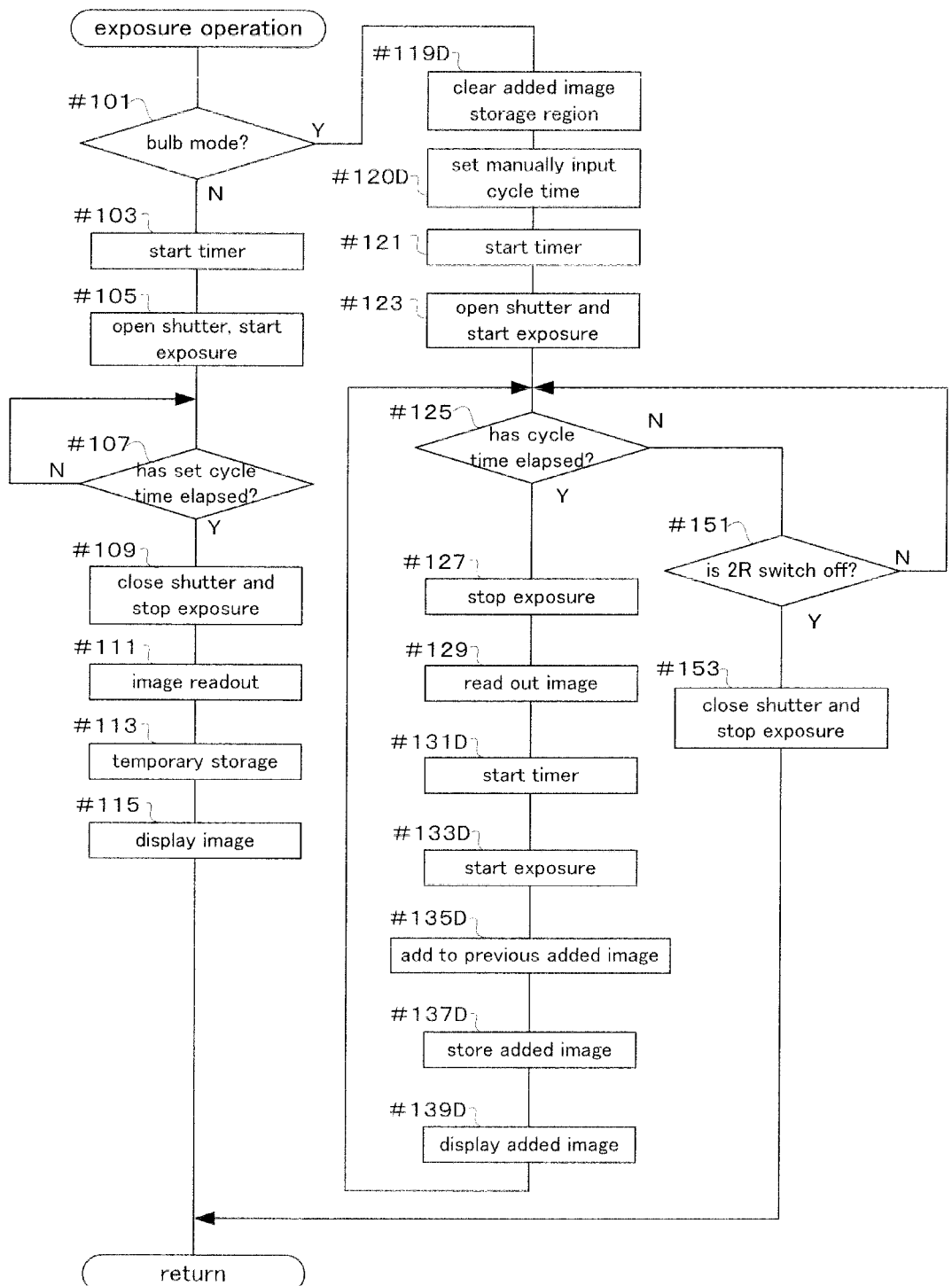
FIG. 38 is a flowchart showing an exposure operation of the tenth embodiment of the present invention.

Next, the exposure operation of step #75 within the shooting operation processing flow of FIG. 37 will be described using FIG. 38. In the description, steps carrying out the same processing as the flow of FIG. 7 for the first embodiment have the same step numbers attached, and detailed description thereof is omitted.

If this processing flow is entered, first, similarly to step #9, it is determined whether or not bulb mode has been set (#101). If the result of determination is that bulb mode has not been set, normal exposure mode, such as program exposure mode, is executed in step #103 to step #115. This normal exposure mode processing is the same as for the flow of FIG. 7, and so detailed description is omitted.

If the result of determination in step #101 is that bulb mode has been set, then first the entire added image storage region that has been allocated inside the added image storage section 293 is cleared (#119D), and the cycle time that was manually input in step #31 is set (#120D).

Next, a timer for display cycle time timing is started (#121), and similarly to step #105, together with opening of the shutter 213 imaging is commenced (#123). Next, it is determined whether or not the timer for cycle time timing has reached the cycle time set in step #120D (#125).

If the result of determination is that the cycle time has not elapsed, it is determined whether or not the full pressing of the release button 21 has been released, that is, whether or not the 2R switch is off (#151). In the event that the 2R switch is on and the cycle time has not elapsed, a standby state is entered where the determinations at steps #125 and #151 are alternately executed.

If the result of determination in step #125 is that the cycle time has elapsed, then similarly to step #109 and step #111, image forming of the image sensor 221 is stopped with the shutter 213 still open, and reading of pixel signals is carried out (#127, #129). Next, the timer for cycle time timing is restarted (#131D), and imaging on the image sensor 221 is commenced (#133D).

Next added image data is read from a storage region that was previously stored in the storage region of the added image storage section 293, and adding processing for this image data and image data read in step #129 is carried out (#135D). Image data for the added image acquired here is stored in a storage region adjacent to the storage region previously read by the added image storage section 293 (#137D). This stored added image is then displayed on the rear surface liquid crystal monitor 26 (#139D), step #125 is returned to, and the previously described steps are executed.

If the result of determination in step #151 is that the full pressing of the release button 21 has been released, that is, it has been determined that the 2R switch has been turned off, then imaging is stopped together with closing of the shutter 213 (#153). Specifically, the exposure operation is completed, and after that the original routine is returned to.

In this way, every time the cycle time set in step #31 (#120D) elapses (Y at #125), imaging by the image sensor 221 is stopped, image data is output, added images of this image data and an immediately preceding added image stored in the storage region of the added image storage section 292 are obtained, and sequentially stored. The added image stored in each storage region is updated and displayed in the rear surface liquid crystal monitor 26 every time the cycle time elapses, as shown in FIG. 39. At the point in time when the cycle time initially elapses, since cycle time is short a completely dark image results, and the image is gradually made brighter by cumulatively adding image data each time the cycle time elapses.

With the tenth embodiment, if bulb mode has been set an exposure operation is repeated during the bulb exposure operation at cycle time intervals, image data acquired at this time and a previous added image are added, this added data is respectively independently stored in the added image storage section 292, and after completion of exposure it is possible to select from a plurality of added images. It is therefore possible to acquire an image of an appropriate exposure level after exposure.

Also, with this embodiment added images are displayed as a list on the liquid crystal monitor 26. It is therefore possible to compare the individual added images and easily select the image the photographer desires. Further, with this embodiment a period for acquiring repeated output from the imaging section 291 (cycle time) is variable, and so it is possible to make it an optimum period according to characteristics of the subject image.

Further, with this embodiment added images during exposure are displayed in accordance with progress of the exposure, which is useful, with bulb exposure, in determining the time at which to complete exposure.

With this embodiment added images are displayed in order to show exposure level during exposure, but if it is simply used to finally select an image it is possible to omit the display of added images during exposure.

Further, with this embodiment reading out of a selected image is carried out in step #97 and step #99, but the selected image is not limited to one and it is also possible to read out a plurality of added images.

As has been described above, with each of the embodiments of the present invention, image data that has been repeatedly read from an imaging section 291 is sequentially added, and added image data is generated and displayed on the image display section 296. It is therefore possible to confirm the advancement of exposure at the time of a long time exposure such as bulb exposure. It is also possible to display added images that have been stored in an added image storage section in the form of a list after a long time exposure such as bulb mode. It is therefore possible to select an image that conforms to the intended exposure by the photographer after exposure.

With each of the embodiments of the present invention, if the bulb mode has been set, the release button 21 is pressed down fully, and until this full pressing down is released, that is, while the 2R switch is on, the shutter is opened and the exposure operation carried out. However, as well as this method of operating, it is also possible, for example, to start the exposure operation when the release button 21 is pressed down fully (first release operation), continue the exposure operation even if the full pressing of the release button 21 is released, and stop the exposure operation when the release button 21 is pressed down fully again (a second release operation carried out after the first release operation).

Also, in the first, second and fifth to eighth embodiments, if the exposure operation is completed, an image is read out in steps #155 (FIG. 7, FIG. 14) and step #163B (FIG. 26, FIG. 28 to FIG. 30), and an added image that has been added to this image is displayed (#161, #169B). However, it is also possible to not read an image in step #155 or step #163B, but display the final added image acquired in step #137.

Further, in each of the third, fourth, ninth and tenth embodiments of the present invention, when the exposure is completed, if imaging is stopped in step #153 (FIG. 19, FIG. 21, FIG. 34, FIG. 38) there is no reading of image signals from the image sensor 221. However, similarly to the first, second and fifth to eighth embodiments, it is totally possible to read an image after stopping imaging, perform addition, and display the added image.

Further, with the second embodiment of the present invention, an example is shown where added images are generated even if a long time exposure is carried out, but in other embodiments also it is also possible to generate and display added images in the case where long time exposure is carried out, for example, exposure of a few seconds.

Further, in the first and third to eighth embodiments, the cycle time is manually set in step #31. However, this is not limiting and it is also completely possible, similarly to the second embodiment, to automatically set the cycle time according to subject brightness, so as to either shorten the cycle time if the brightness is high, or conversely to extend the cycle time if the brightness is low.

Also, this embodiment has been described as an example applied to a single lens reflex type of digital camera, but besides being applied to a single lens reflex camera there is no problem with the present invention being applied to a compact type digital camera or a camera of the type incorporated into a mobile telephone or PDA (mobile information terminal: Personal Digital Assistant) etc. As long as it is has an imaging device capable of long time exposures, such as bulb mode, it is possible to apply the present invention.

Description has been given above embodiments of the present invention, but the present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
   an imaging section for repeatedly forming subject images in a set period while bulb exposure is in operation, and outputting image data;
   an adding processing section for carrying out addition processing with previous image data each time the image data is output;
   an added image storage section, having a plurality of storage regions, for, from commencement of a bulb exposure imaging until the bulb exposure imaging is stopped, sequentially storing added images for every calculation by the adding processing section in the plurality of different storage regions; and
   a selection section for, after completion of the bulb exposure operation, displaying a plurality of added images respectively stored in the plurality of different storage regions of the added image storage section and, after displaying a selection frame superimposed on a final added image among the plurality of added images, selecting any one of the plurality of added images.

2. The imaging device of claim 1, wherein:
   the selection section includes an operation member capable of manual operation, and a display section for list display of thumbnail images corresponding to the plurality of added image data respectively being stored in the plurality of different storage regions of the added image storage section, and if any one of the thumbnail images is selected by operation of the operation member, a corresponding one of the plurality of added image data stored in the added image storage section is selected.

3. The imaging device of claim 1, wherein:
   the period is variable, and is set manually.

4. The imaging device of claim 1, further comprising:
   a display section for displaying an added image calculated by the addition processing section, each time the image data is output.

5. The imaging device of claim 1, wherein:
   the imaging section repeatedly forms subject images in response to a first operation of a release button, and stops image forming in response to a second operation of the release button.

6. The imaging device of claim 1, wherein the added image storage section sequentially stores the added image data in the plurality of different storage regions in order of increasing exposure value.

7. The imaging device of claim 1, wherein each of the plurality of storage regions stores a different, respective, one of the added images.

8. The imaging device of claim 1 wherein each of the plurality of added images is for the same scene but with a different exposure time.

9. An imaging device, comprising:
   an imaging section for repeatedly forming subject images in a set period while bulb exposure is in operation, and outputting image data;
   an adding processing section for carrying out addition processing with the image data and previously output image data;
   an added image storage section, having a plurality of storage regions, for, after commencement of a bulb exposure imaging until the bulb exposure imaging is stopped, respectively sequentially storing a plurality of added images that have been calculated by the addition processing section in the plurality of different storage regions, independently of one another; and
   a display section for, after completion of the bulb exposure operation, performing list display of a plurality of added image data stored in the added image storage section, and displaying a selection frame on a final added image among the plurality of added images.

10. The imaging device of claim 9, further comprising:
    a selection section for selecting any one of a plurality of added images displayed on the display section; and
    an image storage section for storing an added image selected by the selection section.

11. The imaging device of claim 10 wherein each of the plurality of added images is for the same scene but with a different exposure time.

12. The imaging device of claim 9, wherein the added image storage section sequentially stores the added image data in the plurality of different storage regions in order of increasing exposure value.

13. The imaging device of claim 9, wherein each of the plurality of storage regions stores a different, respective, one of the plurality of added images.

14. A control method for an imaging device, comprising:
    repeatedly forming subject images in a set period from commencement of a bulb exposure imaging until the bulb exposure imaging is stopped while bulb exposure is in operation, and acquiring image data;
    performing addition processing with previous image data every time the image data is output, and respectively sequentially storing added images in a plurality of different storage regions;
    selecting, after completion of the bulb exposure operation, displaying, any one of a plurality of the added images that have been stored in the plurality of different storage regions, and, after displaying a selection frame superimposed on a final added image among the plurality of added images, selecting any one of the plurality of added images; and
    storing the selected added image data in a storage medium.

15. The control method of claim 14, wherein each of the plurality of storage regions stores a different, respective, one of the added images.

16. The control method of claim 14 wherein each of the plurality of added images is for the same scene but with a different exposure time.

* * * * *